US008717301B2

(12) United States Patent  (10) Patent No.: US 8,717,301 B2
Sakata et al.  (45) Date of Patent: May 6, 2014

(54) INFORMATION PROCESSING APPARATUS AND METHOD, AND PROGRAM

(75) Inventors: Junichiro Sakata, Tokyo (JP); Kotaro Asaka, Tokyo (JP); Susumu Takatsuka, Tokyo (JP); Hideo Tsukazaki, Tokyo (JP); Takashi Kinouchi, Tokyo (JP); Takeshi Ozawa, Chiba (JP)

(73) Assignees: Sony Corporation, Tokyo (JP); Sony Music Entertainment (Japan) Inc., Tokyo (JP)

( * ) Notice: Subject to any disclaimer, the term of this patent is extended or adjusted under 35 U.S.C. 154(b) by 1036 days.

(21) Appl. No.: 11/474,941

(22) Filed: Jun. 27, 2006

(65) Prior Publication Data

US 2007/0024594 A1  Feb. 1, 2007

(30) Foreign Application Priority Data

Aug. 1, 2005  (JP) ................ P2005-223471

(51) Int. Cl.
*G06F 3/041*  (2006.01)
(52) U.S. Cl.
USPC ............ 345/173; 715/764; 715/778; 715/810
(58) Field of Classification Search
USPC .......... 345/173–178; 715/200–277, 700–867, 715/961–978
See application file for complete search history.

(56) References Cited

U.S. PATENT DOCUMENTS 6,845,488 B1 * 1/2005 Shim et al. .................... 715/815
6,961,029 B1 * 11/2005 Canova et al. ................. 345/55
7,133,531 B2 * 11/2006 Karpenstein .................. 381/119
7,138,984 B1 * 11/2006 Miles ............................. 345/173
7,278,106 B1 * 10/2007 Mason .......................... 715/744

(Continued)

FOREIGN PATENT DOCUMENTS

EP  1 420 388 A1  5/2004
EP  1 557 746 A2  7/2005

(Continued)

OTHER PUBLICATIONS

A Communication issued by the European Patent Office in Application No. 06255125.4, dated Aug. 9, 2012 (6 pages).

(Continued)

*Primary Examiner* — Lun-Yi Lao
*Assistant Examiner* — Gene W Lee
(74) *Attorney, Agent, or Firm* — Finnegan, Henderson, Farabow, Garrett & Dunner, L.L.P.

(57) ABSTRACT

There is provided a content selection view in which the user can select a content intuitively and easily. When the user places a touch pen in touch with a touch panel in a position corresponding to a position P1 in a map and drags the touch pen along a locus to a position P2 with the touch pen being kept in touch with the touch panel, PD will judge that a grid is still an option. Thereafter, when the user takes the touch pen off the touch panel surface, the PD will select the grid corresponding to the position P2 where the touch pen has finally been in touch with the touch panel. The PD will output not only content data assigned to the selected grid but a sound corresponding, to predetermined content data even while the grid is still an option. The present invention is applicable to a portable recorder/player.

20 Claims, 42 Drawing Sheets

(56) References Cited

U.S. PATENT DOCUMENTS

| | | | |
|---|---|---|---|
| 7,542,814 B2* | 6/2009 | Barr | 700/94 |
| 2001/0056434 A1* | 12/2001 | Kaplan et al. | 707/104.1 |
| 2002/0045960 A1* | 4/2002 | Phillips et al. | 700/94 |
| 2002/0075330 A1* | 6/2002 | Rosenzweig et al. | 345/854 |
| 2003/0095096 A1 | 5/2003 | Robbin et al. | |
| 2003/0182100 A1* | 9/2003 | Plastina et al. | 704/1 |
| 2003/0210280 A1* | 11/2003 | Baker et al. | 345/835 |
| 2004/0055446 A1 | 3/2004 | Robbin et al. | |
| 2004/0221243 A1 | 11/2004 | Twerdahl et al. | |
| 2005/0071761 A1 | 3/2005 | Kontio | |
| 2005/0270276 A1* | 12/2005 | Sugimoto et al. | 345/173 |
| 2006/0077183 A1* | 4/2006 | Studt | 345/173 |

FOREIGN PATENT DOCUMENTS

| | | |
|---|---|---|
| EP | 1 557 746 B2 | 7/2005 |
| JP | 8-137902 | 5/1996 |
| JP | 08-137902 | 5/1996 |
| JP | 2001-356876 | 12/2001 |
| JP | 2001-356878 | 12/2001 |
| JP | 2003-330613 | 11/2003 |
| JP | 2004-145388 | 5/2004 |
| JP | 2004-171096 | 6/2004 |
| JP | 2004-252654 | 9/2004 |
| WO | WO 99/08175 | 2/1999 |
| WO | WO 2005/091104 A2 | 9/2005 |

OTHER PUBLICATIONS

A European Search Report mailed by the European Patent Office on Nov. 21, 2012, in corresponding European Application No. 06255125.4 (15 pages).

An Extended European Search Report mailed on Mar. 4, 2013, by the European Patent Office in European Patent Application No. 06253368.2 (9 pages).

An Office Action issued by European Patent Office on Aug. 8, 2013, in European Patent Application No. 06255125.4 (5 pages).

An Office Action issued by Korean Patent Office on Aug. 30, 2013 in Korean Patent Application No. 10-2006-60920 (16 pages).

* cited by examiner

Table 181:

| Content ID | Tempo | Major | RythmRation | HiMid | Genre | Date (year) | Ranking | Artist ID |
|---|---|---|---|---|---|---|---|---|
| ID of content A | 115 | -13 | 40 | 25 | Rock | 1983 | 130 | ID of artist A |
| ID of content B | 150 | 32 | 42 | 62 | Pops | 1999 | 5 | ID of artist A |
| ID of content C | 131 | 36 | 5 | -11 | Rock | 2002 | 20 | ID of artist A |
| ID of content D | 84 | 25 | 9 | 31 | Rock | 1983 | 53 | ID of artist B |
| ID of content E | 161 | 36 | 4 | 6 | Pops | 1994 | 256 | ID of artist B |
| ID of content F | 178 | 51 | 16 | 11 | Jazz | 1935 | 83 | ID of artist C |
| ID of content G | 184 | 32 | 13 | 46 | Pops | 2004 | 122 | ID of artist D |

Table 182:

| Artist ID | Artist's name |
|---|---|
| ID of artist A | Artist A |
| ID of artist B | Brtist B |
| ID of artist C | Crtist C |
| ID of artist D | Drtist D |
| ID of artist E | Ertist E |

Table 183:

| Artist ID | Related-artist ID |
|---|---|
| ID of artist A | ID of artist B |
| ID of artist B | ID of artist C |
| ID of artist B | ID of artist D |
| ID of artist C | ID of artist G |
| ID of artist D | ID of artist A |
| ID of artist E | ID of artist C |

FIG.7

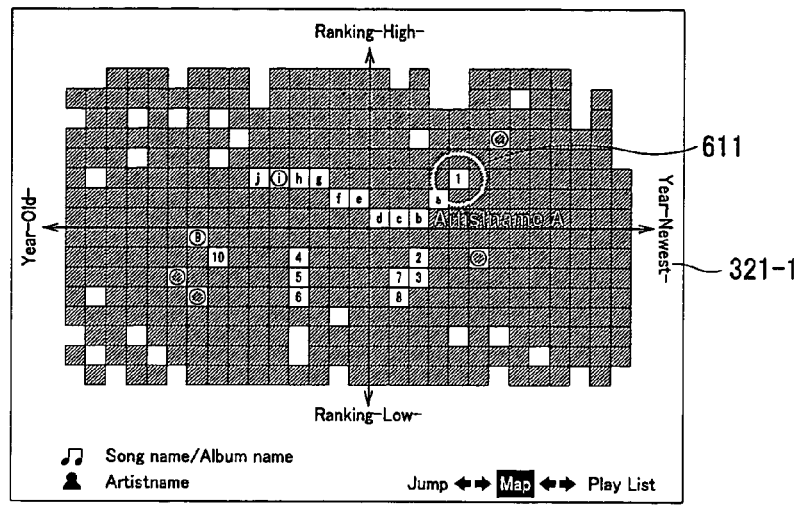
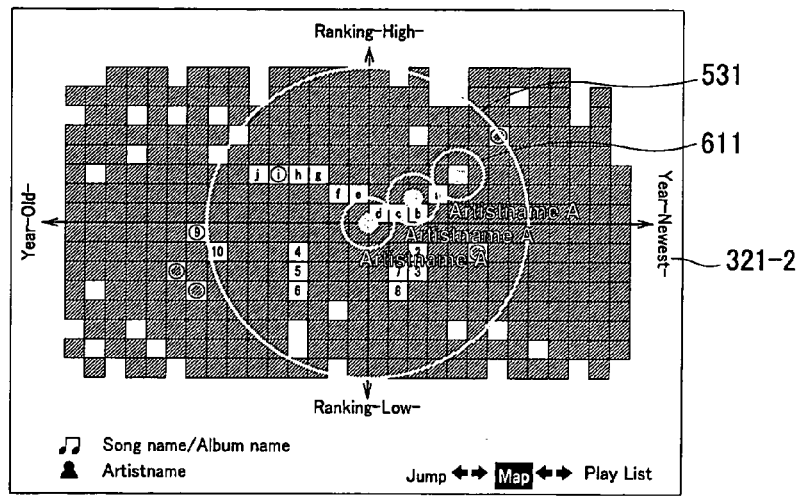
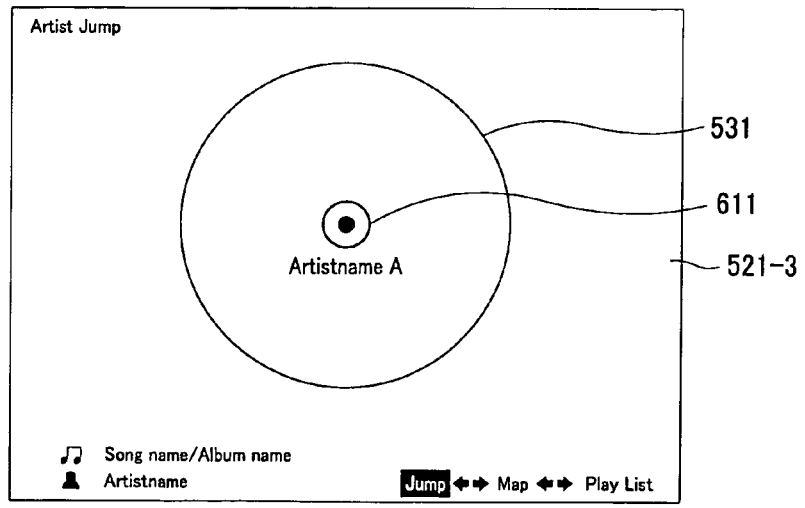
FIG.26

INFORMATION PROCESSING APPARATUS AND METHOD, AND PROGRAM

CROSS REFERENCES TO RELATED APPLICATIONS

The present invention contains subject matter related to Japanese Patent Application JP 2004-382038 filed in the Japanese Patent Office on Dec. 28, 2004, and Japanese Patent Application JP 2005-223471 filed in the Japanese Patent Office on Aug. 1, 2005, the entire contents of which are incorporated herein by reference.

BACKGROUND OF THE INVENTION

1. Field of the Invention

The present invention generally relates to an information processing apparatus, method and program, and more particularly, to an information processing apparatus and method and a program, for displaying a content selection view the user can instinctively manipulate and allowing the user to easily select, to his or her taste or mood, any one of various kinds of contents indicated in the view.

2. Description of the Related Art

Recently, there has become increasingly popular a method of taking music data into a personal computer (PC) by ripping a music from a CD (compact disk) having music pieces recorded therein or by downloading a desired music from a music distribution server by the use of a music distribution service. The user transfers a content such as music data thus downloaded to his PC to a portable device (PD), and carries the PD with him for enjoying the content at any time everywhere.

However, such a PD should have a high portability but its display screen is limited in physical size. On this account, there have been proposed many methods intended for allowing the user to search and select more easily a user-desired one or ones of contents and applications recorded in the PD even while the display screen is physically limited in size.

For example, the Japanese Patent Laid-Open No. 2003-330613 (will be referred to as "Patent Document 1" hereunder) proposes a portable multimedia device designed to provide a scrolled display of a list of applications' titles (name) by dragging on a touch panel for selection of applications whose names are displayed in an options window in a display area as options.

Also, the United States Patent Laid-Open No. 2003-0095096 (will be referred to as "Patent Document 2" hereunder) proposes a portable multimedia device designed to provide a scrolled linear display of a list of content titles (name) by operating a rotary input device for easier search for a desired one of the contents.

Further, the United States Patent Laid-Open No. 2004-0055446 (will be referred to as "Patent Document 3" hereunder) proposes a portable multimedia device designed to provide a hierarchical display of a genre, artist and album title (name) of a music and the name (title) of the music itself for easier search for a user-desired content.

The above-mentioned proposals are rather effective for searching a music when the user already knows it in case the PD has recorded therein only such a number of contents as the user can recognize them or many contents the user has ripped or downloaded by preference, for example.

That is, in case the PD has recorded therein such a number of contents as the user can recognize, a desired one is easily found in the scrolled display of all the contents as in the Patent Documents 1 and 2. Also, in case the PD has recorded therein many contents the user has ripped or downloaded by preference, for example, the user can easily search his desired content in an hierarchical display as in the Patent Document 3 because the user roughly knows the names of the recorded contents and words related to the contents, such as album name, genre or artist's name in case the contents are music pieces.

SUMMARY OF THE INVENTION

In case the PD has recorded therein various contents including those which the user does not like, for example, it takes time and is difficult to search the various contents for a desired one on the base of only information the user knows even by applying any of the aforementioned proposals.

Namely, many of content selection views used in the past are designed on the assumption that the user has previously obtained information on contents recorded in the PD. The content selection views are not advantageous in that it is difficult for the user to intuitively search a wide variety of contents on which the user has not so much information for a content suiting his taste, mood or the like even with the use of any of the above proposals.

It is therefore desirable to overcome the above-mentioned drawbacks of the related art by permitting the user to intuitively select a content or contents suiting his or her taste from among a variety of contents.

According to an embodiment of the present invention, there is provided an information processing apparatus including:

a display controlling means for controlling the display screen to display items having predetermined contents assigned thereto, respectively;

a detecting means for detecting user's touch on a touch panel;

a judging means for judging whether the user's touch detected by the detecting means has been released or not;

a selecting means for selecting one of the items, corresponding to a position where the user's touch has been detected by the detecting means just before and displayed by the display controlling means, in case it is determined by the judging means that the user's touch has been released; and a playing means for playing the content assigned to the item selected by the selecting means, the playing means playing a predetermined content also in a period from the detection of the user's touch by the detecting means until it is determined by the judging means that the user's touch has been released.

In the above information processing apparatus, the predetermined content may be a part or all of the content assigned to the item corresponding to the position where the user's touch has been detected by the detecting means and displayed by the display controlling means in a period from the detection of the user's touch by the detecting means until it is determined by the judging means that the user's touch has been released.

The predetermined content may be an effective sound.

According to another embodiment of the present invention, there is provided an information processing method including the steps of:

controlling a display screen to display items having predetermined contents assigned thereto, respectively;

detecting user's touch on a touch panel;

judging whether the user's touch detected in the detecting step has been released or not;

selecting one of the items, corresponding to a position where the user's touch has been detected in the detecting step just before and displayed in the display controlling step, in case it is determined in the judging step that the user's touch has been released; and playing the content assigned to the item selected in the selecting step, in the playing step, a predetermined content being played also in a period from the detection of the user's touch in the detecting step until it is determined in the judging step that the user's touch has been released.

According to another embodiment of the present invention, there is provided a program including the steps of:

controlling a display screen to display items having predetermined contents assigned thereto, respectively;

detecting user's touch on a touch panel;

judging whether the user's touch detected in the detecting step has been released or not;

selecting one of the items, corresponding to a position where the user's touch has been detected in the detecting step just before and displayed in the display controlling step in case it is determined in the judging step that the user's touch has been released; and playing the content assigned to the item selected in the selecting step, in the playing step, a predetermined content being played also in a period from the detection of the user's touch in the detecting step until it is determined in the judging step that the user's touch has been released.

In the above embodiments of the present invention, items having predetermined contents assigned thereto are displayed on the display screen, user's touch on the touch panel is detected, and it is judged whether the detected user's touch has been released. Then, if case it is determined that the user's touch has been released, a displayed item corresponding to a position where the user's touch has been detected just before is selected. The content assigned to the item thus selected is played, and a predetermined content is played also in a period from the detection of the user's touch until it is determined that the user's touch has been released.

According to another embodiment of the present invention, there is provided an information processing apparatus including:

a display controlling means for controlling the display screen to display items having predetermined contents assigned thereto, respectively;

a detecting means for detecting user's touch on the touch panel;

a judging means for judging whether the user's touch detected by the detecting means has been released or not;

a selecting means for selecting one of the items, corresponding to a position where the user's touch has been detected by the detecting means just before and displayed by the display controlling means, in case it is determined by the judging means that the user's touch has been released, or all the items corresponding to an area surrounded by positions where the user's touch has been detected by the detecting means and displayed by the display controlling means in a period from the detection of the user's touch by the detecting means until it is determined by the judging means that the user's touch has been released; and a playing means for playing the content assigned to the item selected by the selecting means.

The above information processing apparatus may further include a changeover means for changing the object to be selected by the selecting means from an item corresponding to the position where the user's touch has been detected by the detecting means just before to an item corresponding to the area surrounded by positions where the user's touch has been detected by the detecting means and displayed by the display controlling means in a period from the detection of the user's touch by the detecting means until it is determined by the judging means that the user's touch has been released.

According to another embodiment of the present invention, there is provided an information processing method including the steps of:

controlling a display screen to display items having predetermined contents assigned thereto, respectively;

detecting user's touch on a touch panel;

judging whether the user's touch detected in the detecting step has been released or not;

selecting one of the items, corresponding to a position where the user's touch has been detected in the detecting step just before and displayed in the display controlling step, in case it is determined in the judging step that the user's touch has been released, or all the items corresponding to an area surrounded by positions where the user's touch has been detected in the detecting step and displayed in the display controlling step in a period from the detection of the user's touch in the detecting step until it is determined in the judging step that the user's touch has been released; and playing the content assigned to the item selected in the selecting step.

According to another embodiment of the present invention, there is provided a program including the steps of:

controlling a display screen to display items having predetermined contents assigned thereto, respectively;

detecting user's touch on a touch panel;

judging whether the user's touch detected in the detecting step has been released or not;

selecting one of the items, corresponding to a position where the user's touch has been detected in the detecting step just before and displayed in the display controlling step, in case it is determined in the judging step that the user's touch has been released, or all the items corresponding to an area surrounded by positions where the user's touch has been detected in the detecting step and displayed in the display controlling step in a period from the detection of the user's touch in the detecting step until it is determined in the judging step that the user's touch has been released; and playing the content assigned to the item selected in the selecting step.

In the above embodiments of the present invention, items having predetermined contents assigned thereto are displayed on the display screen, user's touch on the touch panel is detected, and it is judged whether the detected user's touch has been released. Then, if case it is determined that the user's touch has been released, a displayed item corresponding to a position where the user's touch has been detected just before is selected or all displayed items corresponding to an area surrounded by positions where the user's touch has been detected are selected in a period from the detection of the user's touch until it is determined that the user's touch has been released. The content assigned to the item thus selected or contents assigned to the items are played.

According to another embodiment of the present invention, there is provided an information processing apparatus including:

a display controlling means for controlling a display screen to display items having predetermined contents assigned thereto, respectively;

a selecting means for selecting an item displayed by the display controlling means in response to an user's operation; and an acquiring means for acquiring a related content having a predetermined relationship with a content assigned to the item selected by the selecting means, the display controlling means displaying the item selected by the selecting means in the center of a circle or polygon set on the display screen while displaying a first related item having assigned thereto the related content acquired by the acquiring means on all or part of the circumference of the circle or on all or part of the periphery of the polygon.

The above information processing apparatus may further include a detecting means for detecting user's touch on a touch panel laminated on the display screen, and the selecting means be adapted to select an item displayed on the display screen and having a content assigned thereto in response to the user's touch detected by the detecting means.

The display controlling means may be adapted to indicate a line between the item and first related item or the line with at least one of an arrow, line pattern and color corresponding to the predetermined relation.

Also, the display controlling means may be adapted to display an image of the first related item selected by the selector, moving from on all or part of the circumference of the circle or on all or part of the periphery of polygon on the display screen to the display center, and an image of a second related item acquired by the acquiring means and have a related content having a predetermined relationship with the first related item, which image jumps from on the first related item displayed in the display center to a predetermined position on all or part of the circumference of the circle or on all or part of the periphery of the polygon on the display screen.

Also, the content may be information on a list of plays made by any other user.

According to another embodiment of the present invention, there is provided an information processing method including the steps of:

controlling a display screen to display items having predetermined contents assigned thereto, respectively;

selecting an item displayed in the display controlling step in response to an user's operation; and acquiring a related content having a predetermined relationship with a content assigned to the item selected in the selecting step, in the display controlling step, the item selected in the selecting step being displayed in the center of a circle or polygon set on the display screen while a first related item having assigned thereto the related content acquired in the acquiring step is displayed on all or part of a circumference of the circle or on all or part of the periphery of the polygon.

According to another embodiment of the present invention, there is provided a program including the steps of:

controlling a display screen to display items having predetermined contents assigned thereto, respectively;

selecting an item displayed in the display controlling step in response to an user's operation; and acquiring a related content having a predetermined relationship with a content assigned to the item selected in the selecting step, in the display controlling step, the item selected in the selecting step being displayed in the center of a circle or polygon set on the display screen while a first related item having assigned thereto the related content acquired in the acquiring step is displayed on all or part of a circumference of the circle or on all or part of the periphery of the polygon.

In the above embodiments of the present invention, items having predetermined contents assigned thereto are displayed on the display screen, the displayed items are selected in response to user's operation, a related content having a predetermined relationship with the contents assigned to the selected items is acquired. Then the selected item is displayed in the display center, and the related items having the acquired related contents assigned thereto are displayed on all or part of a circumference of the circle or on all or part of the periphery of the polygon.

According to another embodiment of the present invention, there is provided an information processing apparatus including:

an extracting means for extracting a content of which at least one meta data has a value within a predetermined range;

a display controlling means for controlling the display screen to display an item having assigned thereto the content extracted by the extracting means in a predetermined position on the axis of at least the one meta data on the display screen;

a selecting means for selecting an item displayed by the display controlling means in response to a user's operation; and a playing means for playing the content assigned to the item selected by the selecting means.

The above information processing apparatus may further include a detecting means for detecting user's touch on a touch panel laminated on the display screen, and the selecting means be adapted to select an item displayed on the display screen and having a content assigned thereto in response to the user's touch detected by the detecting means.

The extracting means may be adapted to extract a content of which at least two meta data have values within the predetermined range, and the display controlling means be adapted to control the display screen to display the item having assigned thereto the content extracted by the extracting means in predetermined positions on the axes of at least two meta data on the display screen.

The above information processing apparatus may be adapted such that in case a plurality of contents is extracted by the extracting means and assigned to an item, the plurality of contents is given predetermined priorities, respectively, in the order of predetermined values of the meta data of the plurality of contents, and the playing means be adapted to play the plurality of contents assigned to the item selected by the selecting means in the order of their predetermined priorities.

The display controlling means may be adapted to control the display screen to display the item having assigned thereto the content having the predetermined relationship with the item in a manner different from that for any other item.

For the different manner of displaying, there may be used at least one of flickering, color, figure, brightness and addition of a numeral.

The display controlling means may be adapted to indicate a line between the items having assigned thereto contents having a predetermined relationship with the items or the line with at least one of an arrow, line pattern and color corresponding to the predetermined relation.

According to another embodiment of the present invention, there is provided an information processing method including the steps of:

extracting a content of which at least one meta data has a value within a predetermined range;

controlling a display screen to display an item having assigned thereto the content extracted in the extracting step in a predetermined position on the axis of at least the one meta data on the display screen;

selecting an item displayed in the display controlling step in response to a user's operation; and playing the content assigned to the item selected in the selecting step.

According to another embodiment of the present invention, there is provided a program including the steps of:

extracting a content of which at least one meta data has a value within a predetermined range;

controlling a display screen to display an item having assigned thereto the content extracted in the extracting step in a predetermined position on the axis of at least the one meta data on the display screen;

selecting an item displayed in the display controlling step in response to a user's operation; and playing the content assigned to the item selected in the selecting step.

In the above embodiments of the present invention, a content of which at least one meta data has a value within a predetermined range is extracted, and an item having the extracted content assigned thereto is displayed in a predetermined position on the axis of at least the one meta data on the display screen. Then, the displayed item is selected in response to user's operation, and the content assigned to the selected item is played.

According to another embodiment of the present invention, there is provided an information processing apparatus including:

a selecting means for selecting an item displayed on the display screen and having an content assigned thereto in response to an user's operation;

an acquiring means for acquiring a related content having a predetermined relationship with the content assigned to the item selected by the selecting means, a first display controlling means for controlling a display screen to display the item selected by the selecting means in the center of a circle or polygon set on the display screen while displaying the related item having the related contents acquired by the acquiring means on all or part of a circumference of the circle or on all or part of the periphery of the polygon;

an extracting means for extracting a content of which at least one meta data has a value within a predetermined range;

a second display controlling means for controlling the display screen to display the item having assigned thereto the content extracted by the extracting means in a predetermined position on the axis of at least the one meta data on the display screen; and a display changeover means for making changeover between one view controlled by the first display controlling means and other controlled by the second display controlling means, the first or second display controlling means controlling the display screen to display an image jumping from the one view to the other in case the one view is changed to the other by the display changeover means.

The above information processing apparatus may further include a detecting means for detecting user's touch on a touch panel laminated on the display screen, and the selecting means be adapted to select an item displayed on the display screen and having a content assigned thereto in response to the user's touch detected by the detecting means.

The extracting means may be adapted to extract a content of which at least two meta data have values within the predetermined range, and the second display controlling means be adapted to control the display screen to display the item having assigned thereto the content extracted by the extracting means in predetermined positions on the axes of at least two meta data on the display screen.

The first or second display controlling means may be adapted to control the display screen to display information on the content selected by the selecting means in the one view while being reflected on the other view in case the one view is changed to the other by the display changeover means.

According to another embodiment of the present invention, there is provided an information processing method including:

a selecting step of selecting an item displayed on a display screen and having an content assigned thereto in response to an user's operation;

an acquiring step of acquiring a related content having a predetermined relationship with the content assigned to the item selected in the selecting step;

a first display controlling step of controlling a display screen to display the item selected in the selecting step in the center of a circle or polygon set on the display screen while displaying the related item having the related contents acquired in the acquiring step on all or part of a circumference of the circle or on all or part of the periphery of the polygon;

an extracting step of extracting a content of which at least one meta data has a value within a predetermined range;

a second display controlling step of controlling the display screen to display the item having assigned thereto the content extracted in the extracting step in a predetermined position on the axis of at least the one meta data on the display screen; and a display changeover step of making changeover between one view controlled in the first display controlling step and other controlled in the second display controlling step, in the first or second display controlling step, the display screen being controlled to display an image jumping from one view to another view in case the one view is changed to the other in the display changeover step.

According to another embodiment of the present invention, there is provided a program including:

a selecting step of selecting an item displayed on a display screen and having an content assigned thereto in response to an user's operation;

an acquiring step of acquiring a related content having a predetermined relationship with the content assigned to the item selected in the selecting step;

a first display controlling step of controlling a display screen to display the item selected in the selecting step in the center of a circle or polygon set on the display screen while displaying the related item having the related contents acquired in the acquiring step on all or part of a circumference of the circle or on all or part of the periphery of the polygon;

an extracting step of extracting a content of which at least one meta data has a value within a predetermined range;

a second display controlling step of controlling the display screen to display the item having assigned thereto the content extracted in the extracting step in a predetermined position on the axis of at least the one meta data on the display screen; and a display changeover step of making changeover between one view controlled in the first display controlling step and other controlled in the second display controlling step, in the first or second display controlling step, the display screen being controlled to display an image jumping from the one view to the other in case the one view is changed to the other in the display changeover step.

In the above embodiments of the present invention, items having contents assigned thereto, respectively, displayed on the display screen in response to user's touch, are selected, related contents having a predetermined relationship with the contents assigned to the selected items are acquired and displayed as a first view about the selected item while the related items having the acquired related contents assigned thereto are displayed on all or part of a circumference of the circle or on all or part of the periphery of the polygon. Also, a content of which at least one meta data has a value within a predetermined range is extracted, and an item having the extracted content assigned thereto is displayed as a second view in a predetermined position on the axis of at least the one meta data on the display screen. Then, in case one of the first and second views is changed from one to the other, an image jumping from the one view to the other is displayed.

According to another embodiment of the present invention, there is provided an information processing apparatus including:

an extracting means for extracting a content of which at least one meta data has a value within a predetermined range;

a first display controlling means for controlling the display screen to display an item having assigned thereto the content extracted by the extracting means in a predetermined position on the axis of at least the one meta data on the display screen;

a selecting means for selecting an item displayed on the display screen in response to user's operation;

a playing means for playing a content assigned to the item selected by the selecting means;

a second display controlling means for controlling the display screen to display contents assigned to the item selected by the selecting means in the form of a list; and a display changeover means for making changeover between a first view controlled by the first display controlling means and second view controlled by the second display controlling means, the first display controlling means controlling the display screen to display an image jumping from the first view to the second in case the first mode is changed to the second by the display changeover means.

The above information processing apparatus may further include a detecting means for detecting user's touch on a touch panel laminated on the display screen, and the selecting means be adapted to select an item displayed on the display screen and having a content assigned thereto in response to the user's touch detected by the detecting means.

The extracting means may be adapted to extract a content of which at least two meta data have values within the predetermined range, and the first display controlling means be adapted to control the display screen to display the item having assigned thereto the content extracted by the extracting means in predetermined positions on the axes of at least two meta data on the display screen.

Also, the second display controlling means may be adapted to display contents in the order of the values of predetermined meta data of the contents in the form of a list when the first view is changed to the second view.

Also, the predetermined meta data may be ranking information.

According to another embodiment of the present invention, there is provided an information processing method including:

an extracting step of extracting a content of which at least one meta data has a value within a predetermined range;

a first display controlling step of controlling a display screen to display an item having assigned thereto the content extracted in the extracting step in a predetermined position on the axis of at least the one meta data on the display screen;

a selecting step of selecting an item displayed on the display screen in response to user's operation;

a playing step of playing a content assigned to the item selected in the selecting step;

a second display controlling step of controlling the display screen to display contents assigned to the item selected by the selector in the form of a list; and a display changeover step of making changeover between a first view controlled in the first display controlling step and second view controlled in the second display controlling step, in the first display controlling step, the display screen being controlled to display an image jumping from the first view to the second one in case the first view is changed to the second in the display changeover step.

According to another embodiment of the present invention, there is provided a program including:

an extracting step of extracting a content of which at least one meta data has a value within a predetermined range;

a first display controlling step of controlling a display screen to display an item having assigned thereto the content extracted in the extracting step in a predetermined position on the axis of at least the one meta data on the display screen;

a selecting step of selecting an item displayed on the display screen in response to user's operation;

a playing step of playing a content assigned to the item selected in the selecting step;

a second display controlling step of controlling the display screen to display contents assigned to the item selected by the selector in the form of a list; and a display changeover step of making changeover between a first view controlled in the first view controlling step and second view controlled in the second display controlling step, in the first display controlling step, the display screen being controlled to display an image jumping from the first view to the second in case the first mode is changed to the second in the display changeover step.

In the above embodiments of the present invention, a content of which at least one meta data has a value within a predetermined range is extracted, an item having the extracted content assigned thereto is displayed as a first view in a predetermined position on the axis of at least the one meta data on the display screen. Also, the item displayed on the display screen is selected in response to user's touch, the content assigned to the selected item is played, and contents assigned to the selected item are displayed as a second view in the form of a list. Then, in case the first view is changed to the second, an image jumping from the first view to the second is displayed.

According to the embodiments of the present invention, there is provided a content selection view in which the user can intuitively select one of a variety of contents on which information is not well known to the user. Also, there is provided a content selection view intuitively comprehensible to the user. Thus, with the embodiments of the present invention, the user can intuitively select a content suiting his purpose or taste. Further, the present invention permits to widely popularize contents.

BRIEF DESCRIPTION OF THE DRAWINGS

FIG. 7 shows detailed examples of the composition of the meta data database in the PD in FIG. 5;

FIG. 26 explains a display jump from the Map view in FIG. 10 to the Jump view in FIG. 21;

DETAILED DESCRIPTION OF THE PREFERRED EMBODIMENTS

The present invention will be illustrated and described in detail below concerning the embodiments thereof with reference to the accompanying drawings. The subject matters of the appended claims correspond to the embodiments of the present invention as will be described below. This description is made to make sure that the inventions set forth in the appended claims are supported by the embodiments which will be illustrated and described herebelow. Therefore, any embodiments referred to here but not described as corresponding to the subject matters of the claims will not mean that they do not correspond to the subject matters of the claims. Reversely, any embodiments described here as corresponding to the subject matters in the claims will not mean that they do not correspond to other than the subject matters of the claims.

Further, the following description will not mean that all the inventions corresponding to the embodiments which will be described herebelow are not set forth in the appended claims. In other words, the following description refers to the inventions corresponding to the embodiments and does not deny the existence of inventions not set forth in the appended claims, namely, the existence of inventions which will be subjected to divisional application or added by amendment.

Figure 4:
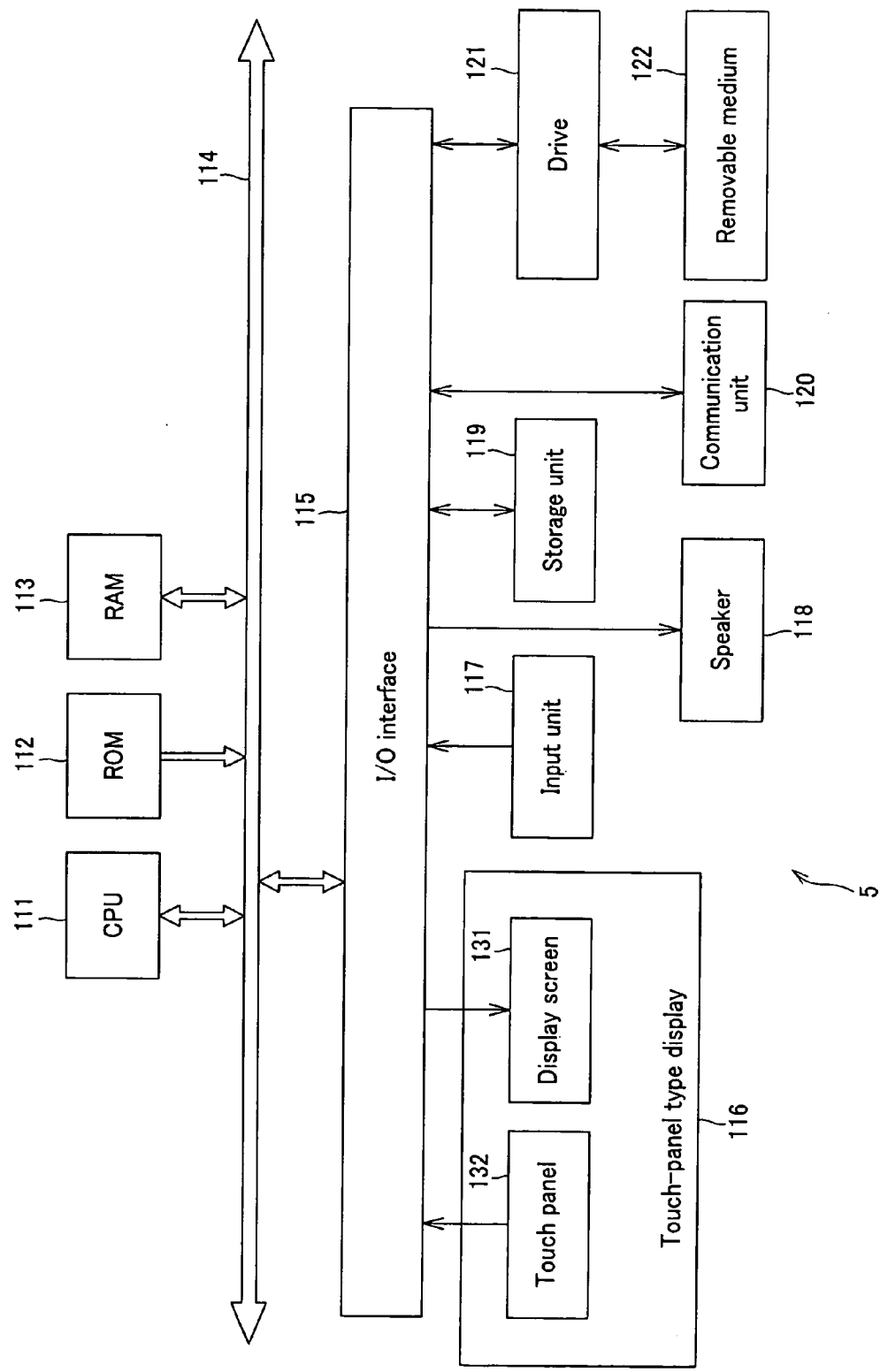
FIG. 4 is a schematic block diagram showing an example configuration of the PD (portable device) included in the content providing system in FIG. 1.

An information processing apparatus (e.g., PD 5 in FIG. 1) according to an embodiment of the present invention includes:

a display controller (e.g., Map view display controller 216 in FIG. 9) to control a display screen to display items having predetermined contents assigned thereto, respectively;

a detector (e.g., input module 153 in FIG. 5) to detect user's touch on a touch panel (e.g., touch panel 132 in FIG. 4);

a judging unit (e.g., selection-position acquisition unit 211 in FIG. 9) to judge whether the user's touch detected by the detector has been released or not;

a selector (e.g., selected order list management unit 213 in FIG. 9) to select one of the items, corresponding to a position where the user's touch has been detected by the detector just before and displayed by the display controller, in case it is determined by the judging unit that the user's touch has been released; and a player (e.g., content playing module 154 in FIG. 5) to play the content assigned to the item selected by the selector, the player playing a predetermined content also in a period from the detection of the user's touch by the detector until it is determined by the judging unit that the user's touch has been released.

Figure 31:
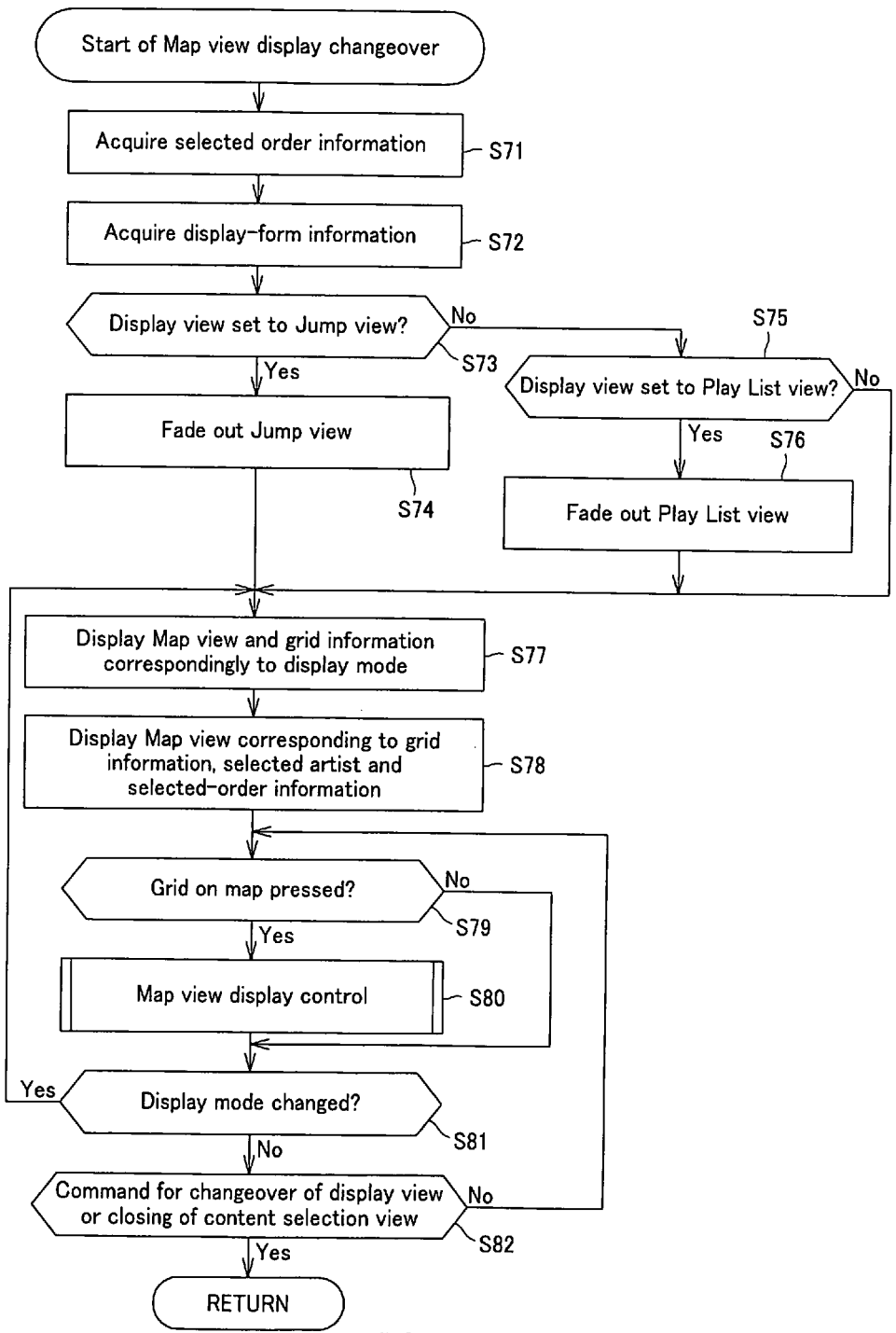
FIG. 31 shows a flow of operations made in Map view display changeover in step S52 in FIG. 30.
Figure 32:
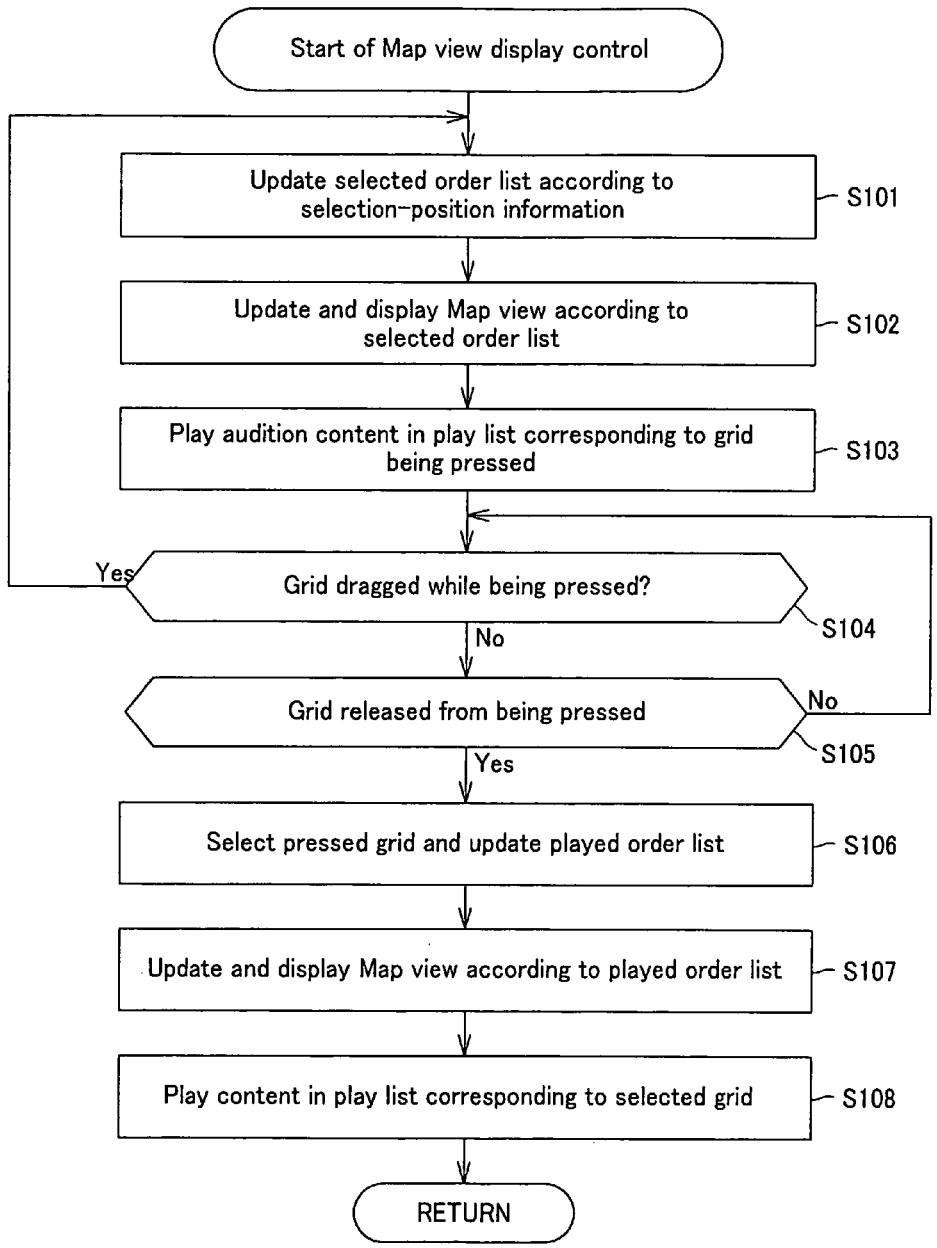
FIG. 32 shows a flow of operations made in Map view display changeover in step S80 in FIG. 31.

An information processing method according to another embodiment of the present invention includes the steps of:

controlling a display screen to display items having predetermined contents assigned thereto, respectively (e.g., step S78 in FIG. 31);

detecting user's touch on a touch panel (e.g., step S79 in FIG. 31);

judging whether the user's touch detected by the detector has been released or not (e.g., step S105 in FIG. 32);

selecting one of the items, corresponding to a position where the user's touch has been detected in the detecting step just before and displayed in the display controlling step, in case it is determined by the judging unit that the user's touch has been released (e.g., step 106 in FIG. 32); and playing the content assigned to the item selected by the selector (e.g., step 108 in FIG. 32), in the playing step, a predetermined content being played also in a period from the detection of the user's touch in the detecting step until it is determined in the judging step that the user's touch has been released (e.g., step 103 in FIG. 32).

An information processing apparatus according to another embodiment of the present invention includes:

a display controller (e.g., Map view display controller 216 in FIG. 9) to control a display screen to display items having predetermined contents assigned thereto, respectively;

a detector (e.g., input module 153 in FIG. 5) to detect user's touch on a touch panel (e.g., touch panel 132 in FIG. 4);

a judging unit (e.g., selection-position acquisition unit 211 in FIG. 9) to judge whether the user's touch detected by the detector has been released or not;

a selector (e.g., selected order list management unit 213 in FIG. 9) to select one of the items (e.g., grid corresponding to the position P2 in FIG. 11), corresponding to a position where the user's touch has been detected by the detector just before and displayed by the display controller, in case it is determined by the judging unit that the user's touch has been released, or all the items (e.g., grids in an area corresponding to the locus 381 in FIG. 12) corresponding to an area surrounded by positions where the user's touch has been detected by the detector and displayed by the display controller in a period from the detection of the user's touch by the detector until it is determined by the judging unit that the user's touch has been released; and a player (e.g., content playing module 154 in FIG. 5) to play the content assigned to the item selected by the selector.

Figure 12:
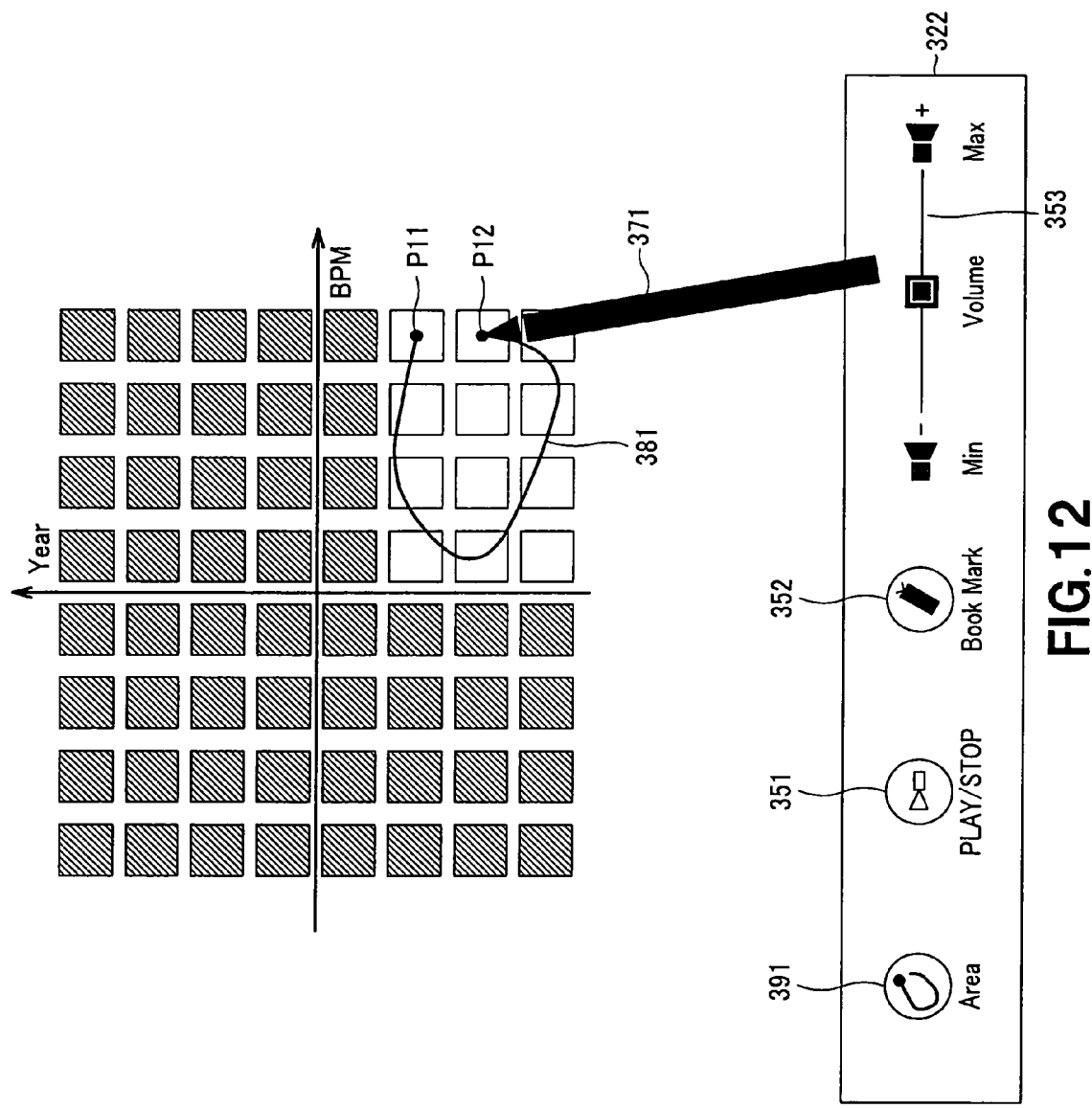
FIG. 12 explains another method of selecting a content in the Map view in FIG. 10.

An information processing apparatus according to another embodiment of the present invention further includes a changeover unit (e.g., selection-position acquisition unit 211 to make an operation according to a command from the Area button 391 in FIG. 12) to change the object to be selected by the selector from an item corresponding to the position where the user's touch has been detected by the detector just before to an item corresponding to the area surrounded by positions where the user's touch has been detected by the detector and displayed by the display controller in a period from the detection of the user's touch by the detector until it is determined by the judging unit that the user's touch has been released.

An information processing method according to another embodiment of the present invention includes the steps of:

controlling a display screen to display items having predetermined contents assigned thereto, respectively (e.g., step S78 in FIG. 31);

detecting user's touch on a touch panel (e.g., step S79 in FIG. 31);

judging whether the user's touch detected by the detector has been released or not (e.g., step S105 in FIG. 32);

selecting one of the items, corresponding to a position where the user's touch has been detected in the detecting step just before and displayed in the display controlling step, in case it is determined in the judging step that the user's touch has been released, or all the items corresponding to an area surrounded by positions where the user's touch has been detected in the detecting step and displayed in the display controlling step in a period from the detection of the user's touch in the detecting step until it is determined in the judging step that the user's touch has been released (e.g., step S106 in FIG. 32); and playing the content assigned to the item selected in the selecting step (e.g., step S108 in FIG. 32).

Note that since a program according to an embodiment of the present invention allows operations basically similar to those allowed by the program processing method according to another embodiment of the present invention, it will not be described to avoid repetition of the same description.

An information processing apparatus according to another embodiment of the present invention includes:

a display controller (e.g., relationship-link display controller 215 in FIG. 9) to control a display screen to display items having predetermined contents assigned thereto, respectively;

a selector (e.g., selection-position acquisition unit 211 in FIG. 9) to select an item displayed by the display controller in response to an user's operation; and an acquisition unit (e.g., relationship link generation 231 in FIG. 9) to acquire a related content having a predetermined relationship with a content assigned to the item selected by the selector, the display controller being adapted to display the item selected by the selector in the center of a circle or polygon set on the display screen while displaying a first related item having assigned thereto the related content acquired by the acquisition unit on all or part of the circumference of the circle or on all or part of the periphery of the polygon.

According to another embodiment of the present invention, the information processing apparatus further includes a detector (e.g., input module 153 in FIG. 5) to detect user's touch on a touch panel (e.g., touch panel 132 in FIG. 4) laminated on the display screen, and the selector selects an item displayed on the display screen and having a content assigned thereto in response to the user's touch detected by the detector.

Figure 23:
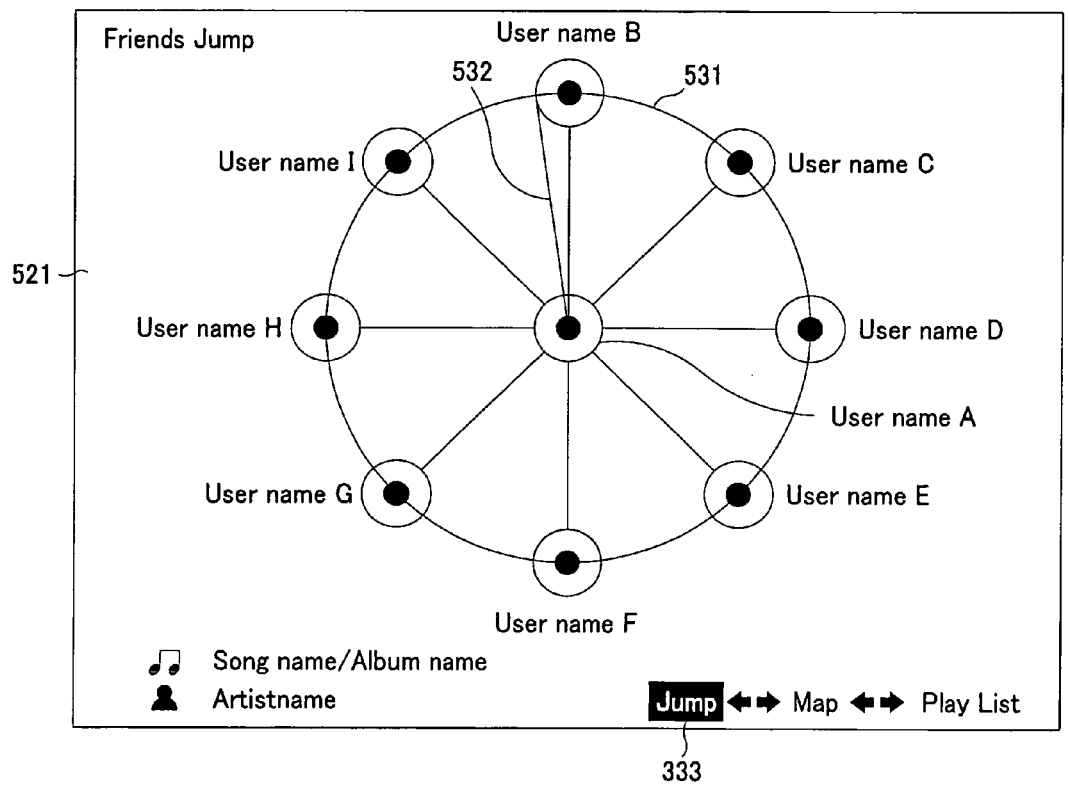
FIG. 23 illustrates another example configuration of the Jump view in FIG. 21.

In the information processing apparatus according to another embodiment, the content is information on a list of plays made by any other user (e.g., played order list assigned to the user icon in the link window 521 in FIG. 23).

Figure 36:
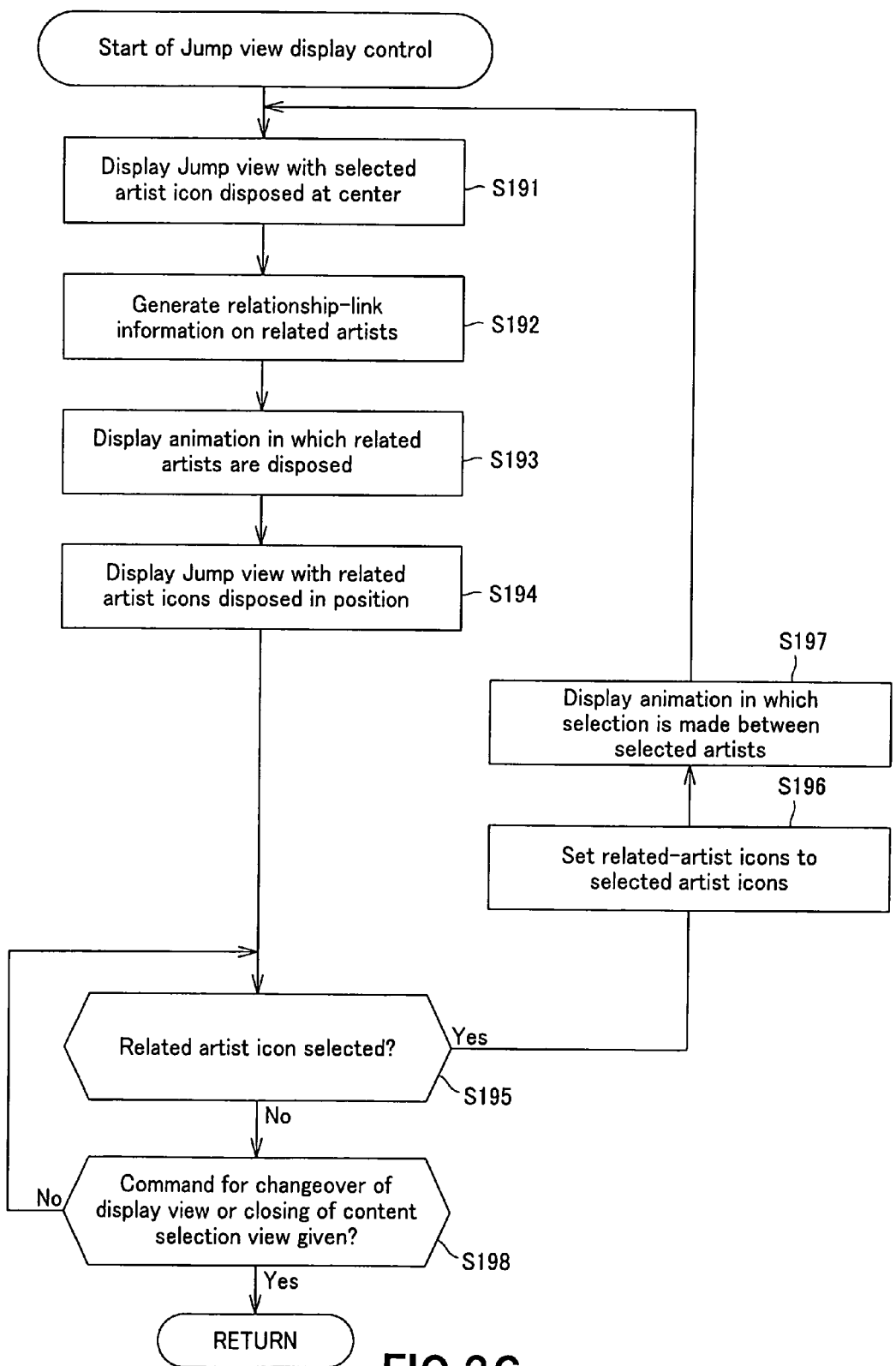
FIG. 36 shows a flow of operations made in Jump view display changeover in step S176 in FIG. 35.

An information processing method according to another embodiment of the present invention includes the steps of:

controlling a display screen to display items having predetermined contents assigned thereto, respectively (e.g., step S194 in FIG. 36);

selecting an item displayed in the display controlling step in response to an user's operation (e.g., step S196 in FIG. 36); and acquiring a related content having a predetermined relationship with a content assigned to the item selected in the selecting step (e.g., step S1192 in FIG. 36), in the display controlling step, the item selected in the selecting step being displayed in the center of a circle or polygon set on the display screen while a first related item having assigned thereto the related content acquired in the acquiring step is displayed on all or part of a circumference of the circle or on all or part of the periphery of the polygon.

Also, note that since a program according to an embodiment of the present invention allows operations basically similar to those allowed by the program processing method according to another embodiment of the present invention, it will not be described to avoid repetition of the same description.

An information processing apparatus according to another embodiment of the present invention includes:

an extraction unit (e.g., grid map generator 232 in FIG. 9) to extract a content of which at least one meta data has a value within a predetermined range;

a display controller (e.g., Map view display controller 216 in FIG. 9 to control the display of the map window 321 in FIG. 29) to control a display screen to display an item having assigned thereto the content extracted by the extraction unit in a predetermined position on the axis of at least the one meta data on the display screen;

a selector (e.g., selection-position acquisition unit 211 in FIG. 9) to select an item displayed by the display controller in response to a user's operation; and a player (e.g., content playing module 154 in FIG. 5) to play the content assigned to the item selected by the selector.

According to another embodiment of the present invention, the information processing apparatus further includes a detector (e.g., input module 153 in FIG. 5) to detect user's touch on a touch panel (e.g., touch panel 132 in FIG. 4) laminated on the display screen, and the selector be adapted to select an item displayed on the display screen and having a content assigned thereto in response to the user's touch detected by the detector.

In an information processing apparatus according to another embodiment of the present invention, the extraction unit extracts a content of which at least two meta data have values within the predetermined range, and the display controller (e.g., Map view display controller 216 in FIG. 9 to control the map window 321 in FIG. 10) controls the display screen to display the item having assigned thereto the content extracted by the extraction unit in predetermined positions on the axes of at least two meta data on the display screen.

An information processing method according to another embodiment of the present invention includes the steps of:

extracting a content of which at least one meta data has a value within a predetermined range (e.g., step S77 in FIG. 31);

controlling a display screen to display an item having assigned thereto the content extracted in the extracting step in a predetermined position on the axis of at least the one meta data on the display screen (e.g., step S78 in FIG. 31);

selecting an item displayed in the display controlling step in response to a user's operation (e.g., step S106 in FIG. 32); and playing the content assigned to the item selected in the selecting step (e.g., step S108 in FIG. 32).

Also, note that since a program according to an embodiment of the present invention allows operations basically similar to those allowed by the program processing method according to another embodiment of the present invention, it will not be described to avoid repetition of the same description.

An information processing apparatus according to another embodiment of the present invention includes:

a selector (e.g., selection-position acquisition unit 211 in FIG. 9) to select an item displayed on a display screen and having an content assigned thereto in response to an user's operation;

an acquisition unit (e.g., relationship link generator 231 in FIG. 9) to acquire a related content having a predetermined relationship with the content assigned to the item selected by the selector, a first display controller (e.g., relationship-link display controller 215 in FIG. 9) to control a display screen to display the item selected by the selector in the center of a circle or polygon set on the display screen while displaying the related item having the related contents acquired by the acquisition unit on all or part of a circumference of the circle or on all or part of the periphery of the polygon;

an extraction unit (e.g., grid map generator 232 in FIG. 9) to extract a content of which at least one meta data has a value within a predetermined range;

a second display controller (e.g., Map view display controller 216 in FIG. 9) to control the display screen to display the item having assigned thereto the content extracted by the extraction unit in a predetermined position on the axis of at least the one meta data on the display screen; and a display changeover unit (e.g., information generation controller 214 in FIG. 9) to make changeover between one view controlled by the first display controller and other controlled by the second display controller, the first or second display controller being adapted to control the display screen to display an image jumping from the one view to the other in case the one view is changed to the other by the display changeover unit.

According to another embodiment of the present invention, the information processing apparatus further includes a detector (e.g., input module 153 in FIG. 5) to detect user's touch on a touch panel (e.g., touch panel 132 in FIG. 4) laminated on the display screen, and the selector be adapted to select an item displayed on the display screen and having a content assigned thereto in response to the user's touch detected by the detector.

An information processing apparatus according to another embodiment of the present invention includes:

a selecting step of selecting an item displayed on a display screen and having an content assigned thereto in response to an user's operation (e.g., step S196 in FIG. 36);

an acquiring step of acquiring a related content having a predetermined relationship with the content assigned to the item selected in the selecting step (e.g., step S192 in FIG. 36);

a first display controlling step of controlling a display screen to display the item selected in the selecting step in the center of a circle or polygon set on the display screen while displaying the related item having the related contents acquired in the acquiring step on all or part of a circumference of the circle or on all or part of the periphery of the polygon (e.g., step S194 in FIG. 36);

an extracting step of extracting a content of which at least one meta data has a value within a predetermined range (e.g., step S77 inn FIG. 31);

a second display controlling step of controlling the display screen to display the item having assigned thereto the content extracted in the extracting step in a predetermined position on the axis of at least the one meta data on the display screen (e.g., step S78 in FIG. 31); and a display changeover step of making changeover between one view controlled in the first display controlling step and other controlled in the second display controlling step (e.g., step S52 or S56 in FIG. 30), in the first or second display controlling step, the display screen being controlled to display an image jumping from one view to another view in case the one view is changed to the other in the display changeover step.

Also, note that since a program according to an embodiment of the present invention allows operations basically similar to those allowed by the program processing method according to another embodiment of the present invention, it will not be described to avoid repetition of the same description.

An information processing apparatus according to another embodiment of the present invention includes:

an extraction unit (e.g., grid map generator 232 in FIG. 9) to extract a content of which at least one meta data has a value within a predetermined range;

a first display controller (e.g., Map view display controller 216 in FIG. 9) to control a display screen to display an item having assigned thereto the content extracted by the extraction unit in a predetermined position on the axis of at least the one meta data on the display screen;

a selector (e.g., selection-position acquisition unit 211 in FIG. 9) to select an item displayed on the display screen in response to user's operation;

a player (e.g., control playing module 154 in FIG. 5) to play a content assigned to the item selected by the selector;

a second display controller (e.g., Play List view display controller 217 in FIG. 9) to control the display screen to display contents assigned to the item selected by the selector in the form of a list; and a display changeover unit (e.g., information generation controller 214 in FIG. 9) to make changeover between a first view controlled by the first display controller and second view controlled by the second display controller, the first display controller being adapted to control the display screen to display an image jumping from the first view to the second in case the first mode is changed to the second by the display changeover unit.

According to another embodiment of the present invention, the information processing apparatus further includes a detector (e.g., input module 153 in FIG. 5) to detect user's touch on a touch panel (e.g., touch panel 132 in FIG. 4) laminated on the display screen, and the selector be adapted to select an item displayed on the display screen and having a content assigned thereto in response to the user's touch detected by the detector.

An information processing method according to another embodiment of the present invention includes:

an extracting step of extracting a content of which at least one meta data has a value within a predetermined range (e.g., step S77 in FIG. 31);

a first display controlling step of controlling a display screen to display an item having assigned thereto the content extracted in the extracting step in a predetermined position on the axis of at least the one meta data on the display screen (e.g., step S78 in FIG. 31);

a selecting step of selecting an item displayed on the display screen in response to user's operation (e.g., step S106 in FIG. 32);

a playing step of playing a content assigned to the item selected in the selecting step (e.g., step S108 in FIG. 32);

a second display controlling step of controlling the display screen to display contents assigned to the item selected by the selector in the form of a list (e.g., step S125 in FIG. 33); and a display changeover step of making changeover between a first view controlled in the first display controlling step and second view controlled in the second display controlling step (e.g., step S53 in FIG. 30), in the first display controlling step, the display screen being controlled to display an image jumping from the first view to the second one in case the first view is changed to the second in the display changeover step.

Also, note that since a program according to an embodiment of the present invention allows operations basically similar to those allowed by the program processing method according to another embodiment of the present invention, it will not be described to avoid repetition of the same description.

Figure 1:
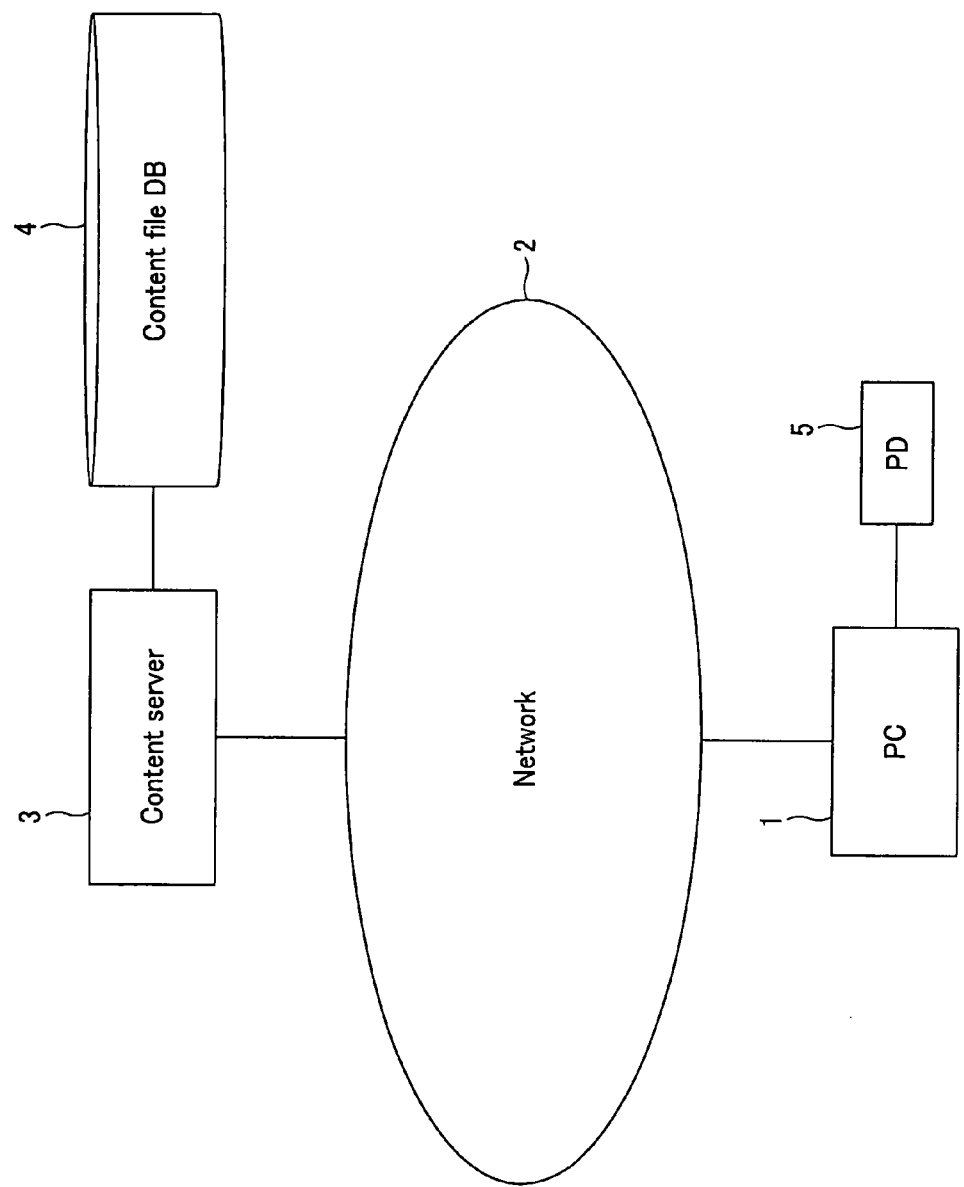
FIG. 1 schematically illustrates an example of the content providing system according to an embodiment of the present invention.

The present invention will be described in detail below concerning the embodiments thereof with reference to the accompanying drawings:

FIG. 1 shows an example configuration of the content providing system as an embodiment of the present invention.

As shown, a personal computer (PC) 1 is connected to a network 2 represented by the Internet. It should be noted that although only one PC 1 is connected to the network 2 as shown in FIG. 1, which is intended for the convenience of illustration and explanation, an arbitrary number of PCs may of course be connected to the network 2.

Also, the network 2 has connected thereto a content server 3 that provides contents such as moving pictures, music pieces, etc. to the PC 1. It should be noted that an arbitrary number of content servers 3 may of course be connected to the network 2. It should also be noted that in the embodiment shown in FIG. 1, a music is provided as a content to the PC 1.

The content server 3 has a content file database (DB) 4 that stores content files including data in contents (will also be referred to as "content data" hereunder) such as music pieces and meta data corresponding to the contents (will also be referred to as "content meta data" hereunder wherever appropriately). The meta data include, for example, name of an album containing contents, name of an artist playing or providing the content, melody of a content, ranking (parameter) of the content in the market, etc.

In response to an access from the PC 1 of a user, the content server 3 authenticates the user by checking whether he or she is already registered for being provided with content files. Then, the content server 3 sends, to the PC 1 of the authenticated user, a variety of content files stored in the content file DB 4 via the network 2. That is, in the embodiment shown in FIG. 1, the content server 3 provides files of various contents to which the content provider recommends the user to listen, not any file including a content for which the user has requested the content provider.

The PC 1 uses client software such as Web browser to access the content server 3, records the content files received from the content server 3 or converts content data read from a CD (compact disk) into data in a predetermined coding format (ATRAC3plus, for example) and records the converted data as a content file along with its meta data.

Also, the PC 1 has connected thereto a portable device (PD) 5 which is a portable recorder/player via a USB (Universal Serial Bus) cable or the like, and transfers a content file recorded in the PD 5 connected thereto.

The PD 5 records a variety of content files acquired from the content server 3 or CD via the PC 1. Also, loaded with a removable medium 122 (as in FIG. 4) having various content files pre-recorded therein, the PD 5 plays content data with the use of meta data of the content file recorded in the removable medium 122.

Note that although the example content providing system shown in FIG. 1 is adapted such that the PD 5 acquires content files from the content server 3 via the PC 1, the system may be adapted such that the PD 5 is connected directly to the network 2 without the PC 1 being connected between them or such that content files are acquired directly from the content server 3 via a radio communication.

Briefly, the PD 5 includes a display screen 131 having a touch panel 132 laminated thereon (as in FIG. 4) and on which there is displayed a content selection view in which the user is to select a to-be-played one of various content files recorded in the PD 5. With a touch pen or his finger or by operating the touch panel 132 laminated on the display screen 131 on which a content selection view is displayed, the user can easily select and listen to a content suiting his taste or mood. That is, the user can intuitively select a content in the content selection view.

In the content providing system shown in FIG. 1, the content server 3 provides the PD 5 with the various contents which have not been requested by the user via the PC 1, and the user can select and listen to a desired one, suiting his taste, of the various contents provided to the PD 5 by making an operation according to the content selection view on the display screen 131 of the PD 5, as above. On the other hand, the content provider can promote the popularization of contents to a greater number of uses and hence the sales of the contents.

Figure 2:
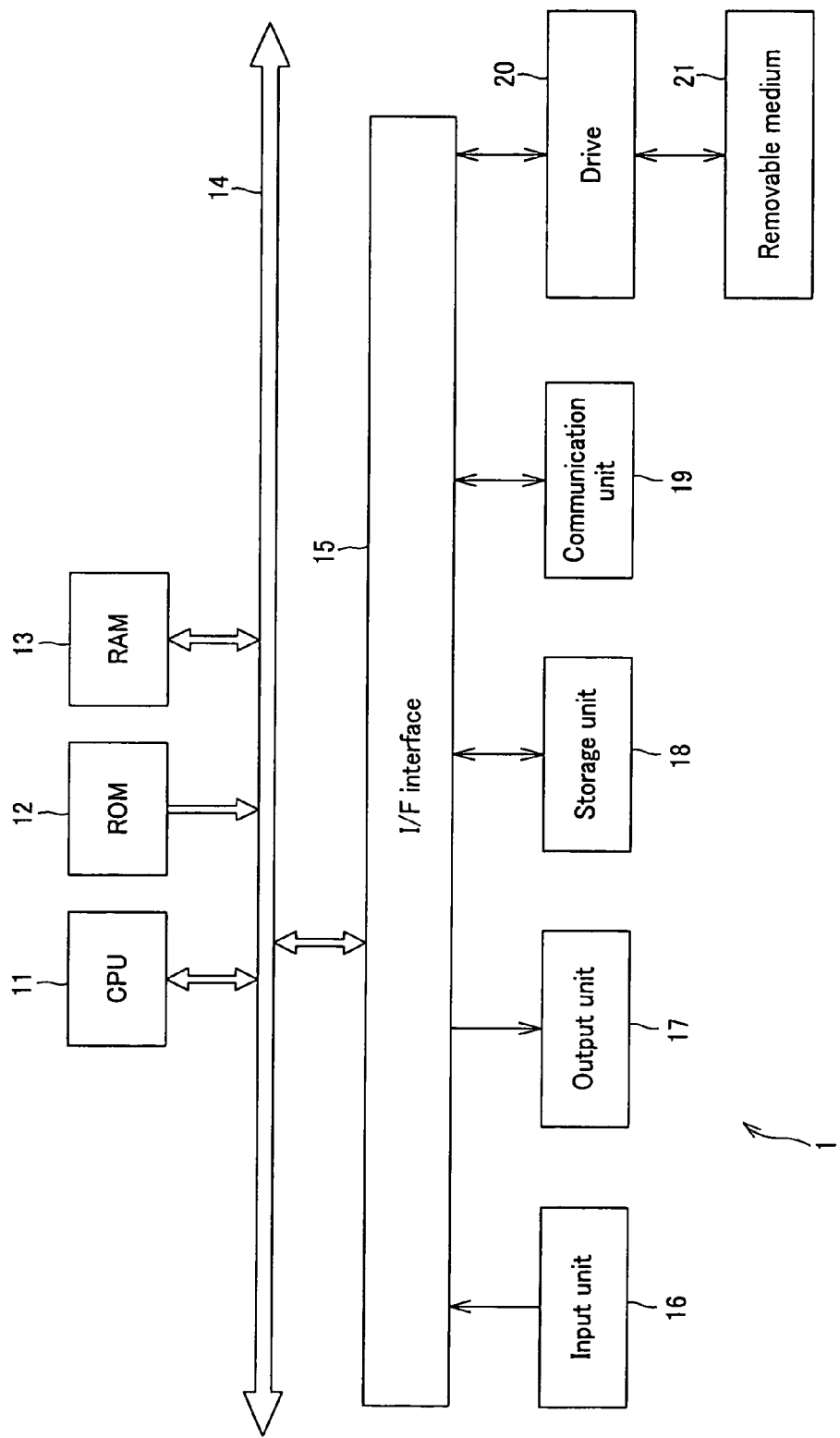
FIG. 2 is a schematic block diagram showing an example configuration of the PC (personal computer) including in the content providing system in FIG. 1.

FIG. 2 shows an example configuration of the hardware of the PC 1.

The PC 1 includes a CPU (central processing unit) 11 that executes various operations according to a program stored in a ROM (read-only memory) 12 or according to a program loaded from as storage unit 18 to a RAM (random-access memory) 13. The RAM 13 also stores data necessary for appropriate execution of the various operations by the CPU 11.

The CPU 11, ROM 12 and RAM 13 are connected to each other via a bus 14. Also, an input/output interface 15 is connected to the bus 14.

The input/output interface 15 has connected thereto an input unit 16 such as keyboard, mouse or the like, an output unit 17 including a display such as CRT (cathode ray tube), LCD (liquid crystal display) or the like, speaker and the like, a storage unit 18 formed from a hard disk or the like, and a communication unit 19 including a modem, terminal adapter or USB interface or the like. The communication unit 19 makes communications via the network 2 and USB cable.

The input/output interface 15 has also a drive 20 connected thereto as necessary. A removable medium 21 such as magnetic disk, optical disk, magneto-optical disk, semiconductor memory or the like is appropriately loaded in the drive 20, and a computer program read from any of the media is installed into the storage unit 18 as necessary.

Also, the content server 3 is also formed from a computer basically configured similarly to the PC 1 shown in FIG. 2. Therefore, the configuration shown in FIG. 2 will be referred to as that of the content server 3 as well in the following explanation.

Namely, as the CPU 11 executes various programs, the computer shown in FIG. 2 will function as the PC 1 shown in FIG. 1 or as the content server 3. In this case, the program may be pre-recorded in the ROM 12 and storage unit 18 as a recording medium incorporated in the computer shown in FIG. 2. Alternatively, the program may be stored (recorded) provisionally or permanently in the removable medium 21 such as magnetic disk, optical disk, magneto-optical disk, semiconductor memory or the like, and can be provided as so-called package software.

Note that the program may be installed from the aforementioned removable medium 21 into the computer shown in FIG. 2, and also installed into the computer shown in FIG. 2 by transferring from a downloading site to the computer shown in FIG. 2 by radio communication via a digital broadcasting satellite or by transferring to the computer shown in FIG. 2 by the cable communication via a LAN (local area network) or the network 2.

Figure 3:
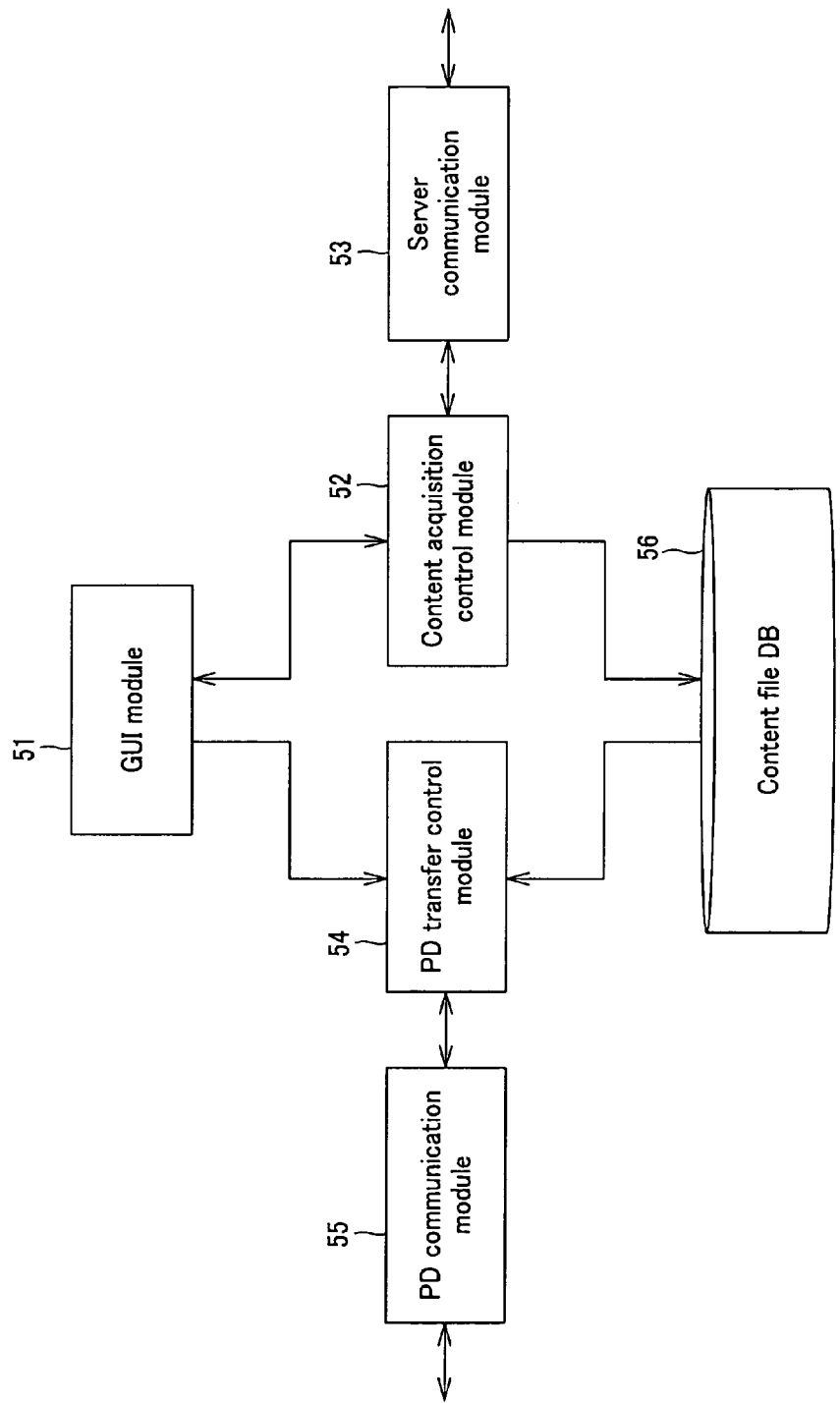
FIG. 3 is also a schematic block diagram showing an example functional configuration of the PC in FIG. 1.

FIG. 3 is a function block diagram showing an example configuration of the PC 1. Functional blocks shown in FIG. 3 are implemented by the CPU 11 in the PC 1 through execution of predetermined programs dedicated to the function blocks.

As will be seen from FIG. 3, a GUI (graphical user interface) module 51 is supplied with a user's operation via the input unit 16, supplies a command corresponding to the user's operation to a content acquisition control module 52 or PD transfer control module 54, and controls display, on a monitor included in the output unit 17, of an image or the like corresponding to view data supplied from the content server 3 via the content acquisition control module 52.

In response to a command supplied from the GUI module 51, the content acquisition control module 52 controls a server communication module 53 to access the content server 3. The content acquisition control module 52 supplies the GUI module 51 with view data supplied from the content server 3, and records a content file acquired from the content server 3 into a content file database (DB) 56.

The server communication module 53 accesses the content server 3 via the communication unit 19 and network 2, and supplies the content acquisition control module 52 with view data and content file supplied from the content server 3.

The PD (portable device) transfer control module 54 controls the PD communication module 55 in response to a command supplied from the GUI module 51 to send a content file recorded in the content file DB 56 to the PD 5.

The PD communication module 55 operates under the control of the PD transfer control module 54 to send a content file recorded in the content file DB 56 to the PD 5 via the communication unit 19 and a USB cable (not shown).

The content file DB 56 stores a content file including content data and its meta data acquired from the content server 3.

FIG. 4 shows an example configuration of the hardware of the PD 5. It should be noted that since components including CPU 111 through input/output interface 115 shown in FIG. 4 are basically configured similarly to the CPU 11 of the PC 1 through the input/output interface 15 shown in FIG. 2, so they will note be explained herein to avoid the repetition of the same explanation.

The input/output interface 115 has connected thereto a touch-panel type display 116 formed from the display screen 131 formed from an LCD (liquid crystal display) or the like and touch panel 132 laminated on the display screen 131, input unit 117 including buttons and the like provided on the surface of a housing of the PD 5, storage unit 119 including a hard disk, memory and the other, and a communication unit 120 including a network interface, radio communication interface, USB interface or the like and which makes communications via the network 2, radio communication or USB cable.

The input/output interface 115 has also a drive 121 connected thereto as necessary. A removable medium 122 such as magnetic disk, optical disk, magneto-optical disk, semiconductor memory or the like appropriately loaded in the drive 121, and a computer program read from the removable medium is installed into the storage unit 119 as necessary.

By executing various programs, the CPU 111 will perform predetermined functions of the PD 5 shown in FIG. 1. In this case, such programs may be pre-recorded in a ROM 112 and storage unit 119 as recording media incorporated in the PD 5. Alternatively, the programs may be provisionally or permanently stored (recorded) in the removable medium 121 such as magnetic disk, optical disk, magneto-optical disk, semiconductor memory or the like and provided as so-called package software.

Note that the program may be installed from the aforementioned removable medium 121 into the PD 5, and also installed into the PD 5 by transferring from a downloading site to the PD 5 by radio communication via a digital broadcasting satellite or by transferring to the PD 5 by the cable communication via a LAN (local area network) or the network 2.

Figure 5:
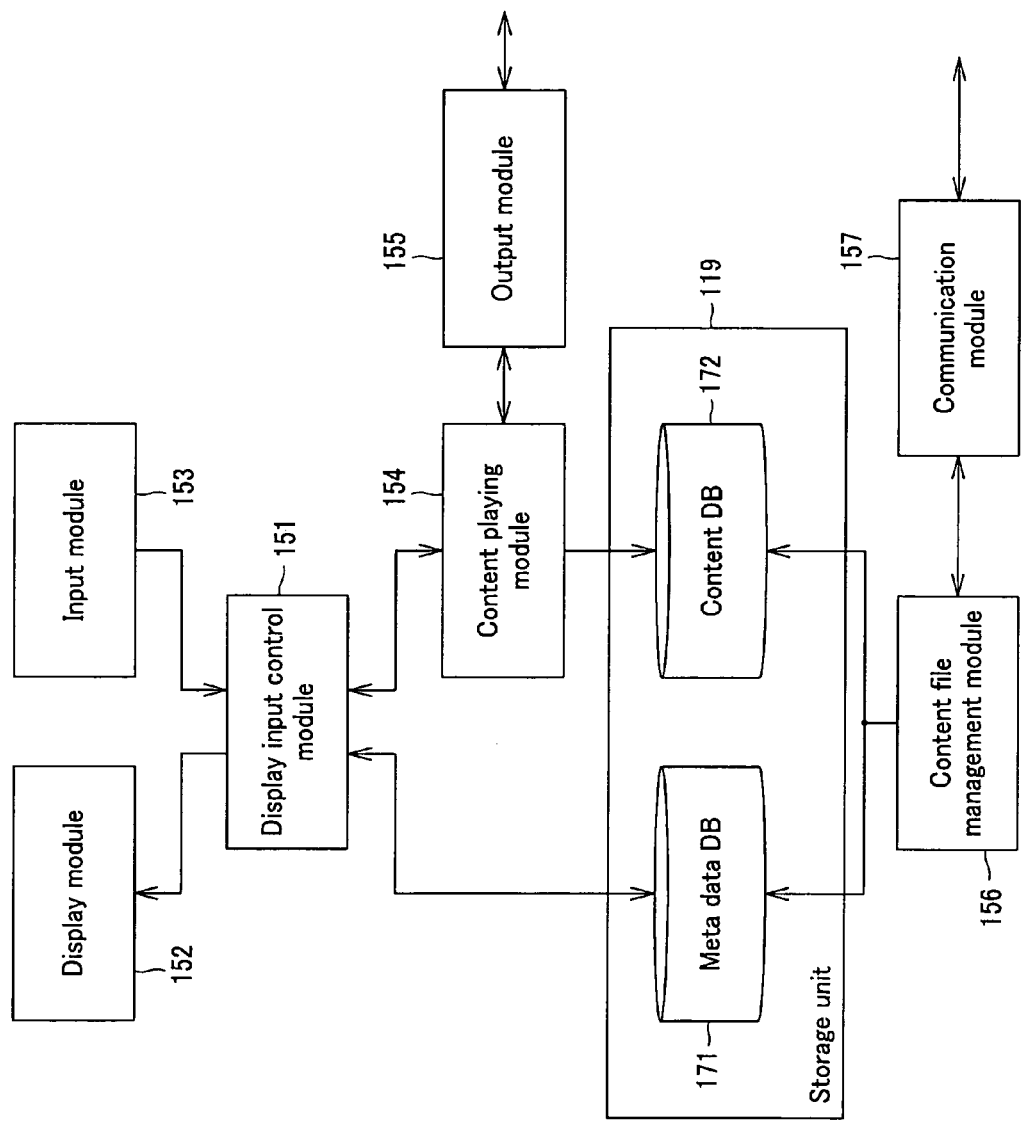
FIG. 5 is a schematic block diagram showing an example functional configuration of the PD in FIG. 1.

FIG. 5 is a block diagram showing an example configuration of the PD 5. Functional blocks shown in FIG. 5 are implemented by the CPU 111 in the PD 5 through execution of predetermined programs dedicated to the function blocks. It should be noted that in the example shown in FIG. 5, the storage unit 119 includes a meta data database (DB) 171 and content database (DB) 172.

In response to a user's operation supplied from an input module 153, a display input control module 151 generates content selection view data for selection of a content stored in the content database 172 on the basis of meta data stored in a meta data database 171 and controls a display module 152 to display a content selection view corresponding to the generated data on the display screen 131. Also, the display input control module 151 controls the content playing module 154 to play content data in response to a user's operation according to the content selection view, supplied from the input module 153.

The display module 152 controls the display screen 131 to display a content selection view corresponding to data supplied from the display input control module 151. The input module 153 supplies the display input control module 151 with a command corresponding to the user's operation made on the touch panel 132 laminated on the display screen 131.

A content playing module 154 plays content data stored in the content DB 172 under the control of the display input control module 151 and controls an output module 155 to output sound corresponding to the played content data. Also, the content playing module 154 informs the display input control module 151 of the end of the content data playing.

The output module 155 controls a speaker 118 to output sound corresponding to the content data played by the content playing module 154. It should be noted that in case the content data is video content data, the output module 155 controls the display screen 131 to display an image corresponding to the content data.

In the PD 5, a content file management module 156 separates a content file supplied from a communication module 157 into content data and meta data, and records the content data into a content DB 172 while recording the meta data into a meta data DB 171. Also, the content file management module 156 controls the communication module 157 to read content data from the content data DB 172 while reading meta data corresponding to the content data from the meta data DB 171, and send the data as a content file to the PC 1.

The communication module 157 receives and sends a content file from and to the PC 1 via the communication unit 120 and USB cable (not shown), and acquires a content file directly from the content server 3 via the communication unit 120 and network 2 or by radio communication.

The meta data DB 171 stores meta data corresponding to content data stored in the content DB 172. The content DB 172 stores content data such as music pieces and the like.

Note that although in the example shown in FIG. 5, the meta data DB 171 and content DB 172 are stored in the storage unit 119, they may be stored in the removable medium 122.

Figure 6:
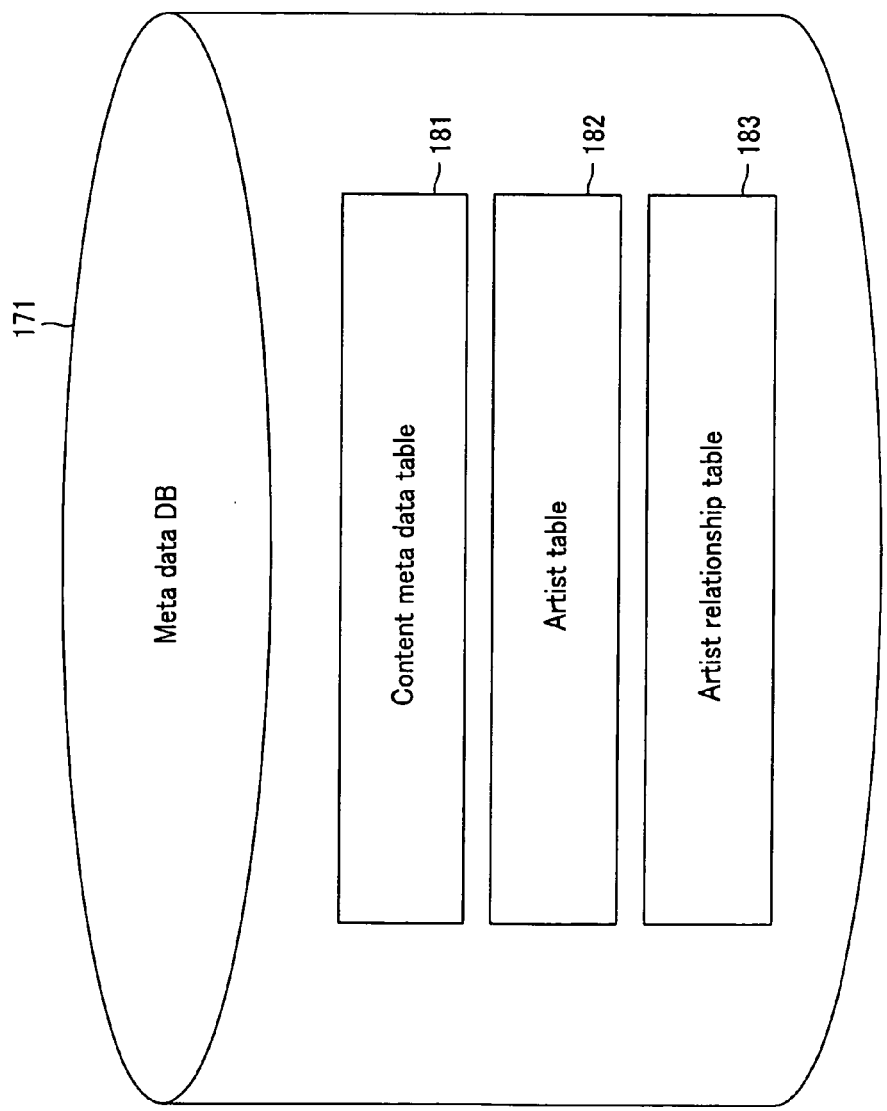
FIG. 6 schematically illustrates an example of the meta data database in the PD in FIG. 5.

FIG. 6 shows an example configuration of the meta data DB in FIG. 5.

In the example shown in FIG. 6, the meta data DB 171 includes a content meta data table 181, artist table 182, artist relationship table 183, etc.

The content meta data table 181 includes information on contents (music pieces) stored in the content DB 172, such as their names, identifiers, tempos, melodies, rhythms, genres, release dates (year, month, day), album names, ranking information, related-artist identifiers, etc. The ranking information includes ranking of content sales in the market, ranking of rating (users' access to the content server 3), etc.

Note that in case the contents are video contents, their program titles, movie titles, release dates (year), etc. are included in the content meta data DB 181, for example.

Further, in case a content is acquired from the content server 3 and recorded into the PD 5, the date of transfer (that is, transferred order list) may be recorded as content meta data into the content meta data table 181. At this time, a rating of the content, calculated by the user operating the touch panel 132 and input unit 117, may also be recorded as content meta data into the content meta data table 181. It should be noted that the rating may be calculated and recorded before or after listening to the content.

The artist table 182 includes information on an artist related to a content (that is, an artist playing or providing the content), such as his or her name, identifier, etc. corresponding to the content. It should be noted that the artist table 182 further includes the names of a composer, conductor, producer, director, etc. corresponding to the content.

The artist relationship table 183 has stored therein the relationship between artists as identifier of each of the artists. The artist relationship table 183 includes the relationship between artists in case an artist A is currently a member of an artist group B, in case the artist A was an member of the artist group B, in case the artist A is a successor of an artist C, in case the artist A provides music pieces to an artist D or in similar cases, for example.

FIG. 7 shows example configurations of the content meta data table, artist table and artist relationship table in FIG. 6.

In the example shown in FIG. 7, the content meta data table 181 includes a "content ID (identification)" as an identifier of a content, "Tempo" indicating a content speed (Bpm), "Major" indicating which the melody of the content is, minor or major, "RhythmRatio" indicating which the rhythm of the content is, percussive or quiet, "HiMid" indicating which the range of the content is, high (Hi) or low (Low), "Genre" indicating the music genre the content belongs to, "Date (year)" indicating a date (year) in which the content was released, "Ranking" indicating a ranking of the audience rate of the content, and "Artist ID" as an identifier of the artist related to the content.

More particularly, in the content meta data table 181, "Content ID" for a content A is "ID of content A", "Tempo" is "115", "Major" is "−13", "RhythmRatio" is "40", "HiMid" is "25", "Genre" is "Rock", "Date" is "1983", "Ranking" is "130" and "Artist ID" is "ID of content A". "Content ID" for a content B is "ID of content B", "Tempo" is "150", "Major" is "32", "RhythmRatio" is "42", "HiMid" is "62", "Genre" is "Pops", "Date" is "1999", "Ranking" is "5" and "Artist ID" is "ID of artist A". "Content ID" for a content C is "ID of content C", "Tempo" is "131", "Major" is "36", "RhythmRatio" is "5", "HiMid" is "−11", "Genre" is "Rock", "Date" is "2002", "Ranking" is "20" and "Artist ID" is "ID of artist A".

Also, "Content ID" for a content D is "ID of content D", "Tempo" is "84", "Major" is "25", "RhythmRatio" is "9", "HiMid" is "31", "Genre" is "Rock", "Date" is "1983", "Ranking" is "53" and "Artist ID" is "ID of artist B". "Content ID" for a content E is "ID of content E", "Tempo" is "161", "Major" is "36", "RhythmRatio" is "4", "HiMid" is "6", "Genre" is "Pops", "Date" is "1994", "Ranking" is "256" and "Artist ID" is "ID of artist B".

Further, "Content ID" for a content F is "ID of content F", "Tempo" is "178", "Major" is "51", "RhythmRatio" is "16", "HiMid" is "11", "Genre" is "Jazz", "Date" is "1935", "Ranking" is "5" and "Artist ID" is "ID of artist C". "Content ID" for a content G is "ID of content G", "Tempo" is "184", "Major" is "32", "RhythmRatio" is "13", "HiMid" is "46", "Genre" is "Pops", "Date" is "2004", "Ranking" is "122" and "Artist ID" is "ID of artist C".

The artist table 182 includes "Artist ID" as an identification of an artist and "Artist's name".

More specifically, in the artist table 182, the name of an artist whose ID is "ID of artist A" is "Artist A", the name of an artist whose ID is "ID of artist B" is "Artist B", the name of an artist whose ID is "ID of artist C" is "Artist C", the name of an artist whose ID is "ID of artist D" is "Artist D", and the name of an artist whose ID is "ID of artist E" is "Artist E".

The artist relationship table 183 includes "Artist ID" and "Related-artist ID" as an identifier of an artist related to the artist having the "Artist ID".

More specifically, in the artist relationship table 183, the ID of an artist having an relationship with an artist having the "ID of artist A" is "ID of artist B", and the IDs of artists having an relationship with an artist having the "ID of artist B" are "ID of artist C" and "ID of artist D".

Also, the ID of an artist having an relationship with an artist having the "ID of artist C" is "ID of artist G", the ID of an artist having an relationship with an artist having the "ID of artist D" is "ID of artist A", and the ID of an artist having an relationship with an artist having the "ID of artist E" is "ID of artist C".

Note that a degree of the relationship among the artists may be stored for each of them.

Figure 8:
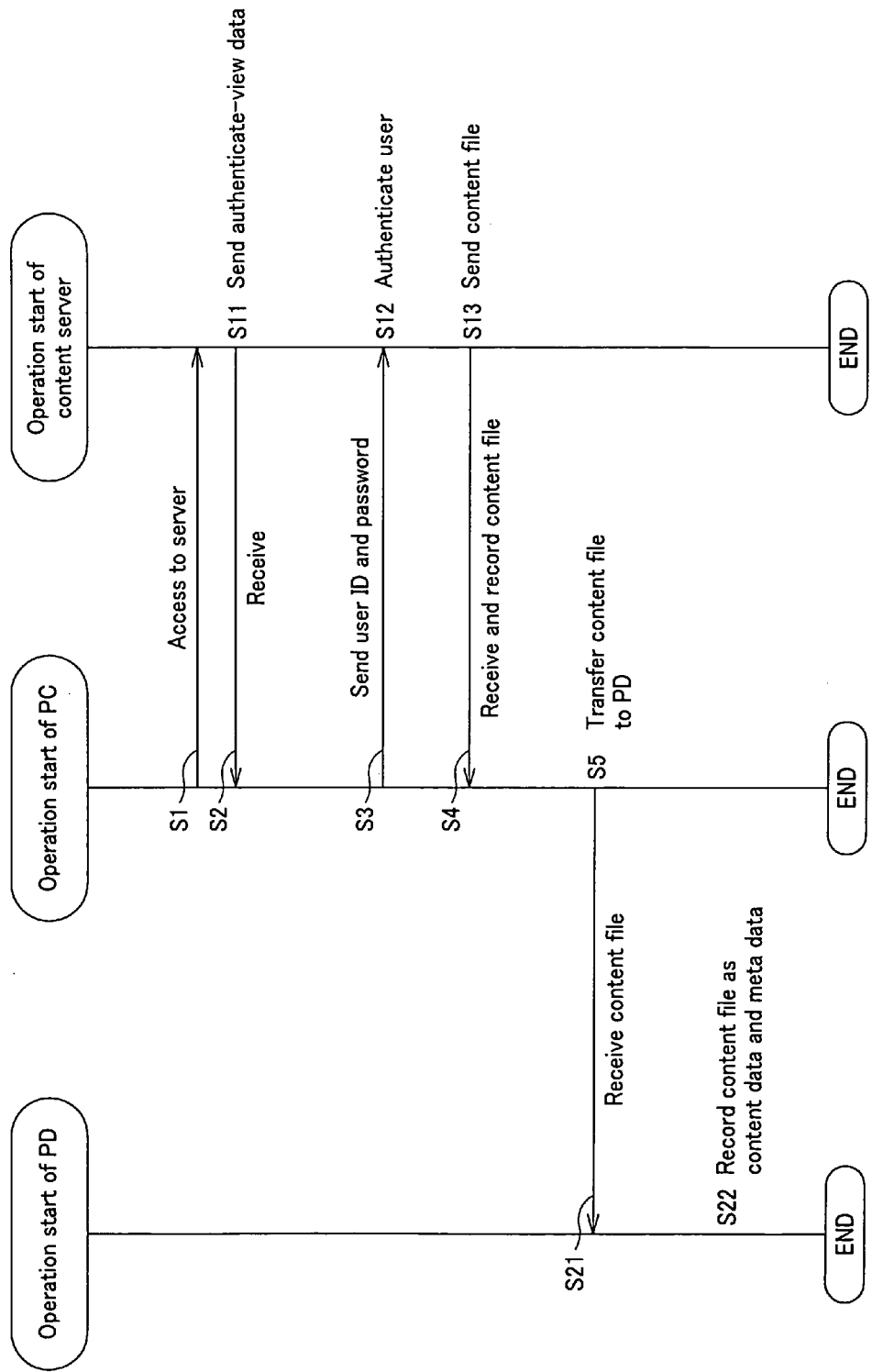
FIG. 8 shows a flow of operations made in the content providing system in FIG. 1.

Next, there will be explained with reference to a flow diagram in FIG. 8 example operations made in the content providing system in FIG. 1, with which the PC 1 acquires a content file from the content server 3 and records it into the PD 5.

For example, the user having the PD 5 connects the PD 5 to the PC 1 via a USB cable (not shown), and operates a mouse included in the input unit 16 of the PC 1 to enter a command for access to the content server 3.

The GUI module 51 of the PC 1 is supplied with a user's operation via the input unit 16 and supplies a command corresponding to the user's operation to the content acquisition control module 52. In step S1, the content acquisition control module 52 controls, in response to the command from the GUI module 51, the server communication module 53 to access the content server 3. The server communication module 53 accesses the content server 3 via the communication unit 19 and network 2.

Upon acceptance of the access from the PC 1, the communication unit 19 of the content server 3 goes to step S11 in which it will send, under the control of the CPU 11, authentication view data for making a request for a pre-recorded user ID (identification) and password via the network 2 in order to use the content providing system.

In step S2, the server communication module 53 of the PC 1 receives the authentication view data from the content server 3 via the communication unit 19 and network 2, and supplies the authentication view data thus received to the GUI module 51 via the content acquisition control module 52. The GUI module 51 displays, on the display screen 17, an authentication view corresponding to the authentication view data supplied from the content acquisition control module 52. The user uses, according to the authentication view displayed on the display screen 17, the mouse or the like included in the input unit 16 to make input of the user ID and password.

The GUI module 51 is supplied with a user's operation via the input unit 16, and supplies the received user ID and password to the content acquisition control module 52. In step S3, the content acquisition control module 52 controls the server communication module 53 to send the user ID and password supplied from the GUI module 51 to the content server 3. The server communication module 53 sends the user ID and password to the content server 3 via the communication unit 19 and network 2.

The communication unit 19 of the content server 3 receives the user ID and password from the PC 1 and supplies them to the CPU 11. In step S12, the CPU 11 authenticates the user of the PC 1 on the basis of the user ID and password received by the communication unit 19, and goes to step S13 where it will control the communication unit 19 to send various content files stored in the content file DB 4 via the network 2.

In step S4, the server communication module 53 of the PC 1 receives a content file from the content server 3 via the communication unit 19 and network 2, and supplies the received content file to the content acquisition control module 52 for recording into the content file DB 56.

After the content file is recorded in the content file DB 56, the user uses the mouse or the like included in the input unit 16 of the PC 1 to provide a command for transferring the recorded content file to the PD 5 connected to the PC 1.

The GUI module 51 of the PC 1 is supplied with a user's operation via the input unit 16, and supplies a command corresponding to the user's operation to the PD transfer control module 54. In step S5, the PD transfer control module 54 reads a content file from the content file DB 56 in response to the command from the GUI module 51, and controls the DB communication module 55 to transfer the read content file to the PD 5. The PD communication module 55 transfers the content file to the PD 5 via the communication unit 19 and USB cable.

In step S21, the communication module 157 of the PD 5 receives the content file from the PC 1 via the USB cable and communication unit 120, supplies the received content file to the content file management module 156, and then goes to step S22.

In step S22, the content file management module 156 acquires content data and meta data of the content file from the PC 1, supplied from the communication module 157, and records the content data thus acquired into the content DB 172 while recording the acquired meta data into the meta data DB 171.

Note that at this time, a history (transferred order list) of recording of the content data into the content DB 172 and a rating of the content are also recorded in the meta data DB 171.

Since a content file stored in the content file DB 4 of the content server 3 is recorded as content data and meta data into the PD 5 as above, the user can select a content from the content data recorded in the PD 5 and listen to the content data in the selected content.

Note that the removable medium 122 having these content files pre-recorded therein may be loaded in the PD 5 for utilization of the content files.

Next, there will be explained the function to display a content selection view for selection of a content from among contents recorded in the PD 5 as above.

In the PD 5, the content selection view is adapted to take any of three forms including a Map view, Play List view and Jump view.

In the Map view, a play list including at least one content is assigned to a grid in a two-dimensional map of two axes of predetermined content meta data. The Map view is adapted to appear in a plurality of display modes different in meta data as an axis from each other. By selecting a grid in the map appearing in the Map view with the user's finger or a touch pen, the user can play a content included in a play list assigned to the selected grid.

The Play List view is to display a list of contents included in the play list. The Play List view has a plurality of display modes in which a play list selected in another view is displayed, a play list showing a played order list is displayed and in which a play list registered by the user is displayed. With the user's finger or touch pen, the user can select a content name in the play list displayed in the play list and play a content corresponding to the content name.

The Jump view is to display a link table in which there are shown an artist selected by the user and relationship with artists related with the selected artist. With the user's finger or a touch pen, the user can select an icon in the link table displayed in the Jump view and check the relationship between the artists assigned to the icon.

These content selection views are changed from one to another. In response to a user's operation, a selection is made among the content selection views. In this case, selected order list (play list information and artist information) etc. are inherited from a content selection view to a next one. It should be noted that the configurations of the Map, Play List and Jump views will be explained in detail later.

Figure 9:
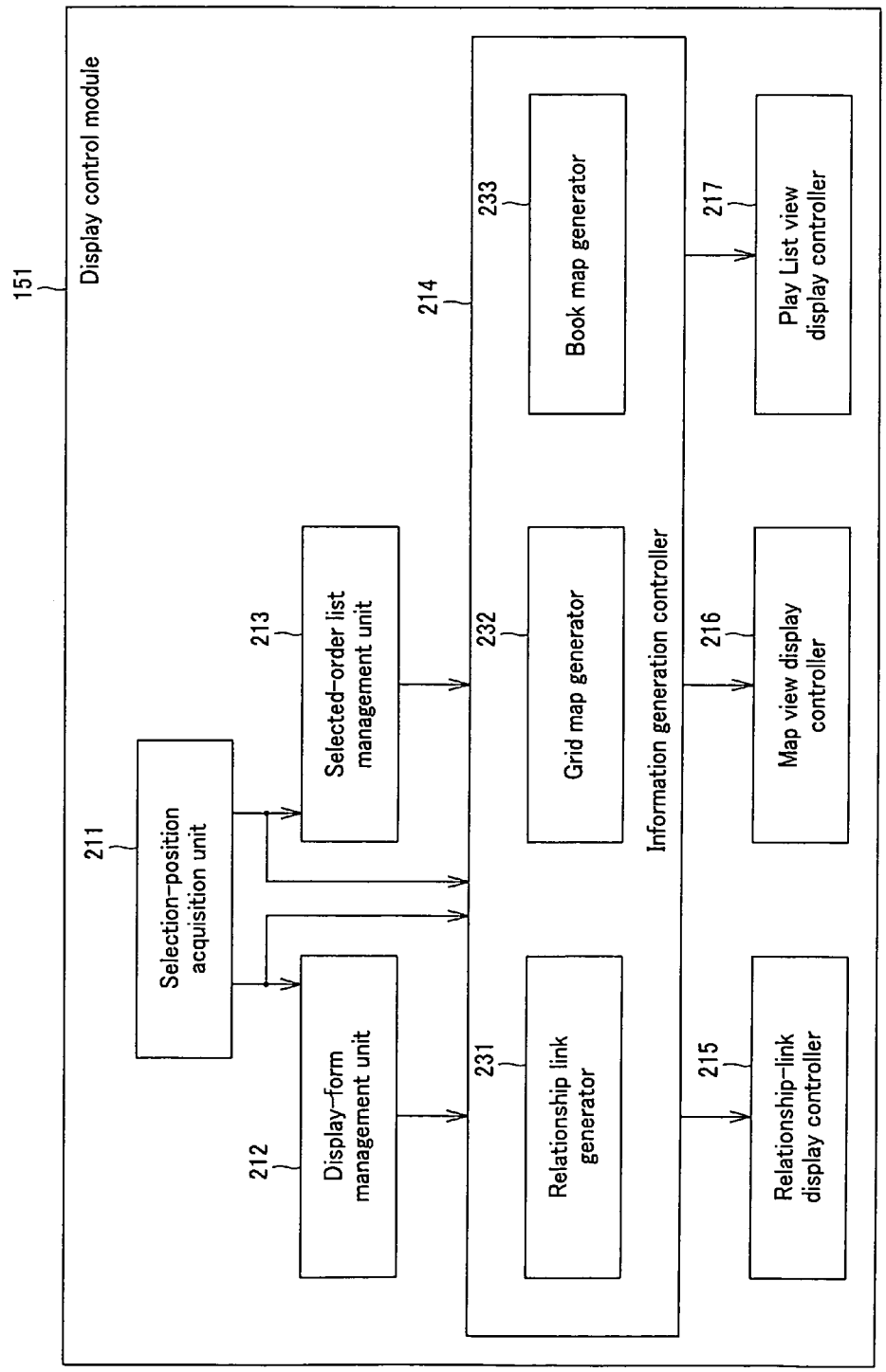
FIG. 9 is a schematic block diagram of an example of the display input control module in the PD in FIG. 5.

FIG. 9 shows, in detail, an example configuration of the display input control module 151 in FIG. 5.

The display input control module 151 in FIG. 9 includes a selection-position acquisition unit 211, display-form management unit 212, selected-order list management unit 213, information generation controller 214, relationship-link display controller 215, Map view display controller 216 and a Play List view display controller 217.

The selection-position acquisition unit 211 acquires selection-position information from a command corresponding to a user's operation supplied from the input module 153, judges what the content of the user's command is on the basis of the acquired selection-position information, has either the display-form management unit 212 or selected-order list management unit 213 store selection information correspondingly to the result of judgment, and controls the information generation controller 214 to control the display correspondingly to the user's command.

That is, in case the user's command is information on a display form (display view and display mode), the selection-position acquisition unit 211 stores display-form information into the display-form management unit 212, and controls the information generation controller 214 to control the display correspondingly to the display-form information. Also, in case the user's command designates selection information in the content selection view, the selection-position acquisition unit 211 controls the selected-order list management unit 213 to store the selection information in each content selection view, and controls the information generation controller 214 to control the display correspondingly to the selection information.

The display-form management unit 212 is controlled by the selection-position acquisition unit 211 to set and manage a display mode of the content selection view (display view and display mode). That is to say, the display-form management unit 212 manages a preceding set display form and current one and provides information on the display form being managed to the information generation controller 214.

The selected-order list management unit 213 manages selected order information such as items (icon and grid) displayed in the content selection view, and updates the selected order information under the control of the selection-position acquisition unit 211.

The selected-order list management unit 213 has stored therein, for example, selected order information on an icon selected in the Jump view, dragged order list of grids having been dragged in the Map view, selected order list (played order list) on a grid dragged and then released in the Map view, etc. It should be noted that in this case, the played order list of a content itself in the play list is managed by each of a relationship link generator 231, grid map generator 232 and bookmark generator 233, each of which generates a play list.

The information generation controller 214 incorporates the relationship link generator 231, grid map generator 232 and bookmark generator 233, and controls them to generate information in each content selection view (play list, related-artist information, grid information or the like).

Also, the information generation controller 214 is controlled by the selection-position acquisition unit 211 to have a corresponding one of the relationship-link display controller 215, Map view display controller 216 and Play List view display controller 217 generate content selection view data, and controls the relationship link generator 231, grid map generator 232 or bookmark generator 233 as necessary to supply information on a content included in a play list corresponding to the selection-position information to the content playing module 154.

Referring to the artist relationship table 183, the relationship link generator 231 generates related-artist information related to an artist. Also, referring to the content meta data table 181 and artist table 182, the relationship link generator 231 acquires content information corresponding to the selected artist and generates a play list. Also, based on the selection-position information supplied from the information generation controller 214, the relationship link generator 231 supplies a content included in a play list corresponding to the selected artist to the content playing module 154 and instructs the latter to play corresponding content data.

The grip map generator 232 refers to the content meta data table 181 and artist table 182 correspondingly to the display mode, generates a play list of contents corresponding to grids in a map displayed in the Map view, and generates grid information correspondingly to the play list thus generated. Also, the grid map generator 232 supplies the content playing module 154 with contents included in a play list corresponding to a grid on the basis of selection-position information supplied from the information generation controller 214, and instructs the content playing module 154 to play corresponding content data and content data for listening.

The bookmark generator 233 generates information on a content corresponding to a user's operation and adds it to a bookmark play list. The bookmark generator 233 supplies a content based on the selection-position information from the information generation controller 214 to the content playing module 154 and instructs the latter to play corresponding content data.

The relationship-link display controller 215 generates Jump view data on the basis of the information generated by the relationship link generator 231 and an artist selected in the Jump view where it has been displayed in the past, and supplies the Jump view data thus generated to the display module 152. Also, the relationship-link display controller 215 is controlled by the information generation controller 214 to generate view data for an animation (moving picture, frame-advance image or the like) in which the Jump view fades out and view data for an animation showing a jump to the Jump view that corresponds to the selected artist.

The Map view display controller 216 generates Map view data correspondingly to grip information, dragged order list or played order list generated by the grip map generator 232 correspondingly to the display mode supplied from the information generation controller 214, and supplies the Map view data thus generated to the display module 152. Also, the Map view display controller 216 generates, from the Map view, view data for an animation showing a jump to the Jump view or Play List view.

Referring to a play list in the relationship link generator 231, grid map generator 232 or bookmark generator 233, the Play List view display controller 217 generates Play List view data, and supplies the Play List view data thus generated to the display module 152. Also, the Play List view display controller 217 is controlled by the information generation controller 214 to generate view data for an animation in which a Play List view fades out.

Figure 10:
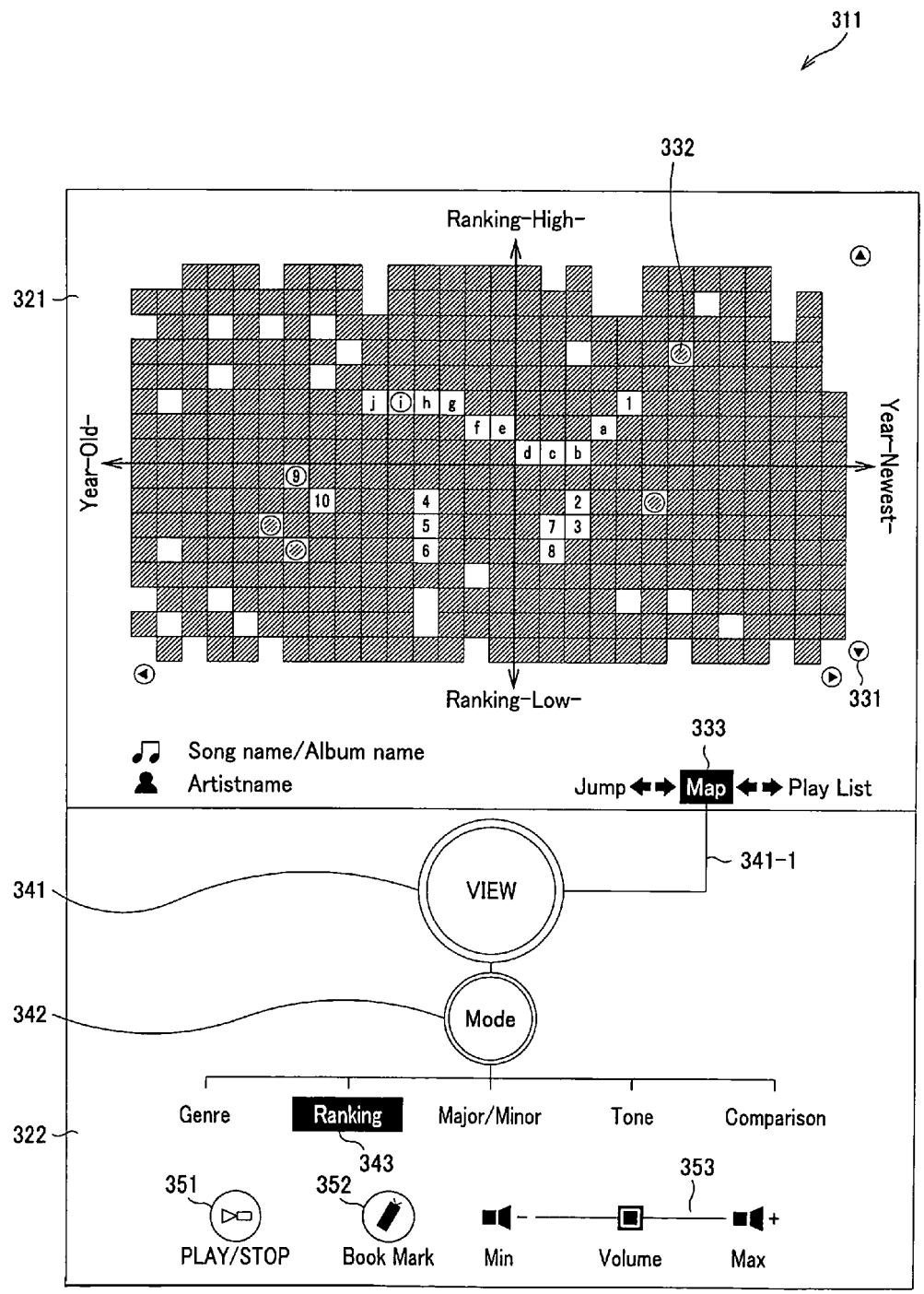
FIG. 10 illustrates an example configuration of a Map view as a content selection view.

FIG. 10 shows an example configuration of a Map view as a content selection view.

As shown, a Map view 311 includes a map window 321 and control/setting window 322. In the example shown in FIG. 10, there is displayed the map window 321 having a state of display when the Map view 311 is in a Ranking mode of display. It should be noted that the Map view 311 has modes such as Genre, Major/Minor, Tone and Comparison in addition to the Ranking mode, which will be explained in detail later.

In the map window 321, there are displayed a two-dimensional map of which two axes are a Ranking and Year of content meta data, respectively.

At the lower left of the map, there are displayed, in juxtaposition, a note icon and the name of a content being played (or the name of an album including the content being played) as "Song name/Album name". Below the content name, there are displayed, in juxtaposition, a human-shaped icon and the name of an artist of the content being played as "Artist name".

At the lower right of the map, there are displayed characters "Jump", "Map" and "Play List" indicating a Jump view, Map view and Play List view, respectively, of the content selection views. A cursor 333 displayed on "Map" means that a Map view is currently displayed in the map window 321. When the characters "Jump", "Map" or "Play List" in the map window 321 is pressed directly by the user or when a VIEW button 341 in the control/setting window 322 is pressed by the user, the view will be changed from one to another and the cursor 333 be displayed on the corresponding characters "Jump", "Map" or "Play List".

Next, a map displayed in the map window 321 in FIG. 10 will be explained in detail.

Of the map, the vertical axis indicates the ranking, as content meta data (achieved sales in the market, for example), of a content and the horizontal axis indicates the release date (Year), as content meta data, of the content. The Ranking is higher (High) as it goes up in the drawing and lower (Low) as it goes down in the drawing. The Year is newer (Newest) as it goes rightward in the drawing and older (Old) as it goes leftward in the drawing.

The map is formed from a plurality of grids defined by parameters within predetermined ranges of axes. In the map, each of the hatched grids or grids each with an alphanumeric has assigned thereto a play list including at least one content having parameters within certain ranges along the vertical axis (ranking) and horizontal axis (year), respectively. That is, contents whose ranking and release date (year) are within certain ranges are assigned to the same grid, and there is generated a play list including the assigned contents. It should be noted that the ranges of parameters to which one grid corresponds are set such that the grid has a sufficiently large size for the grid to be selectable with a touch pen or user's finger.

In case only one content is assigned to one grid, for example, a larger number of grids will be necessary. For displaying so many grids in one view, the grid should be smaller. If the grids are smaller, they will not be easy to discern and each grid will not easily be singly selectable with the user's finger or touch pen.

Therefore, at least one of contents having parameters within the same range is assigned to one grid as above, which permits to discern grids displayed in the map window 321 and to form the grids to have a sufficiently large size for the grids to easily be selectable with a touch pen or user's finger. Also, even in case the display screen as in the PD 5 is small, a possible large number of grids can be displayed in one view.

Note that if all grids are not able to be displayed in one view even in case at least one content having a parameter within a certain range is assigned to a grid, arrows 331 are displayed to indicate a direction which grids which can be displayed exist.

Further, contents in a play list assigned to one grid (that is, contents assigned to one grid) are ordered in priority according to parameters or the like of predetermined content meta data. For example, contents in a play list assigned to one grid are set in descending order according to their years of release, ranking, alphabetic order of their names. Thus, in case a grid is selected and a content in the assigned play list is played or a play list is displayed in a Play List view, contents are played or displayed in the order of their priorities.

Note that the above ordering in priority may be set for each display mode or the same ordering may be applied irrespectively of any display mode.

A round grid 332 indicated with a small circle in the map means that a play list assigned to the round grid 332 includes contents of an artist selected by the user in the Jump view having previously been displayed.

Namely, selected order information (selected-artist icon) in the Jump view is also displayed in the Map view. Thus, the user can select a desired one of the artists displayed in the Jump view, and thereafter can check at which grid contents of the selected desired artist are displayed in the Map view by changing the content selection view to the Map view.

In this case, the ordering in priority of contents included in a play list assigned to a round grid 332 is set such that the highest priority will be given to the contents of an artist having been selected by the user in the Jump view.

As above, the round grid 332 indicates the existence of selected order information inherited from the other content selection view (Jump view). However, such an existence may discernibly be indicated with any figure formed otherwise (triangular, square or the like). The selected order information inherited from the Jump view may be indicated with a flickering grid or with at least any of a form, color, brightness and luminosity different from those of other grids.

Note that both a round grid with a letter "i" and round grid with a number "9" indicate that they has assigned thereto contents of an artist selected by the user, similarly to the round grid 332. That is, the round grid with the letter "i" indicates that it has assigned thereto a sequence of dragged order list which will be explained in detail later and contents of a selected artist, and the round grid with the number "9" indicates that it has assigned thereto the sequence of dragged order list which will be explained in detail later and the contents of the selected artist.

The grids designed as above are selected only when the user's finger or touch pen in touch with the touch panel 132 is released in an appropriate position on the touch panel 132. Then, the contents in the play list assigned to the selected grid are played in an order of priorities given to the contents.

On the other hand, in case the user's finger or touch pen is dragged in touch with the touch panel 132 in the map window 321, the PD 5 will determine that the grid (play list) is still an option. It should be noted that the grid detected to be in touch with the touch pen or user's finger having thus been dragged in contact with the touch panel 132 will also be referred as "dragged grid" hereunder and the grid from which the touch per or user's finger has been released will be referred to as "selected grid" hereunder.

Numbers "1" to "10" in the grids on the map mean that a content in a play list assigned to each of the grids has recently been selected and played, and such grids are displayed in a color different from that of other hatched grids. The grid-carried numbers "1" to "10" indicate a descending order in which play lists assigned to the grids have been played and also a descending order in level of brightness at which the grids have been displayed.

More specifically, the grid-carried number "1" indicates that a content assigned to the grid with the number "1" is currently being played, and the grid itself is displayed with a brightness higher than that of the other grids. Also, the grid-carried number "2" indicates that a content assigned to the grid with the number "2" has been played one grid before the content assigned to the grid with the number "1", and the grid itself is displayed with a brightness lower than that of the grid with the number "1". The grid-carried number "3" indicates that a content assigned to the grid with the number "3" has been played two grids before the content assigned the grid with the number "2", and the grid itself is displayed with a brightness lower than that of the grid with the number "2".

Since the above explanation is also true with the grids with the numbers "4" to "10", it will not be repeated with these grids. It should be noted that although only the grids carrying the played-order numbers "1" to "10" are displayed in the example shown in FIG. 10, the number of grids each with the played-order number is not limited to "10".

Also, as long as the indication of a played order of contents is different from one grid to another and the played order is discernible by the user, the grid color and brightness may not be changed from one grid to another as above but the luminosity may be set different from one grid to another, degree of flickering may be set different from one grid to another or the grids may be shaped different from one to another. Alternatively, the numbers "1" to "10" referred to in the above explanation may be displayed as they are on the grids to indicate the played order of contents assigned to the grids, respectively. Further, grids in the played order list may be displayed to be connected to each other with lines such as straight line, curved line or arrow in their played order. It should be noted that the type, shape and color of such lines are not limited to any specific ones.

Letters "a" to "j" on grids indicate that the user's finger or touch pen has been dragged in touch on the touch panel 132 to positions corresponding to the grids (namely, the grids are taken as options but not yet selected and thus any of contents assigned to the grids has not yet been played). These grids are displayed in a color different from those of other hatched grids and the aforementioned grids carrying the numbers indicating the played order. The letters "a" to "j" indicate a new descending order of the grids to which the user's finger or touch pen has been dragged in touch with the touch panel 132, and also a descending alphabetic order in level of brightness with which the grids are displayed. It should be noted that the brightness of the other grids to which the touch pen or user's finger dragged as above is set lower in level than the brightness set for the grid carrying the number "1" and having assigned thereto a content being played.

More specifically, the letter "a" carried by a grid indicates that the touch pen or user's finger has been dragged in touch with the touch panel 132 to a position corresponding to the grid more early than the grid with the number "1", and the grid itself with the letter "a" is displayed in a color different from that of the grid with the number "1" and with a brightness lower than that of the grid with the number "1". Also, the letter "b" carried by a grid indicates that the user's finger or touch pen has been dragged in touch with the touch panel 132 to a position corresponding to the grid more early than the grid with the number "a", and the grid itself with the letter "b" is displayed with a brightness lower than that of the grid with the letter "a" and in the same color as that of the grid with the letter "a".

Similarly, the letter "c" carried by a grid indicates that the user's finger or touch pen has been dragged in touch with the touch panel 132 to a position corresponding to the grid more early than the grid with the number "b", and the grid itself with the letter "c" is displayed with a brightness lower than that of the grid with the letter "b" and in the same color as that of the grid with the letter "b".

Since the above explanation is also true with the grids with the numbers "d" to "j", it will not be repeated with these grids. It should be noted that although only the grids carrying the played-order numbers "a" to "j" are displayed in the example shown in FIG. 10, the number of grids each with the dragged order is not limited to "10".

Also, as long as the indication of dragged order is different from one grid to another and the dragged order is discernible by the user as in the played order list, the grid color and brightness may not be changed from one grid to another as above but the luminosity may be set different from one grid to another, degree of flickering may be set different from one grid to another or the grids may be shaped different from one to another. Alternatively, the numbers "1" to "10" may be displayed on the grids to indicate the dragged order of contents. Further, grids in the dragged order list may be displayed to be connected to each other with lines such as straight line, curved line or arrow in their dragged order. It should be noted that the type, shape and color of such lines are not limited to any specific ones.

Since a map formed from grids classified based on a ranking and year of release as parameters within a predetermined range is displayed in the map window 321 as above, the user wanting to listen to high-ranked and early released contents can easily select and listen to a content being in a desired ranking and having been released in a desired year by selecting, with his or her finger or touch pen, a grid displayed in the upper left portion (fourth quadrant) of the map.

As shown in FIG. 10, the control/setting window 322 of the Map view 311 has displayed therein a VIEW button 341, Mode button 342, PLAY/STOP button 351, Book Mark button 352 and a Volume key 353.

The VIEW button 341 is provided to change the content selection view from the Map view 311 to a Jump or Play List view. By pressing the VIEW button 341 with his finger or a touch pen, the user can change a display view and move the cursor 333 displayed on the "Jump, Map, Play List" on the map window 321 and a line 341-1 displayed to connect the cursor 333 and VIEW button 341 to each other. In the example shown in FIG. 10, the line 341-1 is displayed to connect the cursor 333 on "Map" and VIEW button 341 to each other.

The Mode button 342 is provided to change the display mode of the Map view 311, that is, a map displayed in the map window 321. By pressing the Mode button 342 with his finger or a touch pen, the user can change the map displayed in the map window 321 from one to another and move a cursor 343 onto a legend indicating display modes "Genre", "Ranking", "Major/Minor", "Tone" or "Comparison" to the position of a legend corresponding to a selected mode. The legend on which the cursor 342 stays will be highlighted. In FIG. 10, since the display mode is the "Ranking" mode, the cursor 343 is on the legend "Ranking".

Note that also pressing directly each legend indicating a display mode allows the display mode to change, the map displayed on the map window 321 to change and the cursor 343 to move to another position.

The PLAY/STOP button 351 is provided to give a command for start or stop of content playing. The Book Mark button 352 is provided to record information in a content being played as a bookmark. The Volume key 353 is provided to set a volume of sound from the speaker 118.

Figure 13:
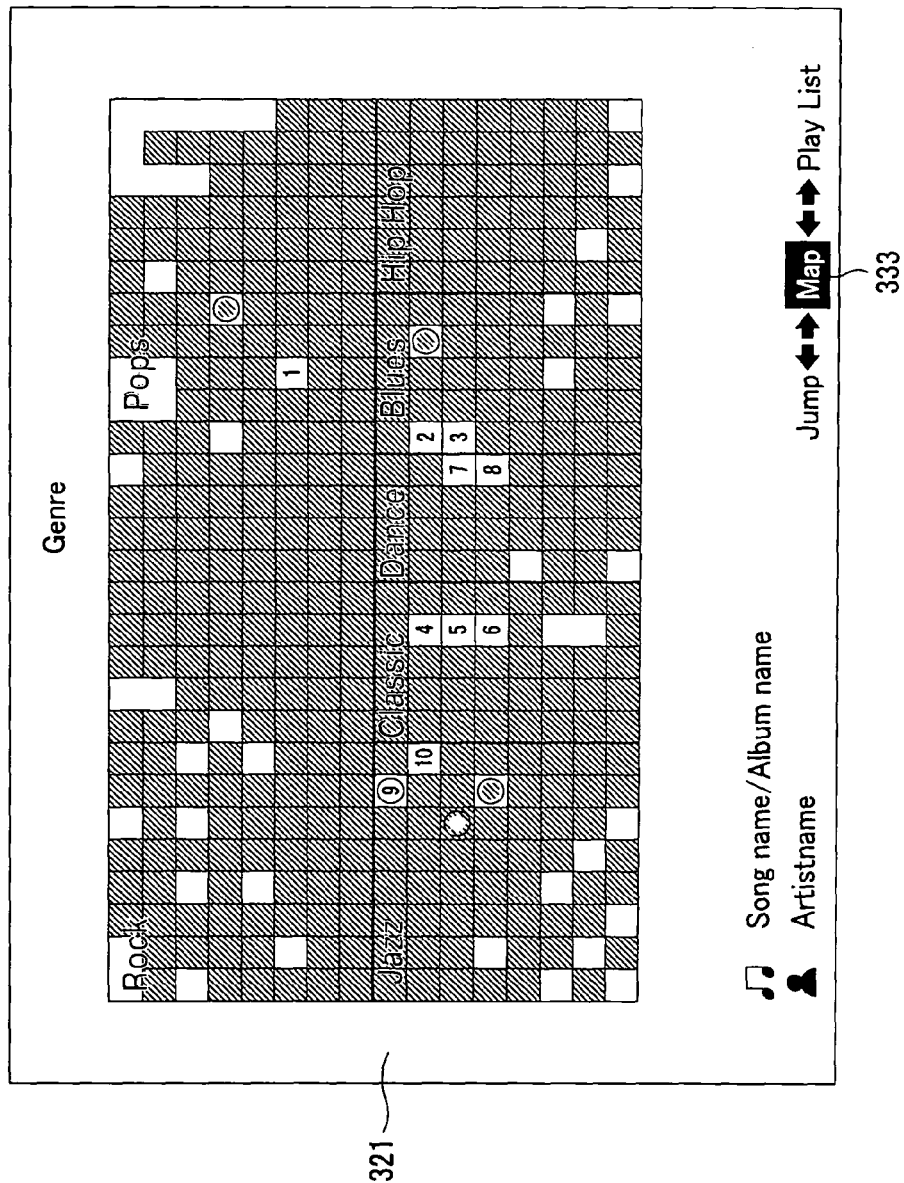
FIG. 13 illustrates another example configuration of the Map view in FIG. 10.
Figure 29:
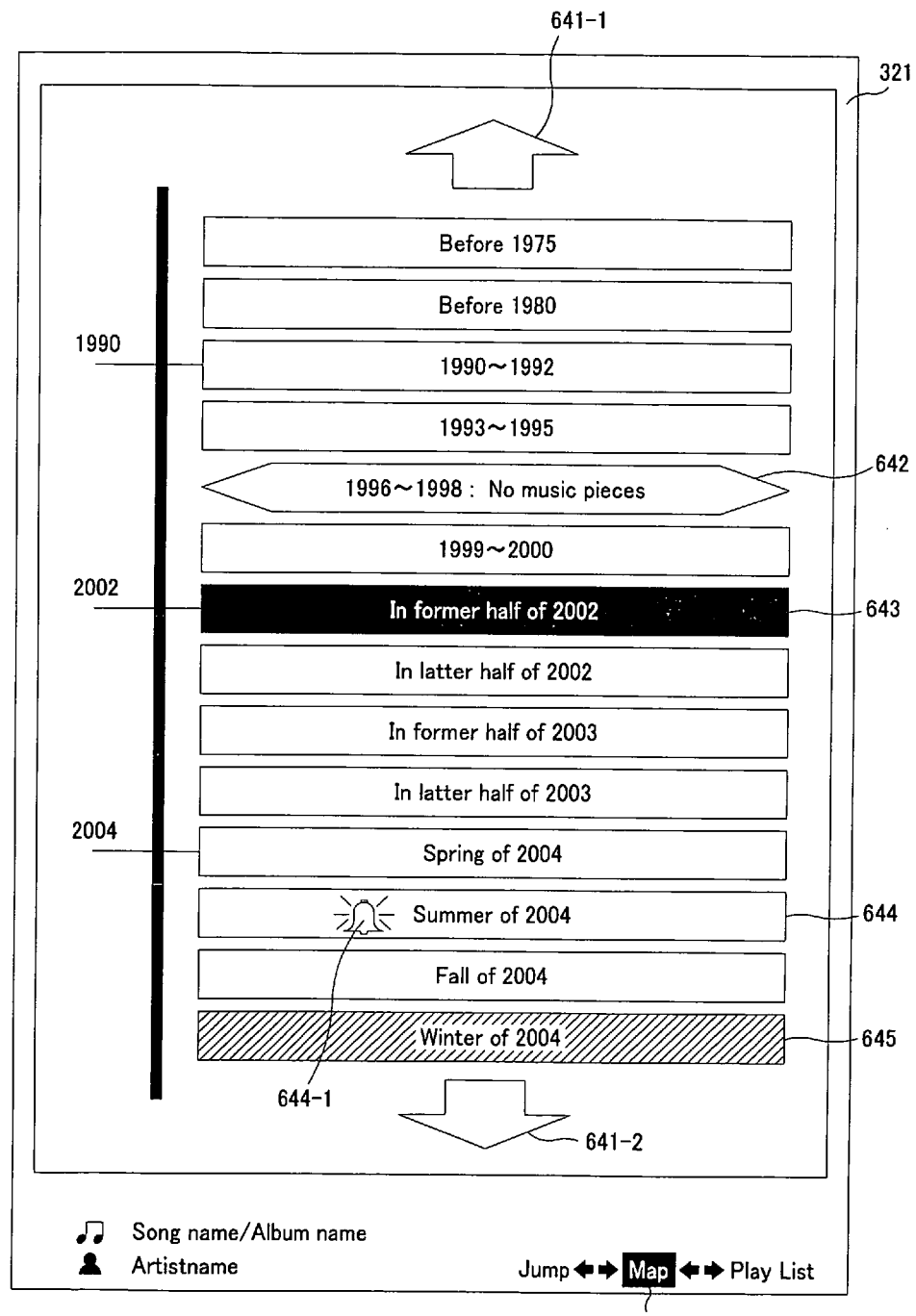
FIG. 29 illustrates another example configuration of the Map view in FIG. 10.

Note that although a two-dimensional map taking two content meta data as axes is displayed in the example shown in FIG. 10, a map using only one content meta data may be displayed or a three-dimensional map taking three content meta data as axes may be displayed, as shown in FIGS. 13 and 29.

Next, how to select a content in the map window 321 will be explained in detail with reference to FIG. 11.

Figure 11:
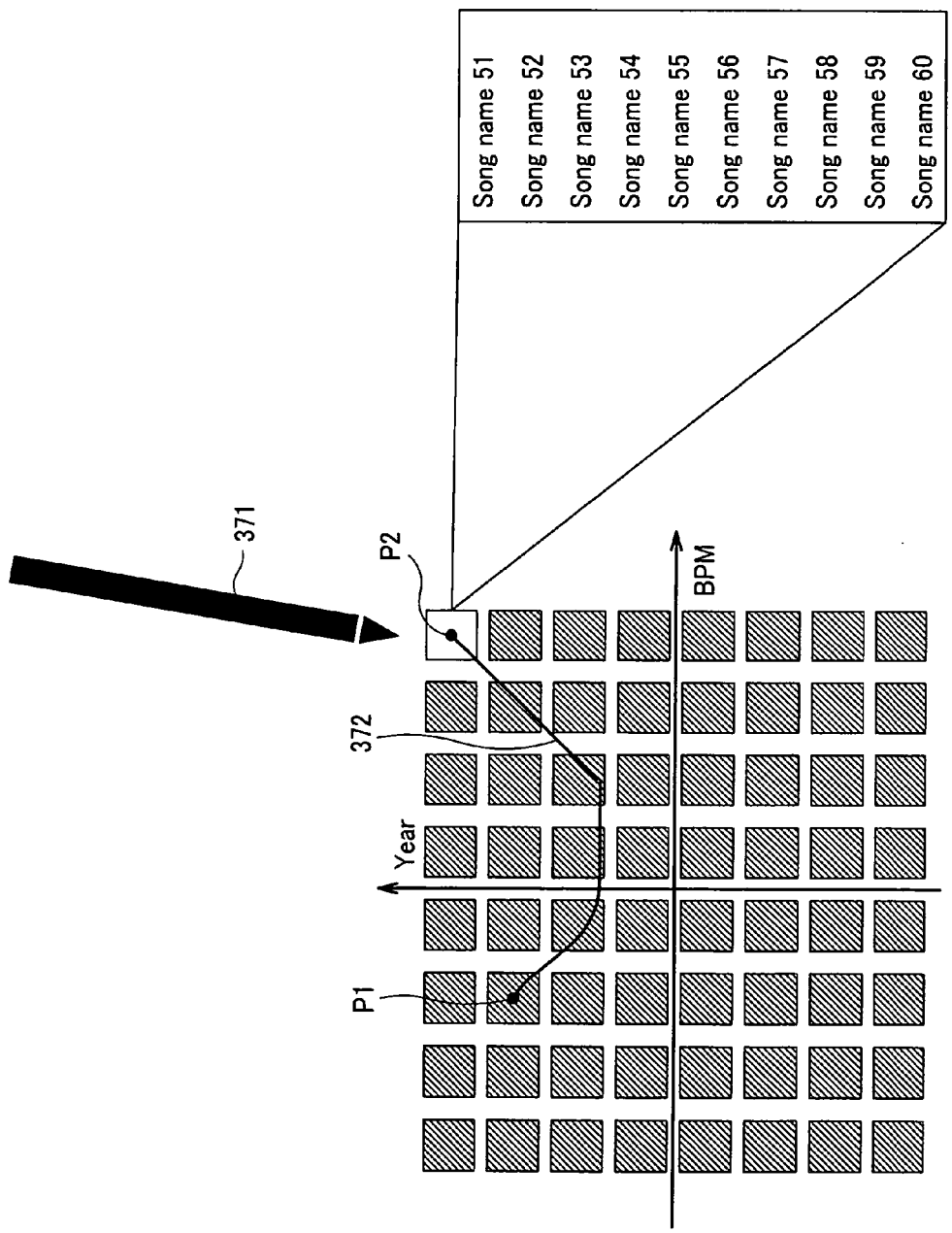
FIG. 11 explains a method of selecting a content in the Map view in FIG. 10.

In the example shown in FIG. 11, there is shown a two-dimensional map in which the year in which content meta data has been released and BPM (bits/minutes) as tempo of the content are taken as the vertical and horizontal axes, respectively.

In case the user places a touch pen 371 in a position on the touch panel 132, corresponding to a position P1 on a map formed from a plurality of grids, and draws it to a position P2 along a locus 372 with the touch pen 371 being kept in touch with the surface of the touch panel 132, for example, the PD 5 will determine that the grid is still an option. For this while, the dragged order list is updated with information on the locus 372 (formed from selection positions) along which the touch pen 371 has been dragged in touch with the touch panel 132, and the grid corresponding to the position where the touch pen 371 is in touch with the touch panel 132 is updated in state of display on the basis of the updated dragged order list to be different from other grids, similarly to the grids with the numbers "a" to "j" in FIG. 10.

At this time, a part, for example, a key portion, of each of contents in play lists, assigned to the grids corresponding to positions in which the touch pen 371 has been in touch with the touch panel 132 as the touch pen 371 has been dragged (along the locus 372), will be played in the PD 5.

Note that for this purpose, there may be played all, not a part, of a content may be played or audition contents each formed from only such a key portion or preset effective sounds.

Thereafter, when the user takes the touch pen 371, having been held and dragged to the position P2, off the surface of the touch panel 132 (namely, liberates the touch pen 371 from the touch with the touch panel 132) in the position P2, the PD 5 will select a grid in the position P2 where the touch pen 371 is in touch with the touch panel 132. The played order list (selected order list) is updated with the selection of the grid, and the selected grid and grid corresponding to a play list played previously are updated in state of display to be different from other grids, similarly to the grids with the numbers "1" to "10" in FIG. 10.

Further, the PD 5 plays content data sequentially beginning with an uppermost one of contents in the play list assigned to the selected grid, and outputs sound corresponding to the content data from the speaker 118.

The grid selected as above has assigned thereto a play list of, for example, 10 contents "Song name 51" to "Song name 60". In case the contents are arranged sequentially from above in a descending order of ranking of their sales in the market, the PD 5 will play the content data sequentially in an order from the uppermost content "Song name 51".

Note that also in case the user has put the touch pen 371 in a position on the touch panel 132, corresponding to the position P1 on the map and readily taken it off the touch panel 132 (liberated it from the touch with the touch panel), the PD 5 will select a grid corresponding to the position P1 where the touch pen 371 has been in touch with the touch panel just before and play a content in a play list assigned to the selected grid.

In the example shown in FIG. 11, after the touch pen 371 is put into touch with the touch panel 132 and taken off the touch panel 132, one grid corresponding to a position on the touch panel 132, where the touch panel 371 has been in touch with the touch panel 132 just before, is selected. However, grids in an area surrounded by positions where the touch pen 371 has been in touch with the touch panel 132 may collectively be selected as shown in FIG. 12.

In the example shown in FIG. 12, the user puts the touch pen 371 in a position on the touch panel 132, corresponding to the position P11 on the map, drags it in contact with the touch panel 132 along a locus 381 to a position P12 and takes the touch pen 371 off the touch panel 132 in the position P12, for example. Thus, the PD 5 will select grids (twelve grids not hatched in FIG. 12) within an area defined by the locus 381 and play a content included in each of play lists assigned to the selected grids.

At this time, the play lists assigned to the selected grids are given predetermined priorities and contents included in each of the play lists be played sequentially in a descending order of their priorities beginning with the play list given the highest priority, or predetermined priorities may be given to contents in all the play lists and contents be played sequentially in a descending order of their priorities beginning with the content given the highest priority.

Also, an Area button 391 may be provided in the control/setting window 322 in FIG. 12, for example, to make a selection between the selection of contents in a position as shown in FIG. 11 and selection of contents in an area as shown in FIG. 12, so that when the user presses the Area button 391, the selection of contents in an area as having been described above with reference to FIG. 12 will be employed.

Note that the selection of contents in an area as in FIG. 12 may be used to select a grid for playing contents as well as for book-marking the area, for example.

FIG. 13 shows an example configuration of a Map view which is in a "Genre" display mode. It should be noted that since the grids included in a map are formed as in FIG. 10, so they will not be explained any longer.

Actually, however, when the display mode (map) is changed to another, the meta data as the axis of the map is changed and contents assigned to each grid are updated. So, the grids displayed in the map will also be changed in state of display. Also, one to ten played order lists will continuously be displayed correspondingly to the updated grids, while the dragged order list is reset for each mode of display.

The map displayed in the map window 321 shown in FIG. 13 is formed from seven areas different in genre of content meta data from each other.

An area formed from 8 columns by 18 rows of grids, appearing at the upper left of FIG. 13 is a "Rock" area. In this "Rock" area, each of the grids hatched or carrying a number has assigned thereto a play list including at least one content whose genre parameter is "Rock".

An area formed from 8 columns by 10 rows of grids, appearing to the right of the "Rock" area is a "Pops" area. In this "Pops" area, each of the grids hatched or carrying a number has assigned thereto a play list including at least one content whose genre parameter is "Pops".

An area formed from 8 columns by 8 rows of grids, appearing at the lower left of FIG. 13 is a "Jazz" area. In this "Jazz" area, each of the grids hatched or carrying a number has assigned thereto a play list including at least one content whose genre parameter is "Jazz".

An area formed from 8 columns by 5 rows of grids, appearing to the right of the "Jazz" area is a "Classic" area. In this "Classic" area, each of the grids hatched or carrying a number has assigned thereto a play list including at least one content whose genre parameter is "Classic".

An area formed from 8 columns by 4 rows of grids, appearing to the right of the "Classic" area is a "Dance" area. In this "Dance" area, each of the grids hatched or carrying a number has assigned thereto a play list including at least one content whose genre parameter is "Dance".

An area formed from 8 columns by 5 rows of grids, appearing to the right of the "Dance" area is a "Blues" area. In this "Blues" area, each of the grids hatched or carrying a number has assigned thereto a play list including at least one content whose genre parameter is "Blues".

An area formed from 8 columns by 6 rows of grids, appearing to the right of the "Blues" area is a "Hip Hop" area. In this "Hip Hop" area, each of the grids hatched or carrying a number has assigned thereto a play list including at least one content whose genre parameter is "Hip Hop".

Since the map formed from the grids categorized according to the genre parameter is displayed in the Map view as above, the user can easily select and listen to a content corresponding to a desired genre by selecting a grid belonging to the desired genre with the touch pen or his finger.

Figure 14:
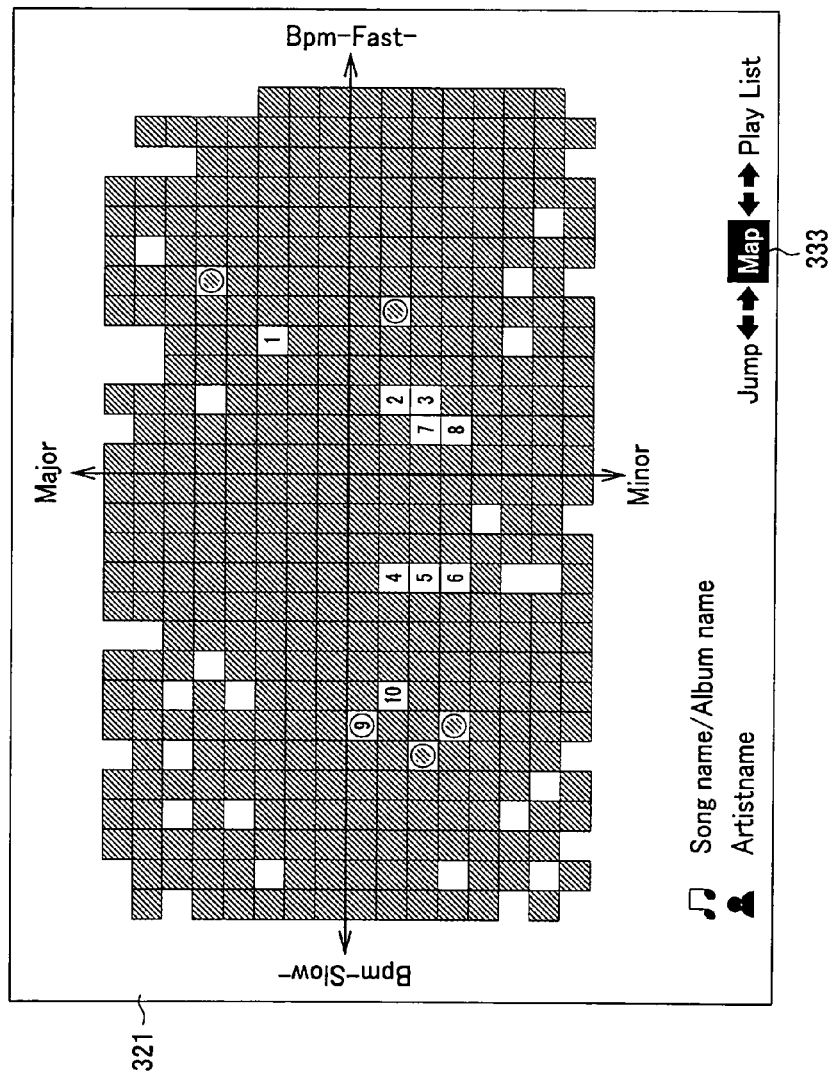
FIG. 14 illustrates another example configuration of the Map view in FIG. 10.

FIG. 14 shows an example configuration of the Map view which is in a "Major/Minor" display mode. It should be noted that since in the example shown in FIG. 14, the grids included in the map are formed as in FIG. 10 similarly to those shown in FIG. 13, so they will not be explained any longer.

As shown in FIG. 14, the map displayed in the Map window 321 is formed from a plurality of grids defined by parameters within a predetermined range whose two axes are content meta data "Major" and "Bpm", respectively.

Of the map, the vertical axis indicates the degree of content meta data "Major" (that is, melody). The melody is higher (namely, toward "Major") as it goes upward in FIG. 14, while it is lower (namely, toward "Minor") as it goes downward. The horizontal axis of the map indicates the tempo (Bpm) of content meta data. The tempo is faster as it goes rightward in FIG. 14 while it is slower as it goes leftward.

That is, in the map displayed in the map window 321 in FIG. 14, one grid hatched or carrying a number has assigned thereto a play list including at least one content whose meta data "melody" and "tempo" have parameters within predetermined ranges, respectively.

Since the map formed from the grids defined by the content meta data "melody" and "tempo" having parameters within the predetermined ranges is displayed in the map window 321 as above, when the user, wanting a content which is of a light-tone (major-key) melody and an up-tempo, can easily select and listen to a content corresponding to a desired melody and tempo by selecting a grid displayed around the upper right (in the first quadrant) of the map with a touch pen or his finger.

Figure 15:
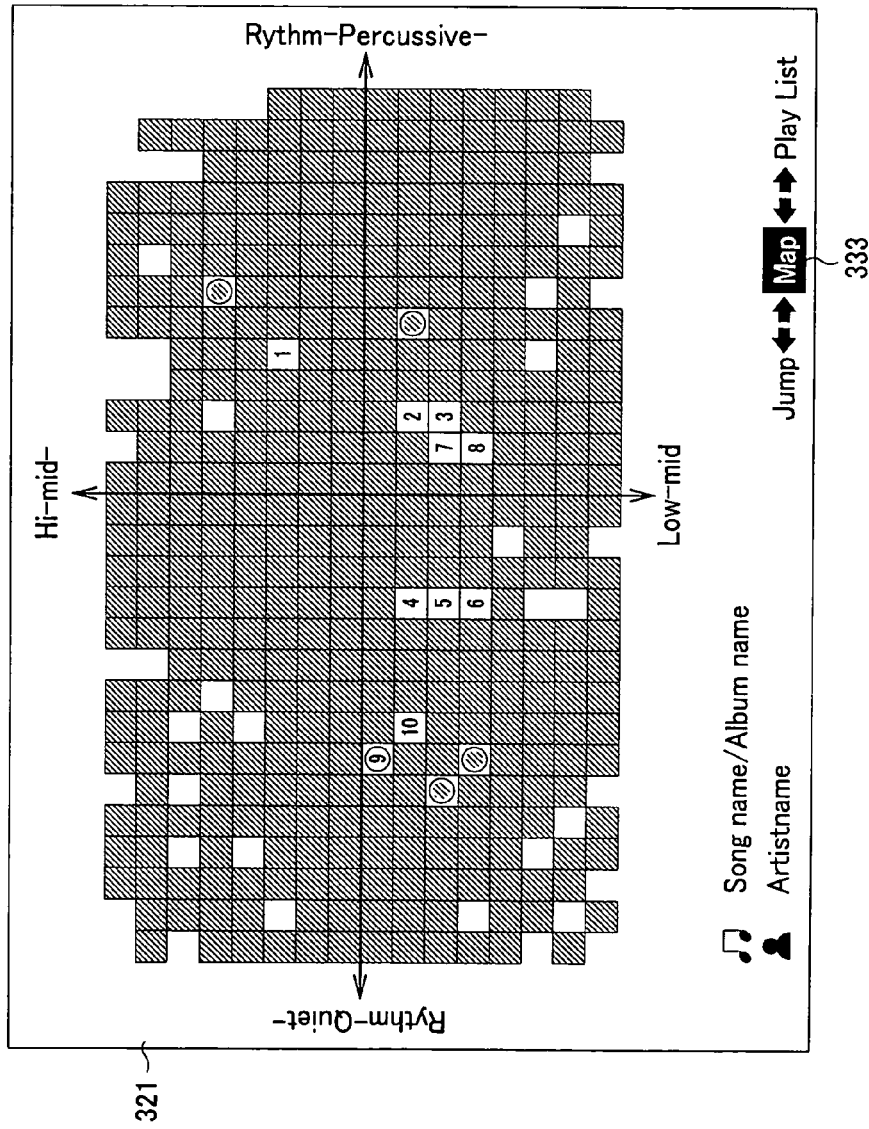
FIG. 15 illustrates another example configuration of the Map view in FIG. 10.

FIG. 15 shows an example configuration of the Map view which is in a "Tone" display mode. It should be noted that since in the example shown in FIG. 15, the grids included in the map are formed as in FIG. 10 similarly to those shown in FIG. 13, so they will not be explained any longer.

As shown in FIG. 15, the map displayed in the map window 321 is formed from a plurality of grids defined by a predetermined parameter range whose two axes are content meta data "Hi/Low-Mid" and "Rhythm", respectively.

Of the map, the vertical axis indicates whether the register of content meta data is "HiMid" or "LowMid". The register is higher as it goes upward in FIG. 15, while it is lower as it goes downward. The horizontal axis of the map indicates the value of content meta data "Rhythm". The rhythm becomes "percussive" as it goes rightward in FIG. 15 while it becomes "quiet" as it goes leftward.

That is, in the map displayed in the map window 321 in FIG. 15, one grid hatched or carrying a number is assigned a play list including at least one content whose meta data "register" and "rhythm" have parameters within predetermined ranges, respectively.

Since the map formed from the grids defined by the content meta data "register" and "rhythm" having parameters within the predetermined ranges is displayed in the map window 321 as above, the user, wanting a content which is in an upper register and rhythmic, can easily select and listen to a content corresponding to a desired register and rhythm by selecting a grid displayed around the upper right (in the first quadrant) of the map with the touch pen or his finger.

Figure 16:
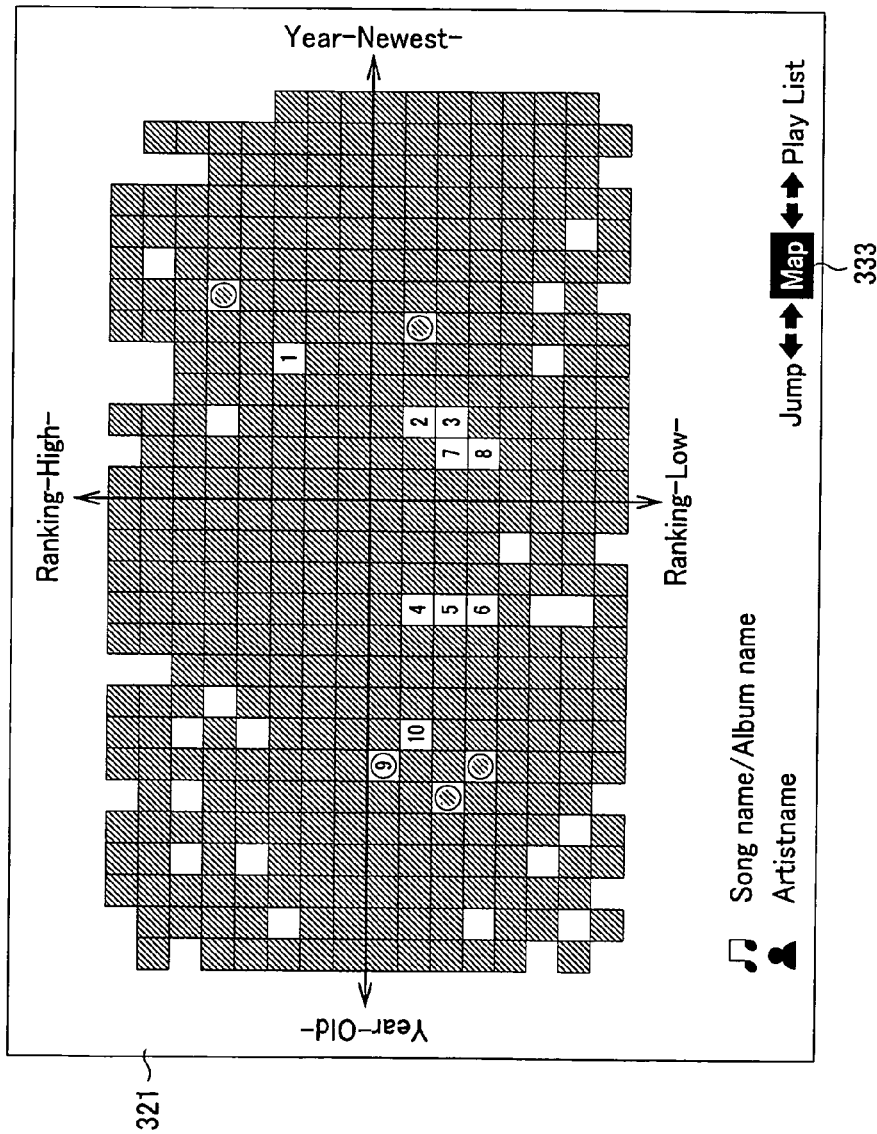
FIG. 16 illustrates yet another example configuration of the Map view in FIG. 10.

FIG. 16 shows an example configuration of the Map view in a "Comparison" display mode. It should be noted that since in the example shown in FIG. 16, the grids included in the map are formed as in FIG. 10 similarly to those shown in FIG. 13, so they will not be explained any longer.

As shown in FIG. 16, the map displayed in the map window 321 is formed from a plurality of grids defined by a predetermined parameter range whose two axes are content meta data "Ranking" and "Year", respectively.

Of the map, the vertical axis indicates the value of content meta data "Ranking" of a content. The ranking is higher as it goes upward in FIG. 16, while it is lower as it goes downward. The horizontal axis of the map indicates the value of content meta data "Year (year of release)". The year becomes "newer" as it goes rightward in FIG. 16, while it becomes "older" as it goes leftward.

Note that although the vertical and horizontal axes of the map are the same as those of the map displayed in the map window 321 which is in the "Ranking" display mode in FIG. 10, the "ranking" in FIG. 10 is, for example, a ranking of sales in the market and the "Ranking" in the "Comparison" display mode in FIG. 16 is, for example, a user-evaluated ranking information calculated based on the played order list. Namely, the more frequently the content is played, the higher the ranking is. It should be noted that the user-evaluated ranking information is not only used in the "Comparison" display mode but as independent information as will be described with reference to FIG. 47.

Another example of the map which is in the "Comparison" display mode will be explained in detail below. For example, the ranking evaluated by a user (A, for example) of the PD 5 is indicated along the horizontal axis, while the ranking evaluated by another user (B, for example) is indicated along the horizontal axis. It should be noted the user's ranking is information selected and set in the user relationship link (Friends jump) in the Jump map, which will be explained in detail later with reference to FIG. 23.

In such a two-dimensional map, the user A can intuitively know a "content (music piece) also loved by the user B" having a relationship with himself and a "content loved by the other user". The user A can readily listen to such contents.

Note that with the played order lists being complied, the user-evaluated ranking information is stored in the content server 3 or the like.

Figure 20:
FIG. 20 illustrates another example configuration of the Play List view in FIG. 17.

That is, the played order list of the user B which will be explained later with reference to FIG. 20 is stored in the PD 5 of the user B. The played order list of the user B, stored in the PD 5 of the user B, is sent from the PD 5 of the user B to the content server 3 via radio communication, for example. In the content server 3, the played order list received from the PD 5 of the user B is complied to generate ranking information of the user B.

The content serer 3 sends, by radio communication, the ranking information of the user B to the PD 5 of the user A having relationship with the user B. The PD 5 of the user A selects the user B by selecting a user icon from the user relationship link (will be explained later with reference to FIG. 23) in a Link view displayed on the display screen 131 in response to the operation by the user A. Thereafter, when the user A presses the VIEW button 341, the PD 5 of the user A changes the display view to the Map view 311 which is in the "Comparison" display mode to display the ranking information sent from the user B.

Thus, the map window 321 of the Map view 311 displays a map which is in the "Comparison" display mode in which the references of the users A and B are compared with each other.

Namely, in the map displayed in the map window 321 in FIG. 16, one grid hatched or carrying a number has assigned thereto a play list including at least a content having a parameter whose value is within a predetermined range for the preferences of the user and his friend or the like.

Since the map formed from the grids classified according to private information parameters is displayed, the user can easily search the grid for a content loved by his friend and can listen to a content belonging to a genre to which the user has not positively listened. Therefore, the user can widen the range of his preference and also the content provider can promote the sales of contents.

Note that in addition to the display modes including the aforementioned Ranking mode, Genre mode, Major/Minor mode, Tone mode and Comparison mode, any other display mode may be set up by changing the combination of meta data used as the vertical axis and that used on the horizontal axe of a map or by using other meta data as the vertical and horizontal axes of the map.

Figure 17:
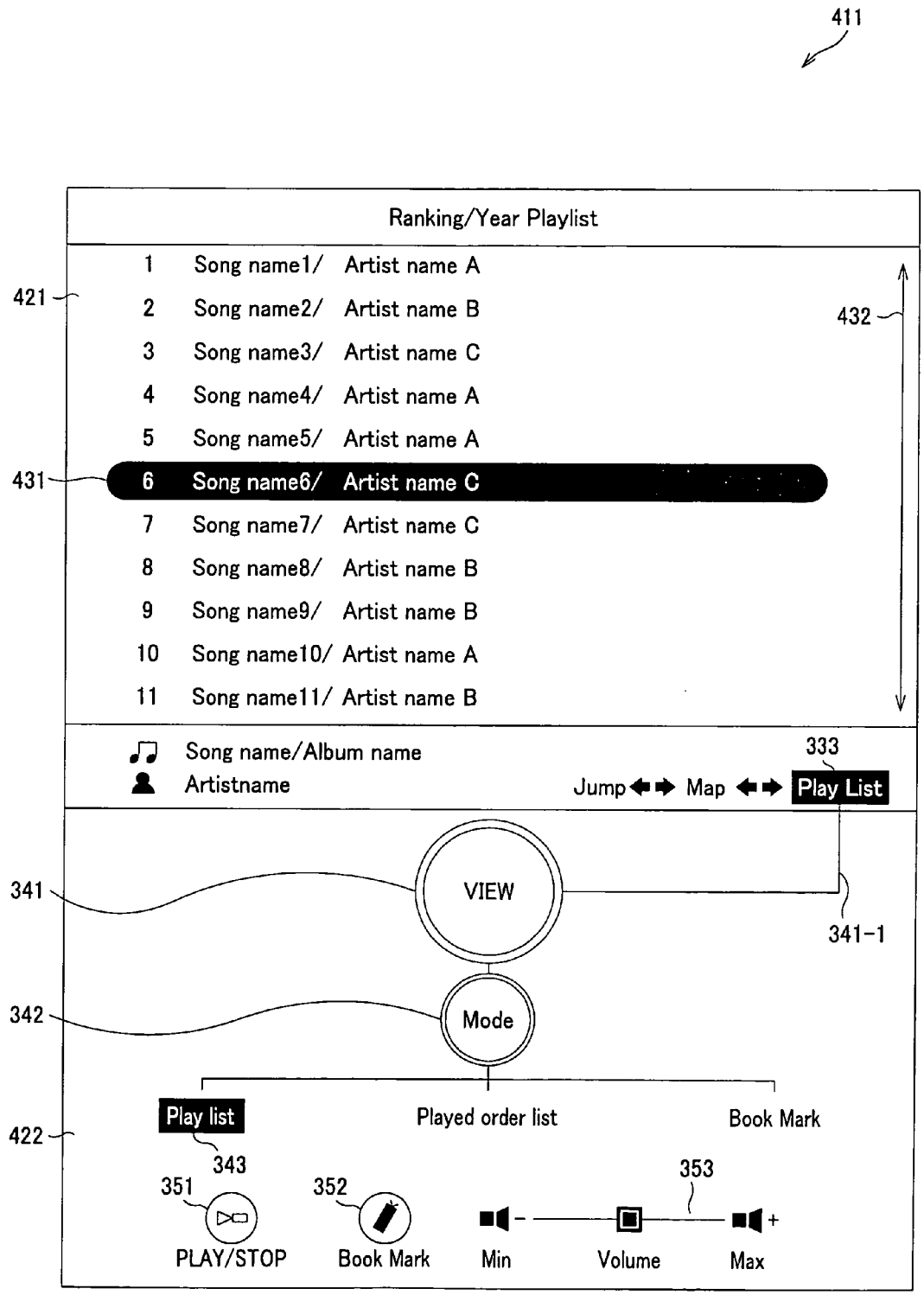
FIG. 17 illustrates an example configuration of a Play List view as a content selection view.

FIG. 17 shows an example configuration of the Play List view as a content selection view. It should be noted that since in the example shown in FIG. 17, the same parts or components as those in FIG. 10 are indicated with the same reference numerals as in FIG. 10 and the explanation of the parts will be omitted to avoid the repetition of the same explanation.

As shown in FIG. 17, a Play List view 411 includes a play list window 421 and control/setting window 422.

In the example in FIG. 17, there is displayed the play list window 421 which is when the display mode of the Play List view 411 is in the "Play List" mode. It should be noted that the display modes of the Play List view 411 includes "Played order list" mode and "Book Mark" mode in addition to the "Play List" mode.

In the "Play List" mode, there is displayed a play list corresponding to an item (grid or icon) selected in the Map or Jump view. In the "Played order list" mode, there is displayed a play list formed from a list of contents having been played in the past. In the "Book Mark" mode, there is displayed a list formed from a list of contents having been registered as bookmarks by the user.

In the upper portion of the play list window 421, there is displayed "Ranking/Year Playlist" which indicates that the play list window 421 displays a play list in the Map view which is in the "Ranking" mode. In the play list window 421, a play list assigned to a selected grid with the number "1" is displayed in the Map view 311 which is in the "Ranking" display mode as in FIG. 10.

Note that as having previously been described above with reference to FIG. 10, contents in a play list assigned to one grid (that is, contents assigned to the same grid) are given priorities correspondingly to parameters of predetermined content meta data or the like in the Map view 311. Therefore, contents "1" to "11" are listed in the play list window 421 in the order of their priorities in the selected play list.

More specifically, in the play list window 421, there are displayed in sequence from above a content name "Song name 1" of a content given a priority "1" and artist name "Artist name A", a content name "Song name 2" given a priority "2" and artist name "Artist name B", a content name "Song name 3" given a priority "3" and artist name "Artist name C", a content name "Song name 4" given a priority "4" and artist name "Artist name A" and a content name "Song name 5" given a priority "5" and artist name "Artist name A".

Also, the play list window 421 displays, in sequence from above, a content name "Song name 6" given a priority "6" and artist name "Artist name C", a content name "Song name 7" given a priority "7" and artist name "Artist name C", a content name "Song name 8" given a priority "8" and artist name "Artist name B", a content name "Song name 9" given a priority "9" and artist name "Artist name B", a content name "Song name 10" given a priority "10" and artist name "Artist name A" and a content name "Song name 11" given a priority "11" and artist name "Artist name B".

Information displayed in the play list window 421 in FIG. 10 as above inherits the priority (order) of the grid selected in the Map view 311. It should be noted that the numbers "1" to "11" following the content names, respectively, may be displayed or not.

In FIG. 17, a cursor 431 stays on the line of the content name having the priority "6" and artist name, which means that the content is being played. That is, contents in a play list are played beginning with a content having the highest priority (namely, content at the top) in the descending order and the cursor 431 is displayed on the line of the content name. When playing of the content on which the cursor 431 is staying is over, the cursor 431 moves onto the line of a content name having the one step-lower priority and artist name (displayed next) and this content will be played.

However, in case a content name or the like displayed in the play list window 421 is selected directly in response to the user's operation, the cursor 431 will move onto the line of the content name corresponding to the user's operation and the content in the line having the cursor 431 thereon will be played.

To the right of the play list window 421, there is displayed a scroll bar 432. As the scroll bar 432 is manipulated by the user, the list displayed in the play list window 421 is scrolled so that a list which is not able to be displayed within the play list window 421 (contents and artist names given the 12th and lower priorities, for example) will be displayed.

In the control/setting window 422 of the Play List view 411, a line 341-1 is displayed to connect the cursor 333 on "Play List" and the VIEW button 341 to each other.

The Mode button 342 in the control/setting window 422 is provided to change the display mode of the Play List view 411, that is, a play list displayed in the play list window 421. When the user presses the Mode button 342 with his finger or a touch pen, the play list displayed in the play list window 421 is changed and the cursor 343 moves onto a corresponding one of legends "Play List", "Played order list" and "Book Mark" displayed below the Mode button 342 and the legend is highlighted. In FIG. 17, since the display mode is the "Play List" mode, the cursor 343 moves onto the legend "Play List" and this legend is highlighted.

Note that direct pressing of each of the legends indicating the display modes also permits to change the display mode. The play list displayed in the map window 321 will be changed and the cursor 343 will also move to another position.

Figure 18:
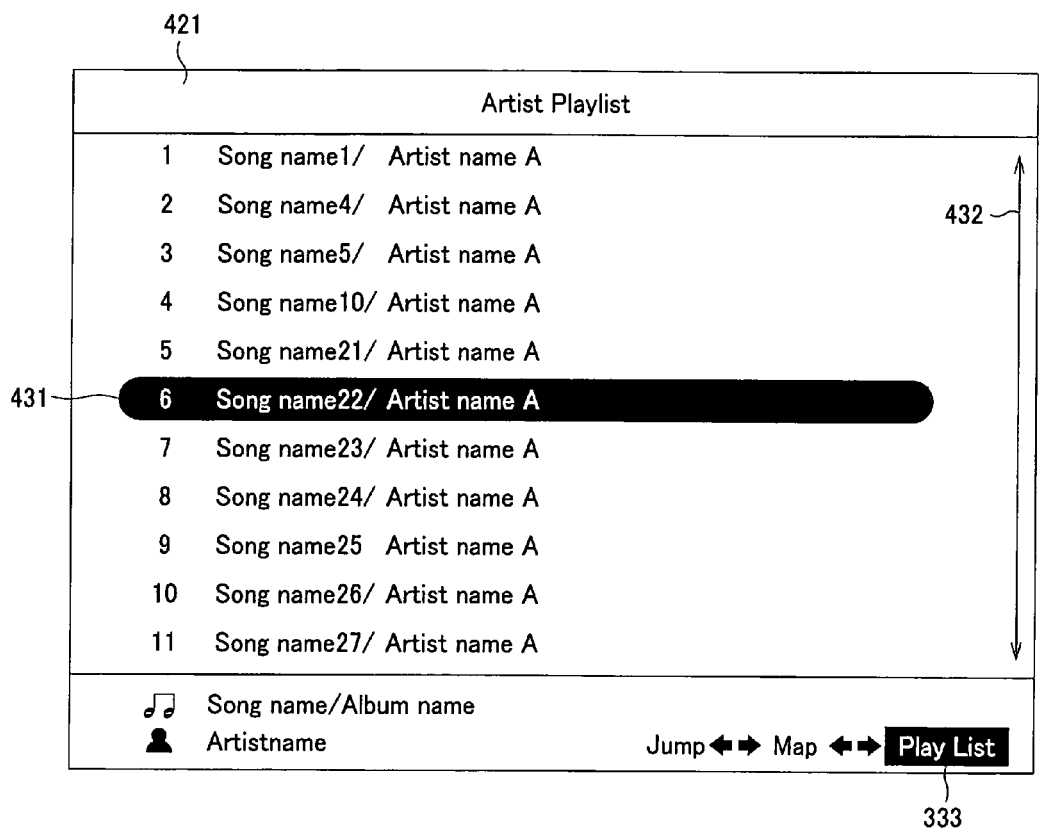
FIG. 18 illustrates another example configuration of the Play List view in FIG. 17.

FIG. 18 shows another example configuration of the play list window which is in the "Play List" mode.

In the upper portion of the play list window 421 in FIG. 18, there is displayed "Artist Play List" which indicates that the play list window 421 displays a play list corresponding to the artists in the Jump view. In the play list window 421, a play list corresponding to the artists (selected artists) assigned to a selected icon in the Jump view.

Namely, an artist name A is selected in the Jump view. Then, when the display view is changed to the Play List view, the play list window 421 shown in FIG. 18 appears.

In the play list window 421, there are displayed in sequence from above a content name "Song name 1" of a content given a priority "1" and artist name "Artist name A", a content name "Song name 4" given a priority "2" and artist name "Artist name A", a content name "Song name 5" given a priority "3" and artist name "Artist name A", a content name "Song name 10" given a priority "4" and artist name "Artist name A" and a content name "Song name 21" given a priority "5" and artist name "Artist name A".

Also, the play list window 421 displays, in sequence from above, a content name "Song name 22" given a priority "6" and artist name "Artist name A", a content name "Song name 23" given a priority "7" and artist name "Artist name A", a content name "Song name 24" given a priority "8" and artist name "Artist name A", a content name "Song name 25" given a priority "9" and artist name "Artist name A", a content name "Song name 26" given a priority "10" and artist name "Artist name A" and a content name "Song name 27" given a priority "11" and artist name "Artist name A".

In case the artist name A is selected in the Jump view as above, for example, information displayed in the play list window 421 in FIG. 18 inherits the information selected in the Jump view and a play list for the artist having the name A is displayed.

Figure 19:
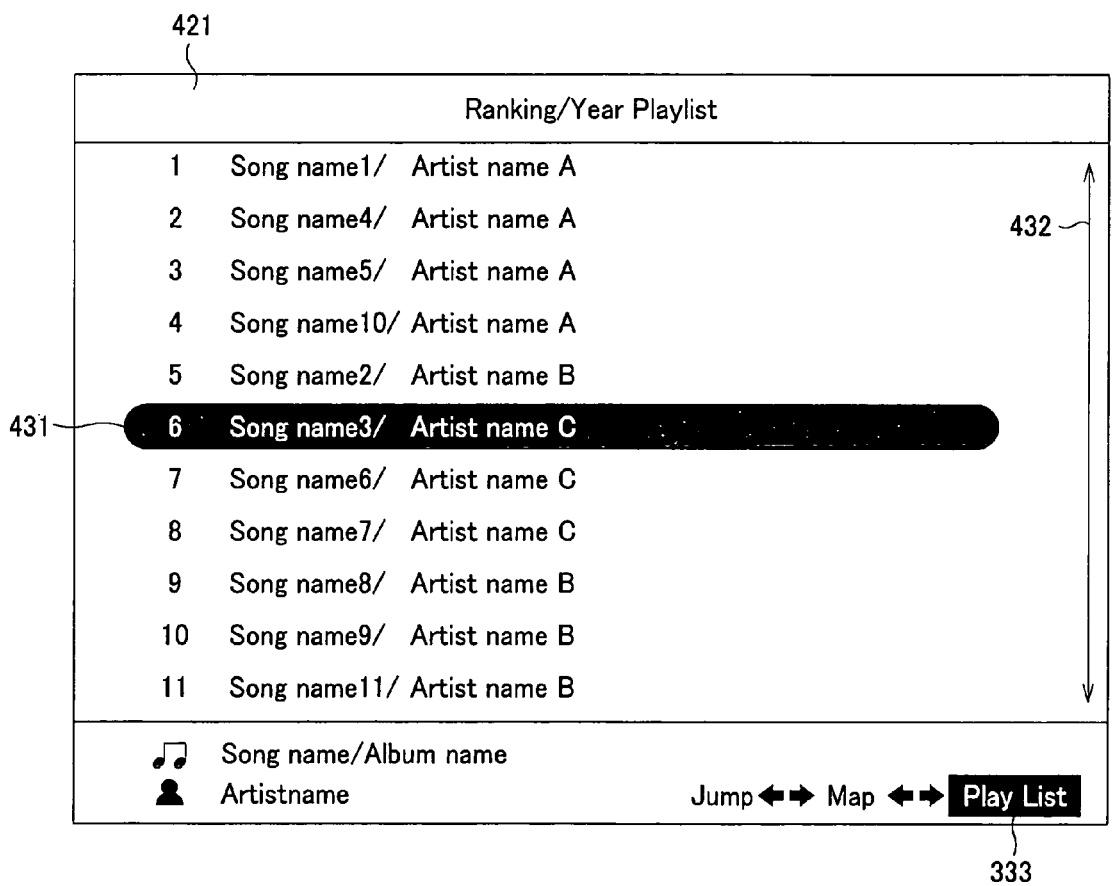
FIG. 19 illustrates another example configuration of the Play List view in FIG. 17.

FIG. 19 shows another example configuration of the play list window which is in the "Play List" mode.

In the upper portion of the play list window 421 in FIG. 19, there is displayed "Ranking/Year Playlist" which indicates that the play list window 421 displays a play list which is in the "Ranking" mode of the Map view. In the play list window 421, there is displayed a play list assigned to the round grid 332 selected in the Map view 311 in FIG. 10.

As having previously been described above with reference to FIG. 10, the round grid 332 means that a play list assigned to the round grid 332 includes contents of an artist selected by the user in the Jump view having previously been displayed. The contents included in the play list selected by the user are ordered with a highest priority being given to the content of the artist selected in the Jump view. Therefore, in case the round grid 332 is selected in the Map view and then the display view is changed to the Play List view, the play list window 421 will display a list of contents with order numbers "1" to "11" in the order of their priorities in the play list assigned to the round grid 332 as shown in FIG. 19.

In the play list assigned to the round grid 332, displayed in the play list window 421, there are displayed in sequence from above a content name "Song name 1" of a content given a priority "1" and artist name "Artist name A", a content name "Song name 4" of a content given a priority "2" and artist name "Artist name A", a content name "Song name 5" of a content given a priority "3" and artist name "Artist name A", a content name "Song name 10" of a content given a priority "4" and artist name "Artist name A" and a content name "Song name 21" of a content given a priority "5" and artist name "Artist name A".

Also, the play list window 421 displays, in sequence from above, a content name "Song name 2" of a content given a priority "6" and artist name "Artist name B", a content name "Song name 6" of a content given a priority "7" and artist name "Artist name C", a content name "Song name 7" of a content given a priority "8" and artist name "Artist name C", a content name "Song name 8" of a content given a priority "9" and artist name "Artist name B", a content name "Song name 9" of a content given a priority "10" and artist name "Artist name B" and a content name "Song name 11" of a content given a priority "11" and artist name "Artist name B".

As above, in case a round grid indicating the existence of inherited selected order information in the Jump view, for example, has been selected in the Map view, information displayed in the play list window 421 in FIG. 19 inherits the priority information at the round grid, which is selected order information in the Map view 311.

FIG. 20 shows an example configuration of the play list window which is in the "Played order list" display mode.

In the upper portion of the play list window 421 in FIG. 20, there is displayed "Played order list" which indicates that the play list window 421 displays a play list for the "Played order list" display mode of the Map view. In the play list window 421, there is displayed a list of played contents as a play list. The play list for the "Played order list" display mode is configured with the contents being ordered in a descending order of their played dates.

More specifically, in the play list window 421, there are displayed in sequence from above, a name "Song name 1" of a content whose played date is newest (content having been played latest), artist name "Artist name A" and its played date, a name "Song name 2" of a content whose played date is second-newest, artist name "Artist name B" and its played date, a name "Song name 3" of a content whose played date is third-newest, artist name "Artist name C" and its played date, a name "Song name 4" of a content whose played date is fourth-newest, artist name "Artist name A" and its played date, and a name "Song name 5" of a content whose played date is fifth-newest, artist name "Artist name A" and its played date.

Also, the play list window 421 displays, in sequence from above, a name "Song name 6" of a content whose played date is sixth-newest, artist name "Artist name C" and its played date, a name "Song name 7" of a content whose played date is seventh-newest, artist name "Artist name C" and its played date, a name "Song name 8" of a content whose played date is eighth-newest, artist name "Artist name B" and its played date, a name "Song name 9" of a content whose played date is ninth-newest, artist name "Artist name B" and its played date, a name "Song name 10" of a content whose played date is tenth-newest, artist name "Artist name A" and its played date, and a name "Song name 11" of a content whose played date is eleventh-newest, artist name "Artist name B" and its played date.

The information in the played order list of contents stored in the PD 5 is also displayed as a play list. Thus, the user can select and play a desired content from the played order list. It should be noted that the played order list displayed in the play list window 421 also includes the played order list of the other user in addition to that of the user of the PD 5 as will be described later with reference to FIG. 29.

Figure 21:
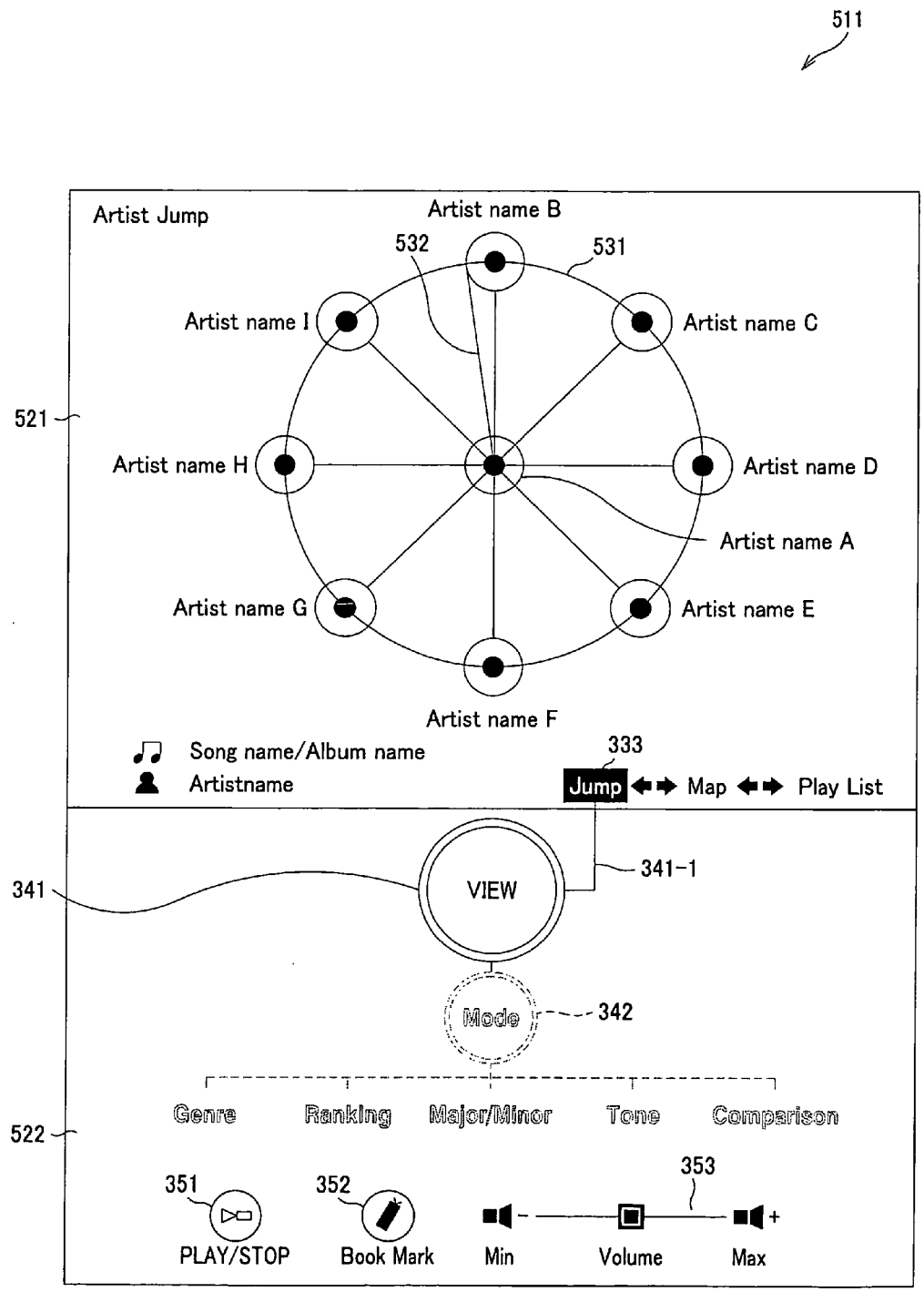
FIG. 21 illustrates an example configuration of a Jump view as a content selection view.

FIG. 21 shows an example configuration of the Jump view as a content selection view. It should be noted that in the example shown in FIG. 21, parts corresponding to those in FIG. 10 are indicated with the same reference numerals as those in FIG. 10 and will not be explained any longer to avoid the repetition of the same explanation.

As shown in FIG. 21, a Jump view 511 includes a link window 521 and control/setting window 522. In the example in FIG. 21, the link window 521 is provided as an "Artist jump" view to indicate artists related to the artists of contents having been played or selected.

The related artists include, for example, artists currently belonging or having belonged, to a group, artists belonging to the same production, artists having frequently joined the same live, artists similar in music melody to each other, etc.

In the link window 521, an icon of "Artist name A" (will also be referred to as "Artist icon A" hereunder wherever appropriate) is displayed at the center of a circle 531, and icons of artists related to the artist having the name A including "Artist name B", "Artist name C", "Artist name D", "Artist name E", "Artist name F", "Artist name G", "Artist name H" and "Artist name I" (will also be referred to as "artist icons B, C, D, E, F, G, H and I" hereunder wherever appropriate) are displayed on the circumference of the circle 531.

In the link window 521, a line is displayed to extend from the central artist icon A to each of the artist icons on the circumference in order to show the relationship between them. Also, a sector mark 532 connecting the center of the circle 531 and circumference is displayed in the circle 531. As the sector mark 532 is rotated about the circle center, it appears like a moving bearing cursor of a radar extending from the artist icon A to the artist icons on the circumference.

In case an artist icon (artist icon B, for example) on the circumference of the circle 531 is selected in the link window 521 in response to an user's operation, the related artist icon B thus selected is displayed at the center of the circle 531 and artist icons of the artists related to the artist whose name is the artist name B are displayed on the circumference. It should be noted that the jump of each icon at this time is displayed as an animation.

In the link window 521, there are displayed only the icons for the artists related to the artist whose icon is positioned at the center of the circle 531. In the past, in display of a relationship between contents, there are displayed contents related to one content as well as contents related to the contents related to the one content.

That is, only the relationship with an artist of a content the user desires or currently being played is displayed in the Jump view 511 according to the embodiment of the present invention. Thus, there can be provided a Jump view whose display is simpler, in which the relationship between artists is more discernible to the user and in which icons of the related artists can be selected more easily than in the simultaneous display of the relations between various artists in the past.

In the control/setting window 522 in the Jump view 511, the line 341-1 is displayed to connect the cursor 333 on "Jump" and VIEW button 341 to each other.

The Mode button 342 in the control/setting window 422 is provided to change the display modes of the Map view 311 and Play List view 411. The Jump view 511 has no display modes and so it is displayed translucent so as not to be selected.

When the display view is changed to the Map view 311 with the artist icon A displayed in the link window 521 of the Jump view 511 configured as above being selected, a grid having assigned thereto contents of the artist with the icon A is displayed as the round grid 332 in the map displayed in the map window 321 of the Map view 311 as having previously been described above with reference to FIG. 10.

Also, when the display view is changed to the Play List view 411 with the artist icon A displayed in the link window 521 of the Jump view 511 being selected, a play list of contents of the artist with the icon A is displayed in the play list window 421 of the Play List view 411 as having previously been described above with reference to FIG. 18.

Note that although the relationship between the artists is displayed in the Jump view 511 as in FIG. 21, not only the relationship between the artists but also that between the contents themselves may be displayed and also the relationship between the users be displayed as will be explained later with reference to FIG. 23. To address such a case that not only the relationship between the artists but the relationship between the users are displayed in the Jump view 511, the embodiment of the present invention may be adapted to make a selection between such relationships by operating the Mode button 342.

Next, how to display icons in the Jump view will be explained with reference to FIG. 22.

Figure 22:
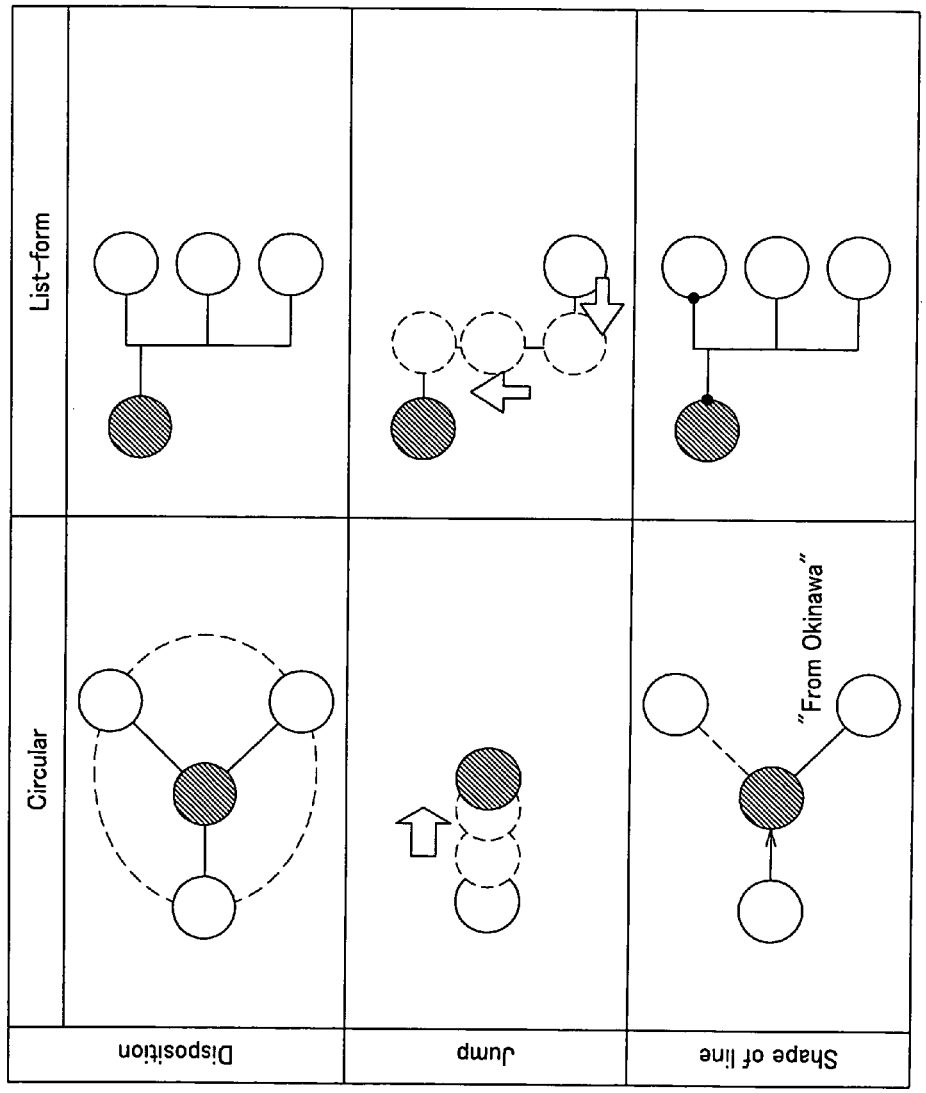
FIG. 22 explains how to display an icon in the Jump view in FIG. 21.

In the example shown in FIG. 22. there are displayed in sequence from above disposition of the icons in the Jump view, modes of jumping of the icon and line shapes. It should be noted that the hatched circle in the drawing indicates a selected-artist icon for a selected artist and a white circle indicates a related-artist icon for an artist related to the selected artist. It should be noted that although the icons are indicated with circles in the drawing, they may be shaped otherwise.

First, the circular disposition of icons will be explained. As having been explained above with reference to FIG. 21, an icon for a selected artist is displayed at the center of a circle, while icons of the artists related to the selected artist are displayed on the circumference of the circle.

Note that as shown in FIGS. 21 and 22, the circle may be indicated with a solid or dotted line or the circle may not be displayed. Also, the circle may not be round in shape but may be elliptic or polygonal. Further, icons or characters to be selected may be displayed on a part, not all, of the circumference. For example, icons or characters to be selected may be displayed on a part, not all, of the periphery of a polygon as will be described in detail later with reference to FIG. 39. In this case, an icon displayed at the center and to-be-selected icons or characters disposed on the circumference of a circle or on the periphery of a polygon are displayed being connected to each other with a solid or dotted line.

The disposition of the icons of the related-artist icons on the circumference may be changed without change of the position of the selected-artist icon.

That is, in case one of the related-artist icons disposed on the circumference is selected and thus the related artist becomes a selected artist, the selected related-artist icon disposed on the circumference is relocated to the center of the circle as indicated with an arrow and displayed as an updated selected-artist icon. At this time, the jump from on the circumference to the center of the circle is displayed in the Jump view as indicated with dotted-line circles.

Thus, the user will understand more easily the relocation of the selected artist icon to the position of a selected-artist icon.

Further, between the selected-artist icon and related-artist icons, there is displayed a line indicating the relationship between them. The line may be an "arrow", "dotted line", "bold line" or "different color" depending upon the relationship between the selected-artist icon and related-artist icons. By the side of the line, there may be displayed letters indicating the relationship between the selected-artist and related-artist icons, such as "from Okinawa" (means that the artists are all from Okinawa).

On the other hand, the icons may be disposed in a list form (tree form) that represents a relationship in which a selected-artist icon is a parent while related-artist icons are children of the selected-artist icon. Also in this case, the disposition of the related-artist icons in the place of children may be changed without change of disposition of the selected-artist icon in the place of parent.

Also, in case one of the related-artist icons disposed in the place of children is selected and thus the related artist becomes a selected artist, the related-artist icon disposed in the place of children is relocated to the place of parent as indicated with an arrow and displayed as an updated selected-artist icon in the place of parent. Also at this time, the jump from on the place of children to the place of patent is displayed in the Jump view as indicated with dotted-line circles as in the display of the aforementioned circular disposition.

Also in the list-form disposition, there is displayed, between the selected-artist icon and related-artist icons, a line indicating the relationship between them. The line may be varied in shape from one to another depending upon the relationship between the selected-artist ion and related-artist icons, and the junction between the icon and line may be indicated with a circle, not with any "arrowhead" of an arrow.

FIG. 23 shows another example configuration of the Link window. It should be noted that the parts of the example in FIG. 23, corresponding to those in the example in FIG. 21, are indicated with the same or similar reference numerals as or to those in FIG. 21 and they will not be explained any longer to avoid repetition of the same explanation.

In the example shown in FIG. 23, there is displayed a link window 521 for a user relationship link (will also be referred to as "Friends jump" hereunder wherever appropriate) indicating users related to a user.

The related users include users having been authenticated via the server or the like or having authenticated each other, users belonging to the same group set via the server, etc.

In the link window 521, an icon of "User name A" (will also be referred to as "User icon A" hereunder wherever appropriate) is displayed at the center of the circle 531, and icons of users related to the user having the name A including "User name B", "User name C", "User name D", "User name E", "User name F", "User name G", "User name H" and "User name I" (will also be referred to as "user icons B, C, D, E, F, G, H and I" hereunder wherever appropriate) are displayed on the circumference of the circle 531.

When the display view is changed to the Map view 311 in case the user icon A displayed in the link window 521 of the Jump view 511 configured as above is selected, a grid having assigned thereto contents such as those in a played order list of the user with the user icon A, having been explained above with reference to FIG. 20, is displayed as a round grid in the map in the map window 321 of the Map view 311.

Also, when the display view is changed to the Play List view 411 in case the user icon A displayed in the link window 521 of the Jump view 511 configured as above is selected, a play list of contents such as those in a played order list of the user with the user icon A, having been explained above with reference to FIG. 20 for example, is displayed in the play list window 421 of the Play List view 411.

For example, displaying of a played order list of the user B related to the user A of the PD 5 will be described specifically below. First, the played order list (will be described later with reference to FIG. 20) of the user B, stored in the PD 5 of the user B, is sent from the PD 5 of the user B to the content server 3 by radio communication or the like, for example.

The content server 3 will send the played order list to the PD 5 of the user A related to the user B by radio communication. The PD 5 of the user A selects the played order list of the user B by selecting the user icon B in the user relationship link in the link window 521 displayed on the display screen 131. Thereafter, the user A presses the VIEW button 341, and in response to this user's operation, the PD 5 of the user A will display the played order list by changing the display view to the Play List view 411.

Thus, a play list of contents included in the played order list of the user B is displayed in the play list window 421 on the Play List view 411 as shown in FIG. 20.

When another user icon is selected in the user relationship link in the link window 521 and then the display view is changed to the Play List view as above, the play list of contents included in the played order list of the other user is displayed. Thus, the user can easily listen to a content loved by his friend, for example, namely, to a content in a category he has not positively listened to so far.

Figure 24:
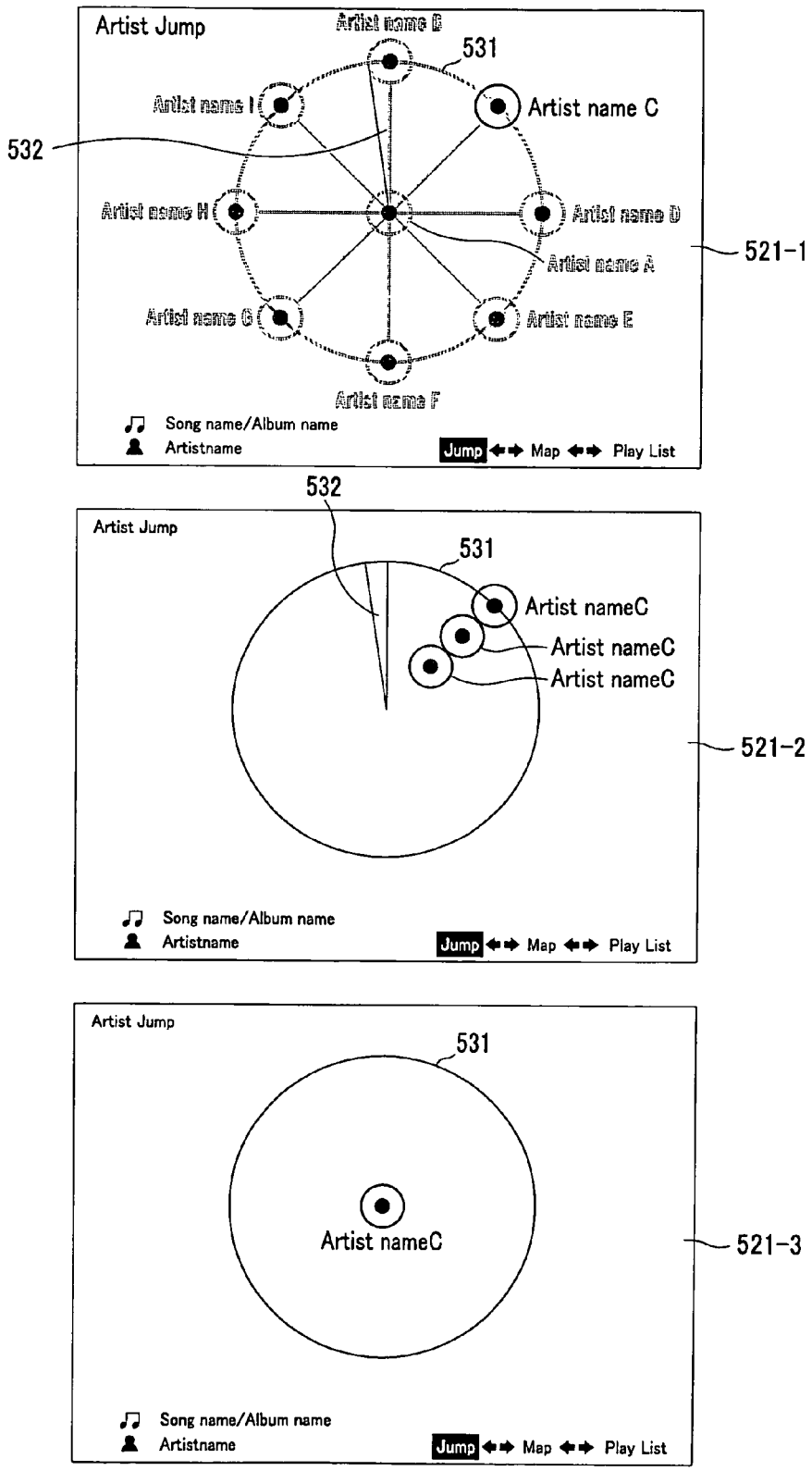
FIG. 24 explains a display jump in the Jump view in FIG. 21.

Next, the display jump in the Jump view will be explained with reference to FIGS. 24 and 25.

When the link window 521 in FIG. 21 is displayed on the display screen 131, for example, the user presses, with his finger or a touch pen, the touch panel 132 in a position corresponding to the artist icon C. In response to this user's operation, the PD 5 will select the artist icon C displayed on the circumference of the circle 531 and displays, as in a link window 521-1, an animation in which the other artist icons disposed at the center and circumference of the circle 531 fade out while the selected artist icon C is being kept as it is as shown in FIG. 24.

Next, the PD 5 will display, as in a link window 521-2, an animation in which the artist icon C jumps from on the circumference of the circle 531, where the artist icon C has been disposed, to the center of the circle 531 where the artist icon A has been displayed in the link window 521 in FIG. 21, and then displays the artist icon C selected in response to the user's operation disposed at the center of the circle 531 as in a link window 521-3.

Figure 25:
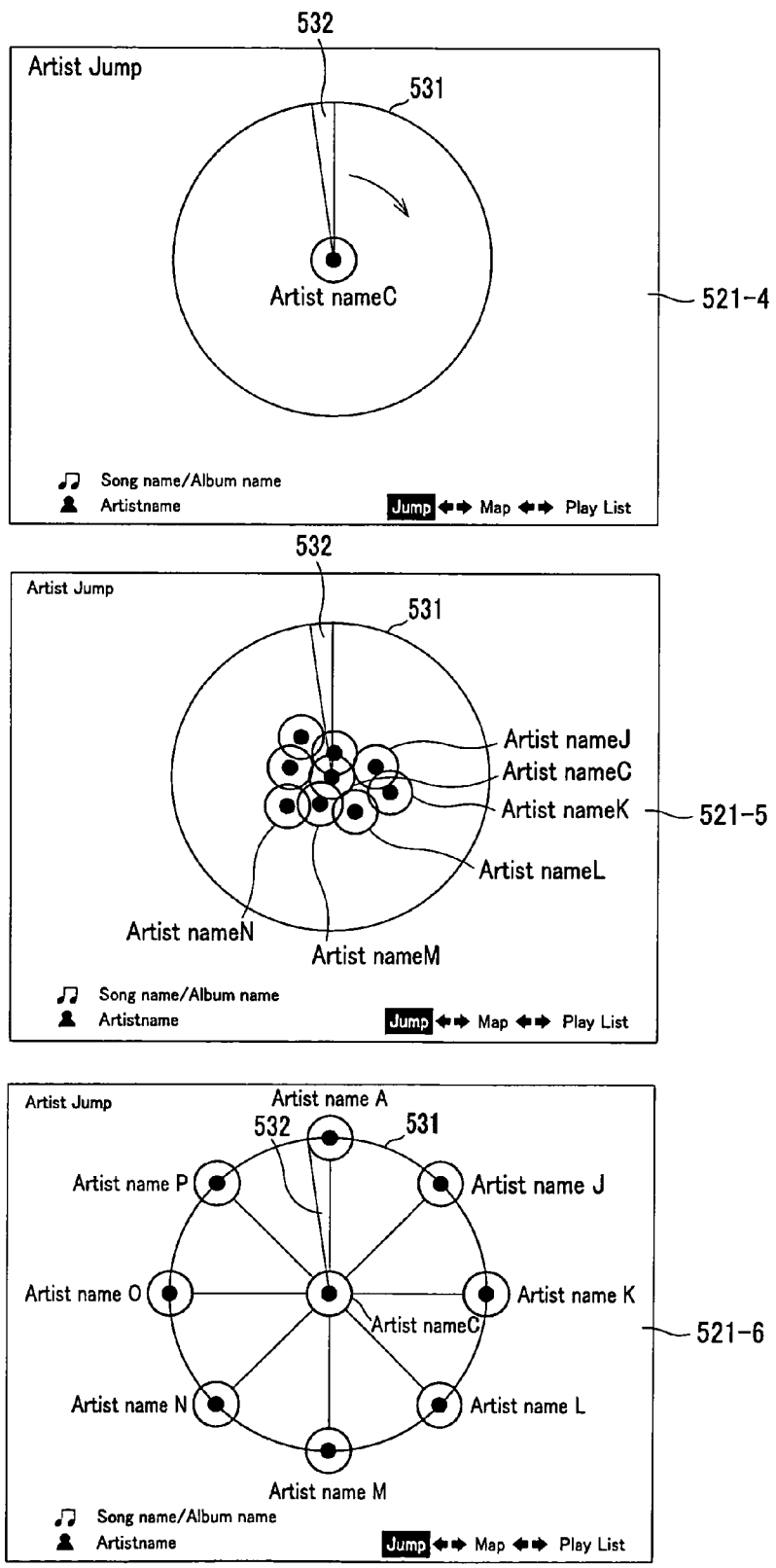
FIG. 25 explains a display jump in the Jump view in FIG. 21.

With the artist icon C being displayed at the center of the circle 531, the PD 5 will display, as in a link window 521-4 in FIG. 25, an animation in which an artist related to the artist corresponding to the artist icon C is being searched, that is, an animation in which the sector mark 532 is about the center of the circle 531.

Further, the PD 5 will display, as in a link window 521-5, an animation in which an artist icon corresponding to an artist related to the artist corresponding to the artist icon C is generated from on the artist icon C disposed at the center of the circle 531 and an animation in which the displayed artist icon jumps to a predetermined position on the circumference of the circle 531, and then displays, as in a link window 521-6, artist icons A, J, K, L, M, N, O and P of artists related to the artist corresponding to the artist icon C in place on the circumference of the circle 531.

By displaying, as an animation, the jump to display the selected artist icon C at the center of the circle 351 and artist icons of the artists related to the artists corresponding to the selected artist icon C on the circumference of the circle 351, it will easily be known to the user that the artist icon C has been selected and the artist icons displayed on the circumference of the circle are related to the selected artist icon C.

Note that although the system configuration using the touch panel 132 (touch panel-type display 116) has been explained above, the touch panel 132 is not any necessary component. That is, a similar display can be made even with the use of, for example, an operation input unit such as a mouse and a display.

Next, the display jump from the Map view to Jump view will be explained with reference to FIG. 26.

When the map window 321 in FIG. 10 is displayed on the display screen 131, for example, a grid with the number "1" is selected and a content included in the play list assigned to the grid with the number "1" is being played, the user presses the VIEW button 341 with his finger or a touch pen to provide a command for jump to the Jump view. In response to this user's operation, the PD 5 will display an animation in which the display view jumps from the Map view to Jump view, for example.

More specifically, the PD 5 will acquire an artist IC corresponding to a connect being played from the content meta data table 181, and display an artist icon 611 corresponding to the artist corresponding to the acquired artist ID on a grid with the number "1", displayed in the map window 321-1, as in the map window 321-1 in FIG. 26.

With the artist icon 611 being displayed, the PD 5 will display a circle 531 in the link window 521 as in the map window 321-2 in FIG. 26, an animation showing a jump of the artist icon 611 displayed on the grid with the number "1" to the center of the circle 531, and has the map displayed in the map window 321 fade out.

Thereafter, the PD 5 displays, as in the link window 521-3 in FIG. 26, the artist icon 611 corresponding to the content being played at the center of the circle 531.

After the artist icon 611 is displayed at the center of the circle 531 as above, similar operations to those having been described above with reference to FIG. 25 and will not be explained any longer to avoid repetition of the same explanation. That is, after displaying the artist icon 611 at the center of the circle 531, the PD 5 will display animations displayed in the link windows 521-4 and 521-5 in FIG. 25 and then display the link window 521 in which the artist icon A (artist icon 611) is disposed at the center of the circle 531.

Even if a next displayed view has inherited information from the former displayed view, for example, the view is only changed in many cases, in which the inheritance of information is not easily known to the user.

On this account, the system is adapted so that when the Map view is changed to the Jump view, an artist icon in the Jump view is generated from a grid whose assigned content is currently played (that is, selected grid) and the jump to the center of the circle 531 in the Jump view is displayed as an animation. Thus, the user can easily know the change from the Map view to the Jump view.

Further, the display jump from the Map view to the Play List view will be explained with reference to FIG. 27.

When the map window 321 in FIG. 10 is displayed on the display screen 131, for example, a grid with the number "1" is selected and a content included in the play list assigned to the grid with the number "1" is being played, the user presses the VIEW button 341 with his finger or a touch pen to provide a command for jump to the Play List view. In response to this user's operation, the PD 5 will display an animation in which the display view jumps from the Map view to Play List view, for example.

Figure 27:
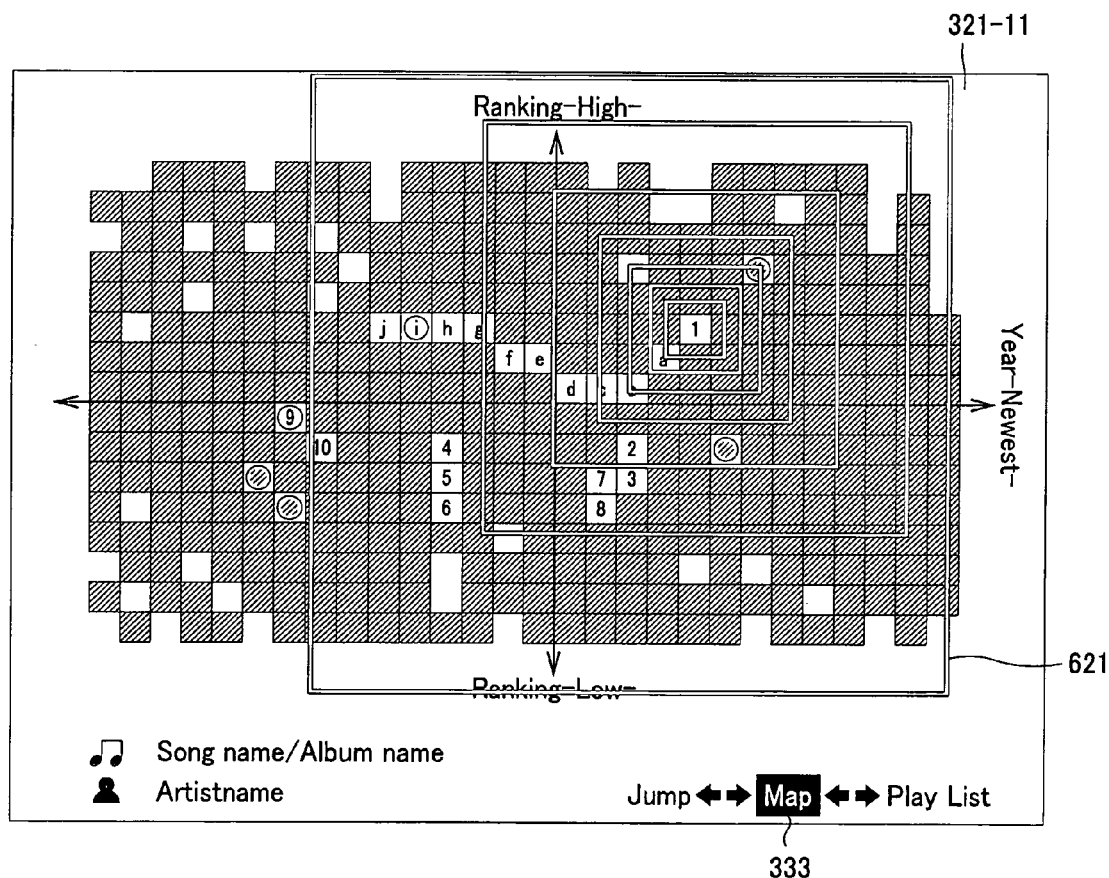
FIG. 27 explains a display jump from the Map view in FIG. 10 to the Play List view in FIG. 17.

More specifically, for the play list from the grid with the number "1" in a map window 521-11 the PD 5 to appear as zoomed up as in the map window 321-11 in FIG. 27, the PD 5 displays an animation in which a rectangle a little larger in size than the grid increases little by little in size in a plurality of steps (7 steps in the example in FIG. 27), and then displays the Play List view 411 in which the play list window 421 as shown in FIG. 17 is displayed.

Thus, the changeover from the Map view to List view will provide a display easier to know than the view display changeover in the past which were difficult to know. Therefore, the user can easily know that a play list corresponding to the grid with the number "1" will be displayed.

Note that although the system configuration using the touch panel 132 (touch panel-type display 116) has been explained above, the touch panel 132 is not any necessary component. That is, a similar display can be made even with the use of an operation input unit such as a mouse and a display.

Figure 28:
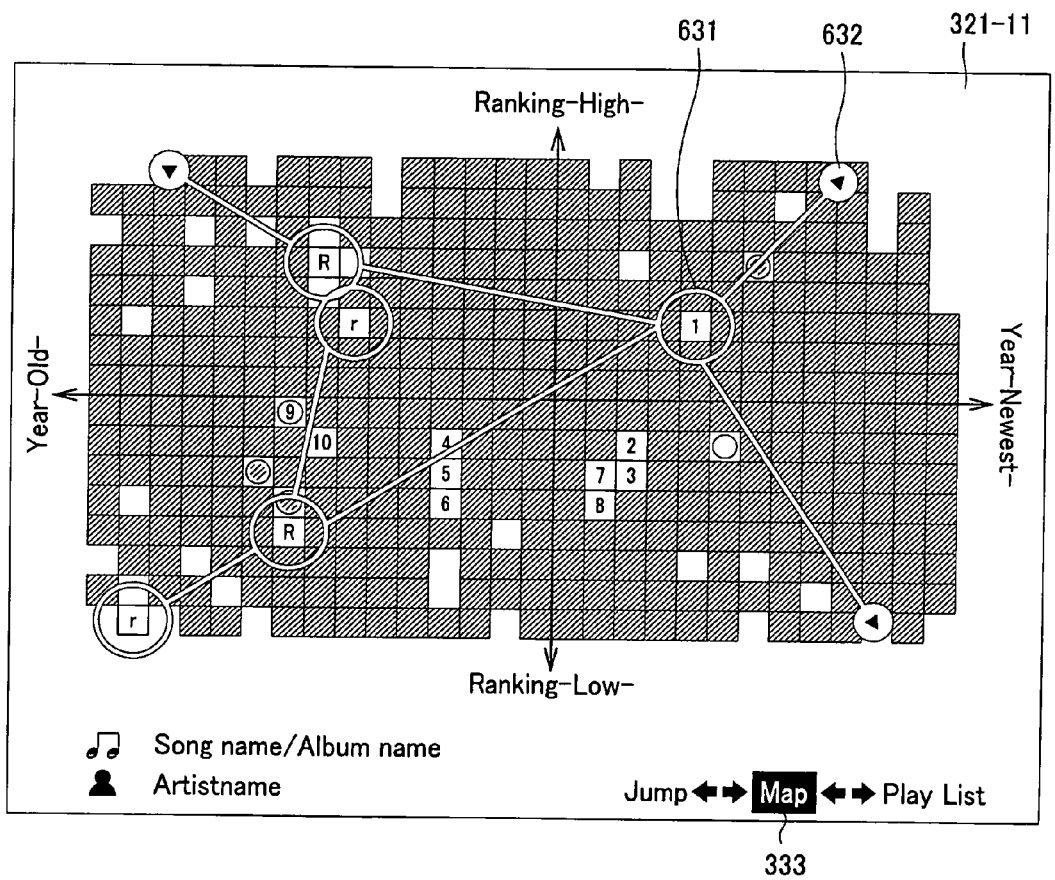
FIG. 28 illustrates another example configuration of the Map view in FIG. 10.

FIG. 28 shows another example of the map window.

In a map window 321-21 in FIG. 28, a grid with the number "1" having assigned thereto a content being played is displayed in a small circle 631 for emphasis. Also, a grid with a letter "R" is also displayed in a small circle 631 for emphasis. The letter "R" indicates that the grid has assigned thereto a content of an artist related to the artist of a content being played. Further, a grid with a letter "r" is also displayed in a small circle 631 for emphasis. The letter "r" indicates that the grid has assigned thereto a content of an artist related to the artist of the content assigned to the grid with the letter "R".

The small circles 631 are connected to each other with lines correspondingly to the relationship among the contents assigned to the grids in the small circles 631. It should be noted that an arrow 632 connected to a small circle 631 with a line indicates that there also exists a grid having assigned thereto a content of an artist related to the artist of a content assigned to the grid displayed in the small circle 631 for emphasis and which is not able to be displayed within the map window 321-21.

In the map window 321-21, the relationship between the artists of contents is shown in the map. The round grid 332 having been described above with reference to FIG. 10 has assigned thereto only contents of the artist selected in the Jump view 511, while the relationship means that there also exist contents of the related artists in the Jump view 511.

That is, since the round grid 332 indicates the inheritance of the selected order list in the Jump view, the grids with the letters "R" and "r" indicate the inheritance of the relationship information in the Jump view. Therefore, it is sufficient that the grids with the letters "R" and "r" can be differentiated from other grids similarly to the round grid 332. Namely, to indicate the inheritance of the relationship information from the Jump view, the grids with the letters "R" and "r" may be formed otherwise (triangular or square, for example), they may be flickering ones or may be differentiated from others with at least one of the shape, color, brightness and luminosity different from those of the other grids. Also, the line connecting the small circle 631 is not limited in type, shape and color.

In other words, the map window 321-21 displays the Map view 311 and Jump view 511 together.

FIG. 29 shows still another example of the map window.

As shown in FIG. 29, the map displayed in the map window 321 is formed from a plurality of grids defined by parameters within a predetermined range whose one axis is a released date (Year) as content meta data.

In the left portion of the drawing, there are displayed "1990", "2002" and "2004" as years of the Christian era from above along the vertical axis in the map. The years shown along the vertical axis are older as they go upward in the drawing and newer as they go downward. It should be noted that the axis scale may not be constant.

The map is formed from a plurality of items (will also be referred to as "grid" herein) laid vertically and defined by parameters within a predetermined range along the vertical axis. Each grid has assigned thereto a play list of at least a content whose released date as content meta data (parameter within the predetermined range) is displayed in the grid.

Arrows 641-1 and 641-2 displayed in the upper and lower portions, respectively, of the map indicate that there exist grids which are not able to be displayed within the map window 321. By pressing the arrows 641-1 or 641-2 to scroll the grids in the map window 321, such grid existing in the direction of the arrow can be displayed within the map window 321.

In the map, each grid has shown therein a value (year) in which a content included in the grid was released.

More specifically, a grid with "before 1975" at the top of the map has assigned thereto a play list of at least one content released before 1975. A grid with "before 1980" has assigned thereto a play list of at least one content released after 1976 and before 1980. A grid with "1990-1992" has assigned thereto a play list of at least one content released between 1990 and before 1992. A grid with "1993-1995" has assigned thereto a play list of at least one content released between 1993 and 1995.

A grid 642 with "1996-1998: No music pieces" has assigned thereto no content released between 1996 and 1998 and it is formed different (hexagonal) from other grids (rectangular).

Also a grid with "1999-2000" has assigned thereto a play list including at least one content released between 1999 and 2000. A grid 643 with "Former half of 2002" has assigned thereto a play list of at least one content released in the former half of 2002. Since the grid 643 has been selected in response to a user's operation and is currently played, it is displayed in a color (black) different from the color of other grids.

A grid with "Latter half of 2002" has assigned thereto a play list of at least one content released in the latter half of 2002. A grid with "Former half of 2003" has assigned thereto a play list of at least one content released in the former half of 2003. A grid with "Latter half of 2003" has assigned thereto a play list of at least one content released in the latter half of 2003.

Further, a grid 622 with "Spring of 2004" has assigned thereto a play list of at least one content released in the spring of 2004. A grid with "Summer of 2004" has assigned thereto a play list of at least one content released in the summer of 2004. In the grid 644 with "Summer of 2004", an icon 644-1 is displayed to emphasize that a content related to the user is assigned to the grid.

A grid 645 with "Fall of 2004" has assigned thereto a play list of at least one content released in the fall of 2004. A grid 645 with "Winter of 2004" has assigned thereto a play list of at least one content released in the winter of 2004. The grid 645 is displayed in a color (hatched) different from that of the selected and other grids to indicate that the year is the current one.

Note that a grid (not shown) the user has set with "Book Mark" may be displayed in a color, shape or pattern different from that of other grids.

Since the map formed from the grids defined by parameters within predetermined ranges of years is displayed in the map window 321, the user can easily select and listen to a content released in his desired year, for example, by selecting a corresponding grid in the map with a touch pen or his finger.

Note that although the background of all the content selection views has been described to be basically in white for the convenience of illustration, it is basically in black in practice. The background color is not limited to white or black but may be any other one.

Figure 30:
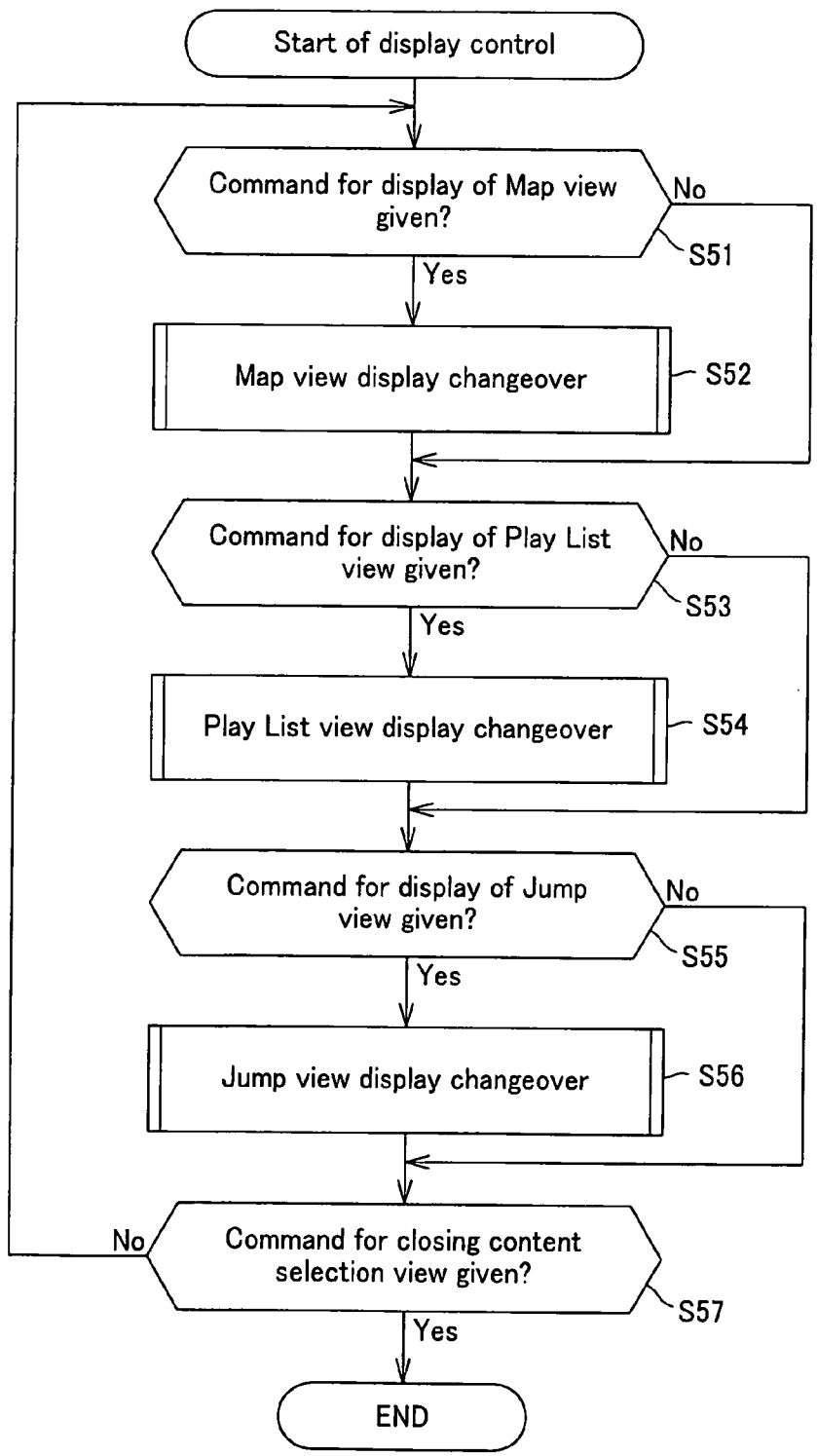
FIG. 30 shows a flow of operations made in display control of the content selection view at the PD in FIG. 1.

Next, the display control of the content selection view of the PD 5 will be explained with reference to the flow diagram shown in FIG. 30.

To enjoy a content recorded in the PD 5, for example, the user operates the touch panel 132 laminated on the display screen 131 of the PD 5 with his finger or a touch pen to provide a command for display of the content selection view.

The input module 153 supplies the selection-position acquisition unit 211 with a command corresponding to the user's operation of the touch panel 132 on the display screen 131. Upon acquisition of selection-position information instructing the display of the content selection view from the command from the input module 153, the selection-position acquisition unit 211 will start controlling the display as in FIG. 30.

In step S51, the selection-position acquisition unit 211 judges whether a command for display of a Map view has been given. In the PD 5, a Map view, for example, is initially set in the content selection view.

Therefore, in case the selection-position acquisition unit 211 has determined in step S51 that the command for display of the Map view has been given, it controls the display form management unit 212 to set the display view to a Map view, and goes to step S52 in which it will controls the information generation controller 214 to make Map view display changeover. More specifically, when a content selection view is initially displayed, the information generation controller 214 displays a Map view (this operation will also be referred to as "initial display of Map view" hereunder). When any other display view is being displayed, the information generation controller 214 will change an other display view to a Map view.

The Map view display changeover will be described in detail later with reference to FIG. 31. In step S52, a Map view is displayed based on selected order information, a play list is displayed in the displayed Map view, and a content in the selected play list is played. In the example shown in FIG. 30, after the content selected in the Map view is played, a next content in the selected play list is played, and continuously played until the user forcibly terminates the cyclic play of the contents in the play list.

Also, the Map view display changeover in step S52 is repeated in response to a user's operation of the touch panel 132 until it is determined that a command for changeover of display view or for closing of content selection view has been given. In case it is determined that a command for changeover of display view or closing of content selection view is given, the operation goes to step S53.

That is, the user provides a command for content selection view display changeover or content selection view closing, and the input unit 153 supplies the selection-position acquisition unit 211 with a command corresponding to the user's operation of the touch panel 132. Then, the selection-position acquisition unit 211 acquires selection-position information from the supplied command, judges based on the acquired selection-position information whether a command for display changeover or content selection view closing has been given, and goes to step S53.

Also, in case it is determined in step S51 that no command for display of a Map view has been given, the operation skips over step S52 to step S53.

In step S53, the selection-position acquisition unit 211 judges based on the selection-position information acquired from the command supplied from the input module 153 whether a command for display of a Play List view has been given. In case it is determined that the command for display of a Play List view has been given, the display form management unit 212 is controlled to set the display view to a Play List view and the operation goes to step S54 in which the information generation controller 214 will be controlled to change the display view to a Play List view. That is, the information generation controller 214 changes the display view from any other display view being displayed to a Play List view.

Figure 33:
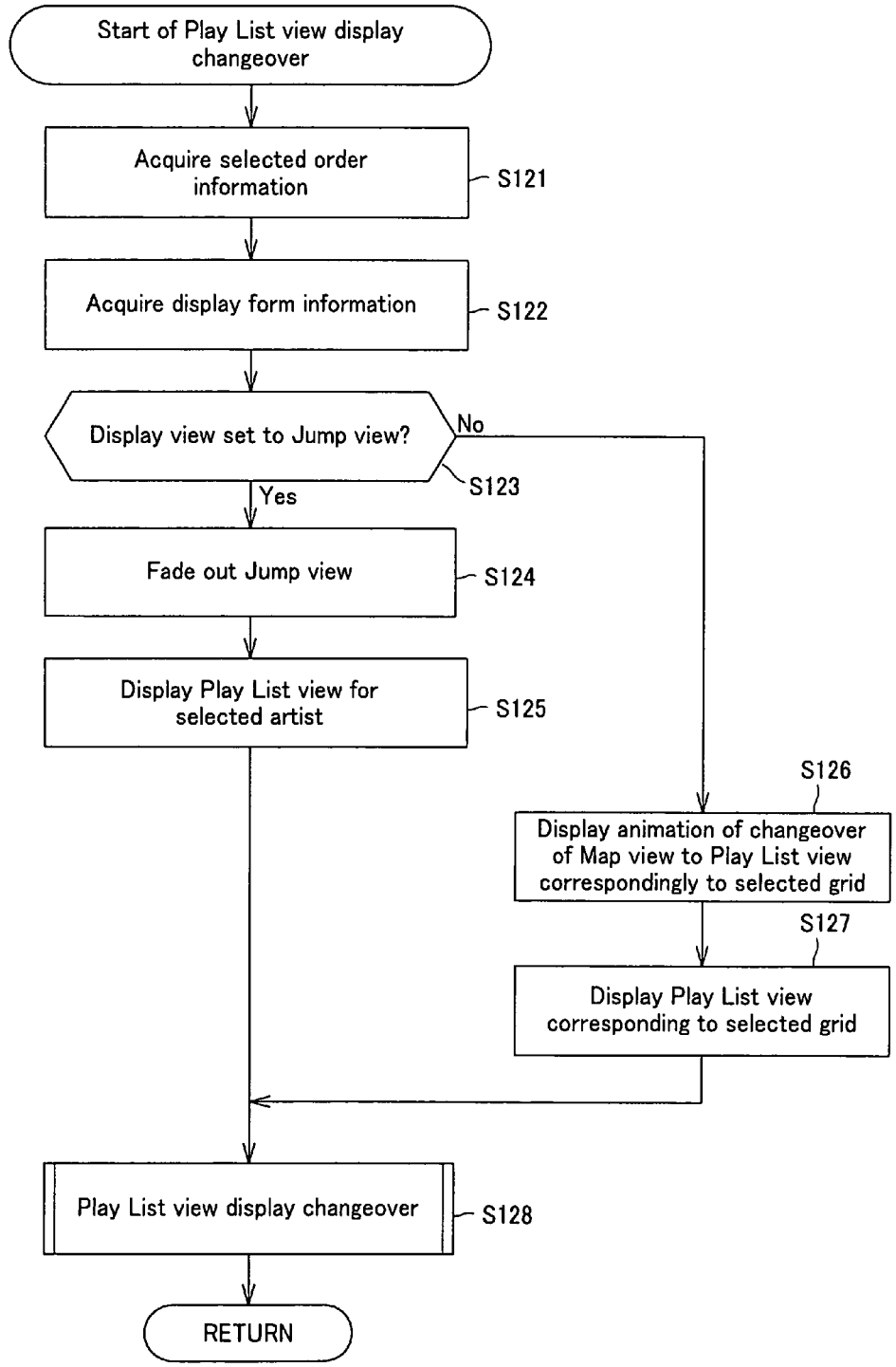
FIG. 33 shows a flow of operations made in Play List view display changeover in step S54 in FIG. 30.

The Play List view display changeover will be described in detail later with reference to FIG. 33. In step S54, a Play List view is displayed based on the selected order information, a content is selected in the displayed Play List view in response to the user's operation, and the selected content is played.

Then, the Play List view display changeover in step S54 is repeated in response to a user's operation of the touch panel 132 until it is determined that a command for changeover of view display or closing of content selection view display has been given in response to a user's operation of the touch panel 132. In case it is determined that a command for changeover of view display or closing of content selection view display has been given, the operation goes to step S55.

Also, in case it is determined in step S53 that the displayed view is not any Play List view, the operation skips step 54 to step S55.

In step S53, the selection-position acquisition unit 211 judges based on the selection-position information acquired from the command supplied from the input module 153 whether a command for display of a Jump view has been given. In case it is determined that the command for display of a Jump view has been given, the selection-position acquisition unit 211 controls the display form management unit 212 to set the display view to a Jump view and the operation goes to step S56 in which it will control the information generation controller 214 to make Jump view display changeover. That is, the information generation controller 214 changes the display view from any other display view being displayed to a Jump view.

Figure 35:
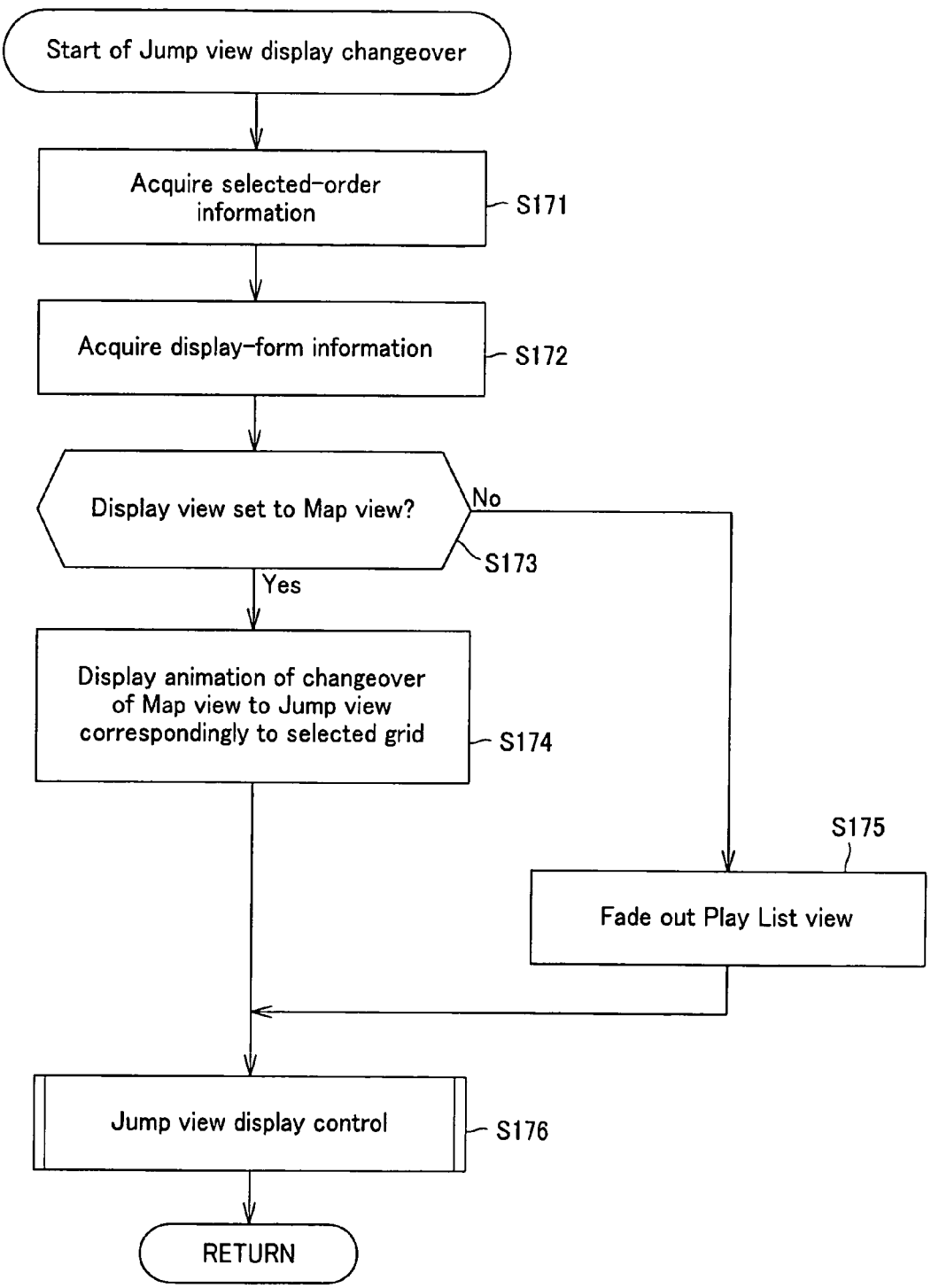
FIG. 35 shows a flow of operations made in Jump view display changeover in step S56 in FIG. 30.

The Jump view display changeover will be described in detail later with reference to FIG. 35. In step S55, a Jump view is displayed based on the selected order information, an artist is selected in the displayed Jump view in response to the user's operation, and the information related to the selected artist is displayed.

Then, the Jump view display changeover in step S56 is repeated in response to a user's operation of the touch panel 132 until it is determined that a command for changeover of view display or closing of content selection view display has been given. In case it is determined that a command for changeover of view display or closing of content selection view display has been given in response to a user's operation of the touch panel 132, the operation goes to step S57.

Also, in case it is determined in step S55 that the set display view is not any Play List view, the operation skips over step S56 to step S57.

In step S57, the selection-position acquisition unit 211 judges based on information supplied from the selection-position acquisition unit 211 whether a command for closing the display of the content selection view has been given. In case it is determined that the command for closing the display of the content selection view has been given, the operation returns to step S51 in which the subsequent operations will be repeated.

In case it has determined based on the selection-position information acquired from the command from the input unit 153 in step S57 that the command for closing the content selection view has been given, the selection-position acquisition unit 211 controls the display module 152 to close the display of the content selection view, and exits the display control.

The user is provided, as above, with three types of content selection view: a Map view in which the user can intuitively select a play list including his desired content on the basis of content meta data, a Jump view in which the user can select (search) contents related to the content, and a Play List view in which the user can select a content from the play list selected in the Map or Jump view.

Thus, the user can select and use a content selection view suiting his purpose, intuitively select a content suiting a user's taste or mood from among various contents the user is not well familiar with and play the selected content.

Next, Map view display changeover in step S52 in FIG. 30 will be explained with reference to the flow diagram in FIG. 31.

When a command for Map view display changeover is supplied from the selection-position acquisition unit 211, the information generation controller 214 acquires, in step S71, selected order information managed by the selected-order list management unit 213, supplies the acquired selected order information to the Map view display controller 216 and goes to step S72.

In step S72, the information generation controller 214 acquires display-form information (preceding display view information and information on currently-set display mode) from the display-form management unit 212, supplies the display-mode information to the Map view display controller 216, and goes to step S73.

In step S73, the information generation controller 214 judges based on the preceding display view information acquired from the display-form management unit 212 whether the display view has been set to a Jump view. In case it is determined that the display view has been set to the Jump view, the information generation controller 214 goes to step S74 in which it will control the relationship-link display controller 215 to fade out the Jump view for changing the Jump view to a Map view, and then goes to step S77.

That is, in step S74, the relationship-link display controller 215 generates view data for an animation (moving picture, frame-advance image or the like) in which the Jump view fades out, and supplies the generated view data to the display module 152. The display module 152 displays a view corresponding to the view data supplied from the relationship-link display controller 215 to the display screen 131.

Note that when the Jump view is faded out, it is blacked out in case the display view is basically block and whited out in case the display view is basically white.

On the other hand, if it is determined in step S75 on the basis of the preceding display view information acquired from the display-form management unit 212 that the display view has not been set to any Jump view, the information generation controller 214 will go to step S73.

In step S75, the information generation controller 214 judges based on the preceding display view information acquired from the display-form management unit 212 whether the display view has been set to a Play List view. In case it is determined that the display view has been set to the Play List view, the information generation controller 214 goes to step S76 in which it will control the Play List view display controller 217 to fade out the Play List view for changing the Play List view to a Map view, and then goes to step S77.

That is, in step S76, the Map view display controller 216 generates view data for an animation (moving picture, frame-advance image or the like) in which the Play List view fades out, and supplies the generated view data to the display module 152. The display module 152 displays, on the display screen 131, a view corresponding to the view data supplied from the Play List view display controller 217.

If it is determined in step S75 on the basis of the preceding display view information acquired from the display-form management unit 212 that the display view has not been set to any Play List view, the information generation controller 214 will go to step S77 for initial display of a Map view.

In step S77, the information generation controller 214 controls the grid map generator 232 to generate a play list of contents corresponding to grids on a map displayed in the Map view with reference to the content meta data table 181 correspondingly to a display mode currently set, generates information on a grid to which the generated play list is to be assigned, supplies the grid information to the Map view display controller 216, and goes to step S78.

In step S78, the information generation controller 214 controls the Map view display controller 216 to display a Map view correspondingly to the grid information generated by the grip map generator 232 and selected order information.

Note that at this time, the information generation controller 214 controls the relationship link generator 231 as necessary for changeover from a Jump view to acquire contents of an artist corresponding to a selected artist icon, controls the grid map controller 232 to also grid information on a play list including the contents acquired by the relationship link generator 231 to the Map view display controller 216.

That is, in step S78, the Map view display controller 216 generates map view data correspondingly to a currently set display mode, grid information generated by the grid map generator 232 and played order list in the selected order information, and supplies the generated map view data to the display module 152. It should be noted that in this case, the dragged order list is reset in case the display view and display mode are changed.

The display module 152 displays a Map view corresponding to the map view data from the Map view display controller 216 to the display screen 131. It should be noted that the Map view may be faded in.

By holding and dragging a grid in the Map view with his finger or a touch pen while referring to the Map view displayed on the display screen 131, the user searches a content and selects and listens to the content by releasing the pressed grid. Alternatively, the user presses the Mode button 342 in the Map view with his finger or a touch pen to provide a command for changing the display mode.

The input module 153 supplies the selection-position acquisition unit 211 with a command corresponding to a user's operation of the touch panel 132 laminated on the display screen 131. The selection-position acquisition unit 211 acquires selection-position information from the command supplied from the input module 153, and judges based on the acquired selection-position information in step S79 whether the grid in the map has been pressed. In case the selection-position acquisition unit 211 has determined that the grid on in the map has been pressed, it will control, in step S80, the information generation controller 214 to make Map view display control and go to step S81. The Map view display control will be explained in detail later with reference to FIG. 32.

That is, in step S80, the dragged order list of content is updated as the user presses the grid in the map view and the Map view display is updated. Also, as the user presses and releases the grid in the Map view, the played order list in a corresponding play list at the selected grid is updated and the Map view is updated correspondingly to the played order list, and the contents in the play list corresponding to the grid is played.

In case it is determined in step S79 that the grid in the map has been pressed, the operation skips over step S80 to step S81.

In step S81, the selection-position acquisition unit 211 judges based on the acquired selection-position information whether the display mode has been changed. In case it is determined in step S81 that the display mode has been changed, the selection-position acquisition unit 211 goes back to step S77 in which it will repeat the operations in step S77 and subsequent steps.

In case the selection-position acquisition unit 211 has determined in step S81 on the basis of the acquired selection-position information that the display mode has not been changed, it goes to step S82 in which it will judge based on the acquired selection-position information whether a command for changeover of view display or closing of content selection view has been given. In case it is determined that the command for the view display changeover or closing of content selection view has been given, the selection-position acquisition unit 21 will exit the Map view display changeover and return to step S52 in FIG. 30, and then go to step S53.

In case it is determined in step S82 that the command for changeover of view display or closing of content selection view has not been given, the selection-position acquisition unit 211 returns to step S79 in which it will repeat the operations in step S79 and subsequent steps.

With the aforementioned operations, Map view data is generated correspondingly to selected order information (selected artist icon, dragged order list or played order list) in order to display a Map view. So, the user can know his selected artist icon, dragged grid or a grid having been played in the past just by watching the Map view during playing.

Note that although the system configuration using the touch panel 132 (touch panel-type display 116) has been explained above, the touch panel 132 is not any necessary component. That is, a similar display can be made even with the use of an operation input unit such as a mouse and a display, for example.

Next, the Map view display control in step S80 in FIG. 31 will be explained with reference to FIG. 32.

In step S101, the selection-position acquisition unit 211 updates the dragged order list managed by the selected-order list management unit 213 on the basis of selection-position information acquired from the command supplied from the input module 153, goes to step S102 in which it will control the information generation controller 214 and update the Map-view display on the basis of the updated dragged order list, and then goes to step S103.

That is, the selection-position acquisition unit 211 acquires information on a grid being pressed (dragged grid) from the selection-position information, and has the selected-order list management unit 213 to update the dragged order list on the basis of the acquired grid being pressed. The information generation controller 214 acquires selected order information from the selected-order list management unit 213, controls the Map view display controller 216 and the Map view.

The Map view display controller 216 generates Map view data on the basis of a play list and grid information generated by the grid map generator 232 (also including grid information on a content in the selected artist), played order list and updated dragged order list, and supplies the generated Map view data to the display module 152. The display module 152 displays, on the display screen 131, a Map view corresponding to the Map view data supplied from the Map view display controller 216.

In step S103, the information generation controller 214 supplies the grid map generator 232 with the selection-position information (information on the grid being pressed), displays an audition content in a play list corresponding to the grid being pressed, and goes to step S104.

That is, the grid map generator 232 acquires a play list corresponding to the grid being pressed on the basis of the play list and grid information, and controls the content playing module 154 to play an audition content corresponding to the acquired play list.

The content playing module 154 reads, from the content DB 172, the audition content data corresponding to the play list supplied from the grid map generator 232, plays the read audition content data, and supplies it to the output module 155. The output module 155 outputs, from the speaker 118, sound corresponding to the data supplied from the content playing module 154.

The selection-position acquisition unit 211 judges in step S104 on the basis of the command from the input module 153 whether the grid has been dragged from the position where it was pressed. In case it determines that the pressed grid has been dragged, it returns to step S101 in which it will repeat the operations in step S101 and subsequent steps.

In case the selection-position acquisition unit 211 has determined in step S104 that the pressed grid has been dragged, it goes to step S105 in which it will judge based on the command from the input module 153 whether the grid in the map has been released from the pressed state. In case it determines that the grid in the map has been released from being pressed, it goes to step S106 in which it will control the selected-order list management unit 213 to set the grid having been selected just before as a selected grid and also update the played order list, and goes to step S107.

That is, the selected-order list management unit 213 sets the selected grid on the basis of the latest selection-position information in the selected order information being managed by the selected-order list management unit 213 and updates the played order list, under the control of the selection-position acquisition unit 211.

The selection-position acquisition unit 211 controls the information generation controller 214 to update the Map view display on the basis of the updated played order list in step S107 and play a content in a play list corresponding to the selected grid in step S108.

That is, in step S107, the information generation controller 214 acquires the played order information from the selected-order list management unit 213, and controls the Map view display controller 216 to update and display the Map view.

The Map view display controller 216 generates Map view data on the basis of a play list and grid information generated by the grid map generator 232 (also including grid information on a content in the selected artist), played order list and updated dragged order list, and supplies the generated Map view data to the display module 152. The display module 152 displays, on the display screen 131, a Map view corresponding to the Map view data supplied from the Map view display controller 216.

In step S108, the information generation controller 214 supplies the grid map generator 232 with on information on the set grid, and displays a content in a play list corresponding to the set grid.

That is, the grid map generator 232 acquires a play list corresponding to the set grid on the basis of the play list and grid information, supplies the acquired play list to the content playing module 154 which will thus play a content corresponding to the acquired play list.

The content playing module 154 reads, from the content DB 172, content data corresponding to the play list supplied from the grid map generator 232, plays the read audition content data, and supplies it to the output module 155. The output module 155 outputs, from the speaker 18, sound corresponding to the data supplied from the content playing module 154.

After completion of the operation in step S108, the Map view display control is ended, the operation returns to step S79 in FIG. 31 once and then goes to step S80.

Since content data is played even during selection of a grid as above and thus sound output is continuously given, the user will not be bored even during grid selection. Further, since content data being played is taken as content data corresponding to the grid being selected, the user can confirm where favorite contents exist in the map by listening to the content data being thus played, and hence he easily can select a favorite content.

Next, the Play list-view display changeover in step S54 in FIG. 30 will be explained with reference to the flow diagram in FIG. 33. It should be noted that a Map view is displayed as a result of the Map view display changeover in step S52 in FIG. 30, a play list is selected in the displayed Map view, and a content in the selected play list is being played.

When supplied with a command for the Play list-display changeover from the selection-position acquisition unit 211, the information generation controller 214 acquires a selected order list managed by the selected-order list management unit 213 in step S121, supplies the acquired selected order list to the Map view display controller 216, and goes to step S122. It should be noted that in the Play List view, the display mode has initially been set to "Play List" mode.

In step S122, the information generation controller 214 acquires display-form information (preceding displayed-view information) from the display-form management unit 212, and goes to step S123.

In step S123, the information generation controller 214 judges based on the preceding displayed-view information acquired from the display form management unit 212 whether the display view has been set to Jump view. In case it is determined that the display view has been set to Jump view, the information generation controller 214 goes to step S124 in which it will control the relationship-link display controller 215 for changeover from the Jump view to Play List view, fade out the Jump view, and goes to step S125.

More specifically, in step S124, the relationship-link display controller 215 generates view data for an animation (moving picture, frame-advance image or the like) in which the Jump view fades out, and supplies the generated view data to the display module 152. The display module 152 displays, on the display screen 131, a view corresponding to the vide data supplied from the relationship-link display controller 215.

In step S125, the information generation controller 214 controls the relationship link generator 231 and Play List view display controller 217 to display a Play List view of a selected artist correspondingly to the selected artist in the selected order list or content played order information.

More specifically, the relationship link generator 231 acquires a content of an artist whose icon has been selected with reference to the content meta data table 181 and artist table 182, and generate a play list. The Play List view display controller 217 generates Play List view data for the selected artist correspondingly to the play list generated by the relationship link generator 231 and a content being played (object to be played), and supplies the generated view data to the display module 152.

The display module 152 displays, on the display screen 131, the Play List view for the selected artist corresponding to the View data supplied from the Map view display controller 216.

On the other hand, in case the information generation controller 214 has determined in step S123 on the basis of the preceding display view information acquired from the display form management unit 212 that the display view has not been set to Jump view, it goes to step S126 for changeover from Map view to Jump view. That is, since the display view has initially been set to Map view in this case, the preceding display view is Map view unless it is Jump view.

Note that in case the display view has initially been set to Play List view, for example, a Play List view corresponding to the selected grid stored in the selected-order list management unit 213 is displayed and a content at the top of the play list is played.

In step S126, the information generation controller 214 controls the Map view display controller 216 to display an animation in which Map view is changed to Play List view correspondingly to a selected grid, and goes to step S127.

More particularly, in step S126, the Map view display controller 216 generates view data for an animation in which a Map view is changed to Play List view (moving picture, frame-advance image, etc.) with reference to FIG. 27, and supplies the generated view data to the display module 152. The display module 152 displays, on the display screen 131, a view corresponding to the view data supplied from the Link view display controller 217.

In step S127, the information generation controller 214 controls the grid map generator 232 and Play List view display controller 217 to display a Play List view corresponding to a selected grid correspondingly to the selected grid or the like, and goes to step S128.

Mode specifically, the grid map generator 232 has generated and stored, in step S77 or S78 in FIG. 32, a play list of a content corresponding to a grid in the map displayed in the Map view with reference to the play list information in the content meta data table 181 or relationship link generator 231. The Play List view display controller 217 generates Play List view data corresponding to a selected grid correspondingly to the play list generated by the grid map generator 232 and content to be played, and supplies the generated view data to the display module 152.

The display module 152 displays, on the display screen 131, the Play List view corresponding to the view data supplied from the Map view display controller 216.

Figure 34:
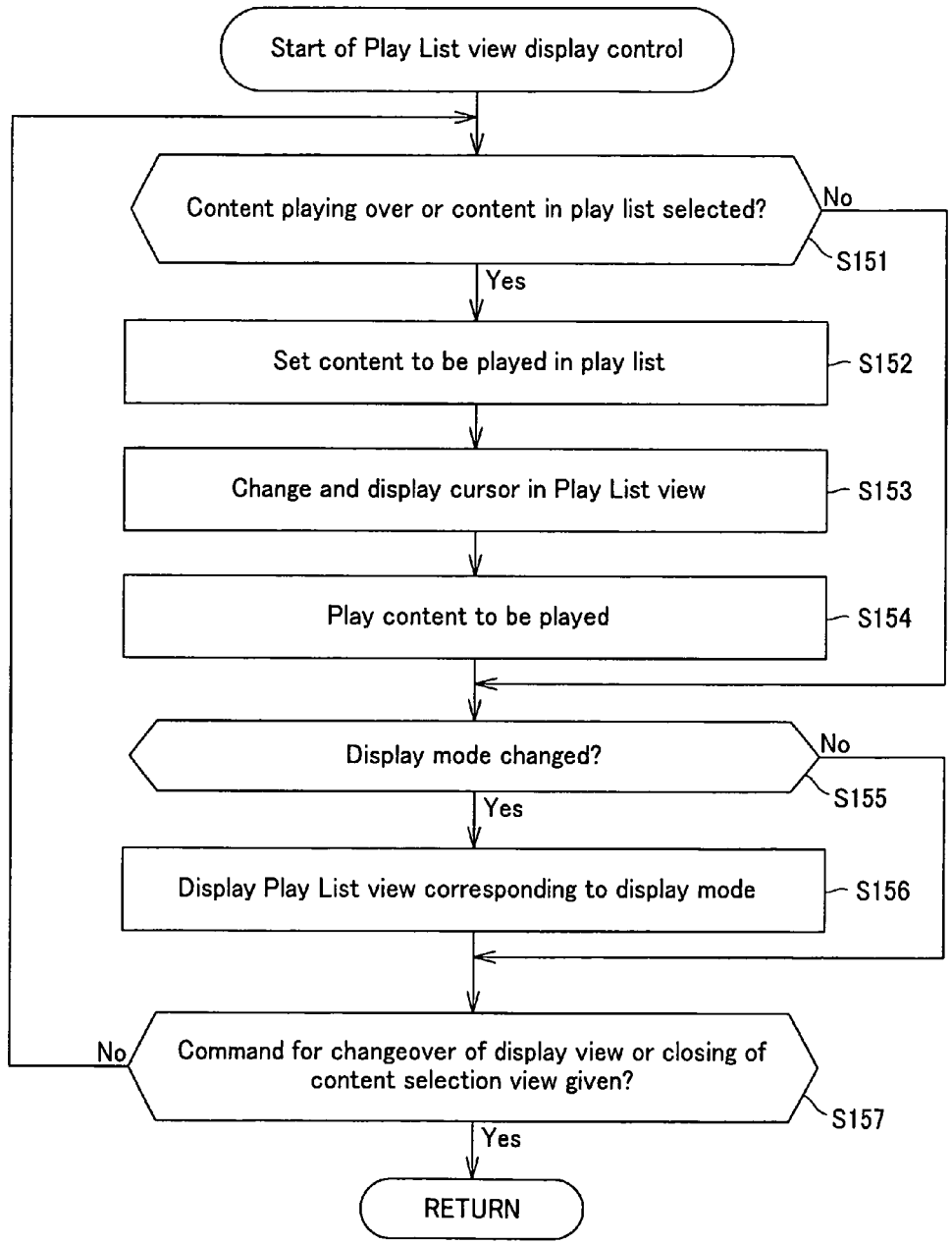
FIG. 34 shows a flow of operations made in Play List view display changeover in step S128 in FIG. 33.

When the Play List view is displayed, the selection-position acquisition unit 211 controls the Play List view display control in step S128. The Play List view display control in step S128 will be explained herebelow with reference to FIG. 34.

While the Play List view is being displayed, a content in the play list, having been played in the Map view, is being played unless the user gives a command for stopping the display.

When the content playing is over, the content playing module 154 will inform the selection-position acquisition unit 211 of the completion of the content playing.

Also, when the Play List view is displayed, the user selects a content name in the Play List view with his finger or a touch pen, change the display mode, operates the VIEW button 341 or Mode button 342 to change the display view or makes an instruction for exiting a content selection view with reference to the Play List view being displayed on the display screen 131. In case the user operates the touch panel 132 laminated on the display screen 131 as above, the input module 153 will supplies the selection-position acquisition unit 211 with a command corresponding to the user's operation of the touch panel.

In step S151, the selection-position acquisition unit 211 judges whether the content playing is over or whether a content in the play list has been selected. Upon reception of the information of the completed playing of the content from the content playing module 154, the selection-position acquisition unit 211 will judge, in step S151, that the content playing is over, and go to step S152.

Also in case the selection-position acquisition unit 211 has determined in step S151 that a content in the play list has been selected based on based selection-position information acquired from the command supplied from the command, it goes to step S152.

In step S152, the selection position acquisition unit 211 controls the information generation controller 214 to set a content to be played in the play list, and goes to step S153. More specifically, the information generation controller 214 controls any of the relationship link generator 231, grid map generator 232 and bookmark generator 233, each having a corresponding play list stored therein, to set a next content in the play list in play as an object to be played in case the content playing is over, and to set a content the user has selected as an object to be played in case the information generation controller 214 has been supplied with selection-position information from the selection-position acquisition unit 211.

In step S153, the information generation controller 214 controls the Play List view display controller 217 to change and display the cursor position in the Play List view correspondingly to the set content to be played, and goes to step S154.

In step S154, the information generation controller 214 reads content data corresponding to a play list supplied from the relationship link generator 231, grid map generator 232 or bookmark generator 233, plays the read content data and supplies it to the output module 155. The output module 155 outputs sound corresponding to data supplied from the content playing module 154 from the speaker 118.

The content playing module 154 reads content data corresponding to a play list supplied from the relationship link generator 2331, grid map generator 232 or bookmark generator 233, plays the read content data and supplies it to the output module 155. The output module 155 delivers, at the speaker 118, sound corresponding to data supplied from the content playing module 154.

In case it is determined in step S151 that the content playing is not yet over and in case no content in the play list has been selected, the selection-position acquisition unit 211 goes to step S155 in which it will judge whether the display mode has been changed.

In case the selection-position acquisition unit 211 is supplied with the command from the input module 153 and determines based on selection-position information acquired from the command that the display mode has been changed, it goes to step S156 in which it will control the display-form management unit 212 to change the display mode and the information generation controller 214 to display a Play List view corresponding to the display mode thus set, and then goes to step S157.

More specifically, the information generation controller 214 controls the Play List view display controller 217 and generates Play List view data corresponding to the set grid correspondingly to a play list and a content to be played, generated by the relationship link generator 231, grid map generator 232 and bookmark generator 233, corresponding to the display mode, and supplies the generated view data to the display module 152.

The display module 152 will display, on the display screen 131, a Play List view corresponding to the view data supplied from the Map view display controller 216.

In case it is determined in step S155 that the display mode has been changed, the selection-position acquisition unit 211 skips the operation in step S156 and goes to step S157.

In step S157, the selection-position acquisition unit 211 is supplied with a command from the input module 153 and judges on the basis of the selection-position information acquired from the command whether a command for changeover of view display or closing of the content selection view has been given. In case the selection-position acquisition unit 211 has determined in step S157 that the command for changeover of view display or closing of the content selection view has been given, it will close the Map view display, and return to step S128 in FIG. 33. Thereafter, the selection-position acquisition unit 211 exits the Play List view display changeover, returns to step S54 in FIG. 30 and goes to step S55.

Also in case the selection-position acquisition unit 211 has determined in step S157 that no command for changeover of view display or closing of the content selection view has been given, it will return to step S151 in which it will repeat the operations in step S151 and subsequent steps.

Since the Play List view is displayed correspondingly to an artist icon selected in a Jump view having previously been displayed or to information on an item such as a grid selected in the Map view as above, the user can check definitely and easily the detail of information on the selected item.

Note that although the artist jump has been explained as an example above, the Friends jump (user relationship-based jump) is basically similar to the artist jump and will not be explained herein.

Next, Jump view display changeover in step S56 in FIG. 30 will be explained with reference to the flow diagram in FIG. 35.

When a command for Jump view display changeover is supplied from the selection-position acquisition unit 211, the information generation controller 214 acquires, in step S171, latest selected order list managed by the selected-order list management unit 213, supplies the acquired selected order list to the relationship-link display controller 215 and goes to step S172.

In step S172, the information generation controller 214 acquires display-form information (preceding display view information) from the display-form management unit 212 and goes to step S173.

In step S173, the information generation controller 214 judges based on the preceding display view information acquired from the display-form management unit 212 whether the display view has been set to a Map view. In case it is determined that the display view has been set to the Map view, the information generation controller 214 goes to step S174 in which it will control the Map view display controller 216 to change the Map view to Jump view and display, correspondingly to the selected grid, an animation in which the Map view is changed to a Jump view, and goes to step S176.

That is, in step S174, the Map view display controller 216 generates view data for an animation (moving picture, frame-advance image or the like) in which the aforementioned Map view is changed to Jump view, having been explained above with reference to FIG. 26, and supplies the generated view data to the display module 152. The display module 152 displays, on the display screen 131, a view corresponding to the view data supplied from the Play List view display controller 217.

On the other hand, in case it is determined in step S173 that the display view has not been set to Map view on the basis of the preceding display view information acquired from the display form management unit 212, the information generation controller 214 goes to step S175 for changeover of the Play List view to Jump view. That is, since the display view has initially been set to Map view in this case, the preceding display view is Play List view unless it is Map view.

Note that the Jump view may initially be set. In this case, a Jump view corresponding to a selected artist icon stored in the selected-order list management unit 213, for example.

In step S175, the information generation controller 214 controls the Play List view display controller 217 to fade out the Play List view, and goes to step S176.

That is, in step S176, the Play List view display controller 217 generates vide data for an animation (moving picture, frame-advance image or the like) in which the Play List view fades out, and supplies the generated view data to the display module 152. The display module 152 displays, on the display screen 131, a view corresponding to the vide data supplied from the relationship-link display controller 215.

In step S176, the information generation controller 214 makes Jump view display changeover. The Jump view display changeover will be explained below with reference to the flow diagram in FIG. 36.

In step S191, the information generation controller 214 controls the relationship-link display controller 215 to display a Jump view (Link window 521-3 in FIG. 24, for example) with a selected artist icon disposed at the center, and goes to step S192.

In step S192, the information generation controller 214 controls the relationship link generator 231 to generate relationship-link information on the selected artist, and goes to step S193 in which it will control the relationship-link display controller 215 to display an animation in which related artists are disposed. Then the information generation controller 214 goes to step S194 in which it will control the relationship-link display controller 215 to display a Jump view with the related-artist icons disposed in predetermined positions on the circumference.

That is, the relationship link generator 231 generates, in step S192, relationship link information as information artists related to the selected artist with reference to the artist table 182 and artist-related table 183 in the meta data DB 171.

In step S193, the relationship-link display controller 215 generates, based on the relationship-link information generated by the relationship link generator 231, an animation (moving picture, frame-advance image or the like) in which the related-artist icon coming from the center jumps to a predetermined position on the circumference, and supplies the generated view data to the display module 152. The display module 152 displays, on the display screen 131, a view corresponding to the view data supplied from the relationship-link display controller 217.

Further, in step S194, the relationship-link display controller 215 generates vide data for a Jump view with the related-artist icon being disposed in a predetermined position on the circumference, and supplies the generated view data to the display module 152. The display module 152 displays, on the display screen 131, a view corresponding to the view data supplied from the List display controller 217.

When the Jump view is displayed, the user operates the touch panel 132 with his finger or a touch pen with reference to the Jump view displayed on the display screen 131 to select an related artist icon in the Jump view, operates the VIEW button 341 to change the display view or gives a command for closing the content selection view display (not shown), for example. In response to a user's operation, if any, the input module 153 will supply the selection-position acquisition unit 211 corresponding to a command to the user's operation of the touch panel 132 laminated on the display screen 131.

When the command is supplied from the input module 153, the selection-position acquisition unit 211 will judge in step S195 on the basis of the selection-position information acquired from the command whether the related artist icon in the Jump view has been selected. In case the selection-position acquisition unit 211 determines in step S195 that the related artist icon in the Jump view has been selected, it goes to step S196 in which it will set (store) the selected related artist icon as a selected artist icon in the selected-order list management unit 213, and goes to step S197.

In step S197, the selection-position acquisition unit 211 controls the information generation controller 214 on the basis of the selected artist icon to display an animation of selected artist display changeover, and returns to step S191 in which it will repeat the operations in step S191 and subsequent steps.

That is, in step S197, the information generation controller 214 controls the Play List display controller 217 to generate view data for an animation (moving picture, frame-advance image or the like) of jumping of a selected related-artist icon from its displayed position to the center of the view, and supplies the generated view data to the display module 152, The display module 152 displays, on the display screen 131, the view corresponding to the view data supplied from the relationship-link display controller 215.

Thereafter, in step S191, a Jump view (Link window 521-3 in FIG. 24, for example) is displayed with the selected artist icon being disposed at the center, and the operations in subsequent steps will be repeated.

In case the selection-position acquisition unit 211 determines in step S195, that the related artist icon in the Jump view has not been selected, it goes to step S198 in which it will be supplied with a command from the input module 153 and judges based on the selection-position information acquired from the command whether a command for changeover of view display or closing of the content selection view display. In case it determines that the command for changeover of view display or closing of the content selection view display has been given, it will exit the Jump view display control and return to step S176 in FIG. 35. Thereafter, the selection-position acquisition unit 211 exits the Jump view display changeover, returns to step S56 in FIG. 30 and then goes to step S57.

Also, in case it is determined in step S198 that no command for changeover of view display or closing of content selection view display has been given, the selection-position acquisition unit 211 returns to step S195 in which it will repeat the operations in step S195 and subsequent steps.

Since an item (icon) selected in the Jump view is displayed at a predetermined position (at the center of a circle) while related items corresponding to artists (contents) related to an artist (content) assigned to the selected item are displayed in predetermined positions on the circumference of the circle along with lines indicating the relationship among the related items, the user can easily check the related contents.

Also, since only the related items related directly to the selected item (that is, items related to the related items (those related indirectly to the selected item) are not displayed, a view easy for the user to understand, not any complicated view difficult to understand, can be provided.

Further, since related items disposed on the circumference are selected and a jump animation indicating the dislocation of the selected item is displayed, the user can easily check the selected item.

Figure 37:
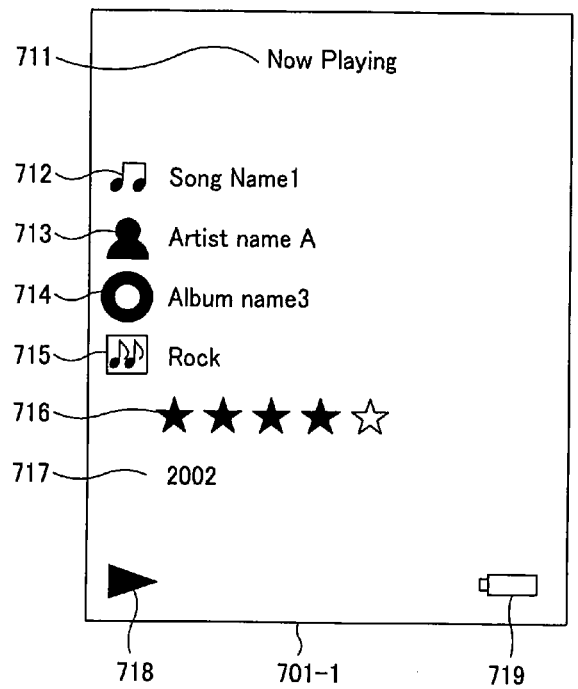
FIG. 37 illustrates another example configuration of the Map view as a content selection view.
Figure 38:
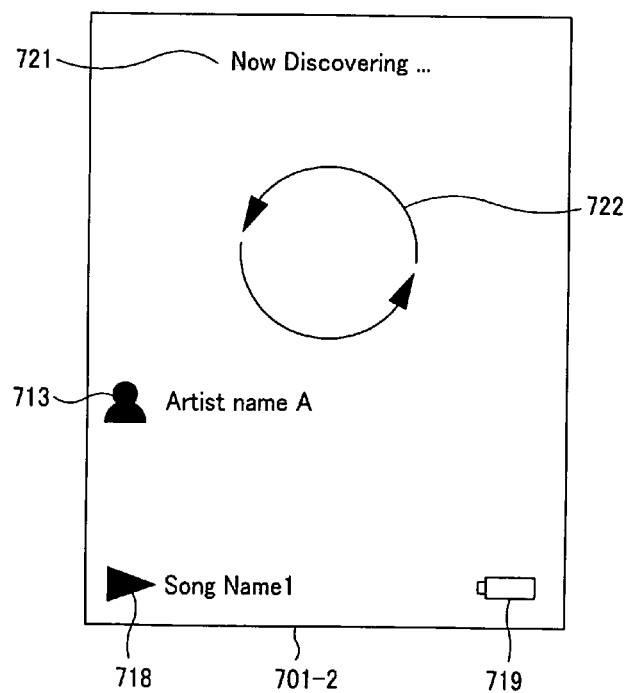
FIG. 38 illustrates another example configuration of the Map view in FIG. 37.
Figure 39:
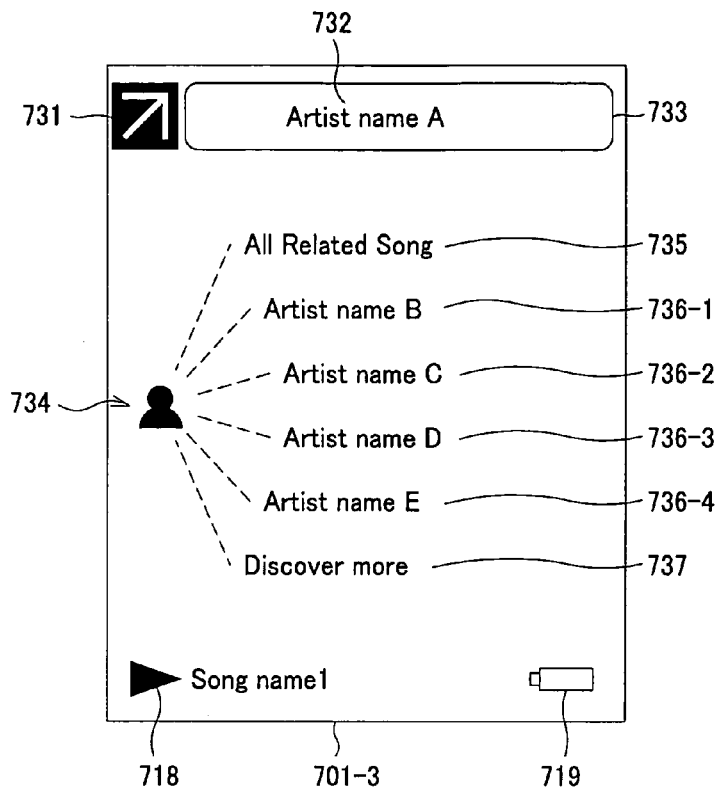
FIG. 39 illustrates another configuration of the Map view in FIG. 37.

Further, another example of the display of related items in the Jump view will be explained with reference to FIGS. 37 to 39. FIGS. 37 to 39 show other example configurations, respectively, of a Jump view which would be in the case of the Artist Jump in FIG. 21.

In the example configurations shown in FIGS. 37 to 39, there is only a part corresponding to the Link window 521 in FIG. 21. That is, the control/setting window 522 may be configured or not as in FIG. 21.

Also, the Jump view in the examples in FIGS. 37 to 39 is formed from three views: a view 701-1 displayed while a content is being played (will be referred to as "now-playing view" hereunder), view 701-2 displayed while a related artist related to an artist whose content is currently played (will be referred to as "new-discovery view" hereunder) and a view 701-3 displayed as the result of search for the related artist (will be referred to as "related-artist view).

FIG. 37 illustrates an example configuration of the current-playing view 701-1. The now-playing view 701-1 is displayed on the display screen 131 while the content of a selected artist is being played.

In the uppermost portion of the now-playing screen 701-1 in FIG. 37, there is displayed, as a view title 711, a legend "Now Playing" indicating that the now-playing view 701-1 is being displayed, namely, that a content displayed in this view is being played.

Below the view title 711, there is displayed information related to a content being played. Namely, below the view title 711, there are displayed a note icon 712 indicating a content and a legend "Song name 1" indicating that a content being played is titled "Song name 1". Below the note icon 712, there are displayed a human-shaped icon 713 indicating an artist and a legend "Artist name A" indicating that the name of the artist of the content being played is "Artist name A".

Below the human-shaped icon 713, there are displayed a disk icon 714 indicating an album and a legend "Album name 3" indicating that the name of the album including the content being played is "Album name 3". Below the disk icon 714, there are displayed an music icon 715 indicating a content genre and a legend "Rock" indicating that the genre of the content being played is a rock.

Further, below the music icon 715, there are displayed "★★★★☆" (four black star symbols and one white star symbol) as a rating 716 indicating a rating of the content being played. Below the rating 716, there are displayed numerals "2002" as a data of release 717 indicating that the content being played was released in 2002. It should be noted that the rating has been made by the user on the content and is recorded in the content meta data table 181 in FIG. 6.

Also, a rightward-directed arrow icon 718 indicating that a content is being played is displayed in the lower left portion of the now-playing view 701-1 and a battery icon 719 indicating the residual potential of a rechargeable battery is displayed in the lower right portion of the now-playing view 701-1.

When the artist jump function is selected by the user operating any of the buttons (not shown) displayed on the control/setting window 522 (as in FIG. 21) or of buttons provided on the surface of the casing of the PD 5 while the now-playing view 701-1 configured as above is being displayed, search for artists related to the artist of a content being played (that is, artist named A) is started, and the new-discovery view 701-2 in FIG. 38 is displayed on the display screen 131.

FIG. 38 shows an example configuration of the new-discovery view 701-2. The new-discovery view 701-2 is displayed from start of search for the artists related to the artist being displayed in the now-playing view 701-1 in FIG. 37 until the search is complete. Namely, it is displayed during the search. That is, the new-discovery view 701-2 shows a change from the now-playing view 701-1 to the related-artist view 701-3.

In the uppermost portion of the new-discovery view 701-2 in FIG. 38, there are displayed a legend "Now Discovering . . ." as a view title 721 indicating that the new-discovery view 701-2 is being displayed, namely, that artists related to an artist displayed in the view are being searched.

Also, below the view title 721, there is displayed an animation image 722 indicating the search for the related artists with a rotation of an arrow. Below the animation image 722, there are a human-shaped icon 713 and a legend "Artist name A" indicating that the name of the artist whose content is currently played is "Artist name A" and that the artists related to the artist are being searched.

Further, in the lower left portion of the new-discovery view 701-2, there are displayed a rightward-directed arrow icon 718 similar to that in FIG. 37 and a legend "Song name 1" indicating that the name of a content being played is "Song name 1". In the lower right portion, there is displayed a battery icon 719 as in FIG. 37.

When the search for related artists is over while the new-discovery view 701-2 configured as above is being displayed, a related-artist view 701-3 as in FIG. 39 is displayed on the display screen 131.

FIG. 39 shows an example configuration of the related-artist view 701-3. The related-artist view 701-3 displays the result of search for related artists.

In the uppermost portion of the related-artist view 701-3 in FIG. 39, there are displayed a search-result icon 731 and a legend "Artist name A" as a view title 732 indicating that the related-artist view 701-3 is being displayed, namely, that information displayed in this view is the result of search for artists related to the "Artist name A".

Thus, the user can make sure that the name of an artist of a content being played and whose related artists have been discovered as the result of search is "Artist name A". Also, in the example shown in FIG. 39, a cursor 733 is displayed on the view title 732.

Below the view title 732, there are displayed a human-shaped icon 734 indicating "Artist name A" whose related artists have been discovered and six dotted lines extending radially outwardly from a part of the circumference of a vertically long small ellipse (ellipse from which the dotted lines start their radial extension) surrounding the human-shaped icon 734. At the other ends of the dotted lines, namely, at points of the circumference (at intersections of the six dotted lines with the circumference) of a vertically long larger ellipse surrounding the human-shaped icon 734, there is displayed a legend "All Related Song" 735 for selection of contents of all the related artists, artist names "Artist name B", "Artist name C", "Artist name D" and "Artist name E" 736-1 to 736-4 indicating that these artist names have been discovered as the result of search, and a legend "Discover More" 737 for making further search.

That is, in the example in FIG. 39, above the periphery (of a polygon) around the human-shaped icon 734 corresponding to the selected content, there are displayed icons or legends indicating artists related to the artist displayed at the center.

When the button the cursor 735 displayed on the view title 732 is displayed on the legend 735 by operating any of the buttons (not shown) displayed on the control/setting window 522 or of buttons provided on the surface of the casing of the PD 5, contents of all the related artists will be played sequentially and there is displayed the now-playing view 701-1 in which information on the content being played is indicated.

Also, when the cursor 733 displayed on the view title 732 is moved by a user's operation onto any of the related artist names 736-1 to 736-4, the contents of one of the related artists, focused by the cursor 733, will be played sequentially and there will be displayed the now-playing view 701-1 in FIG. 37 in which information on the content being played is indicated.

Further, when the cursor 733 displayed on the view title 732 is moved by a user's operation onto the legend 737, search for the artists related to the artist of the content being played will be made again, and the display screen 13 will display the new-discovery view 701-2 in FIG. 38.

Note that in this case, the system may be adapted such that when the user operates any of the buttons displayed on the control/setting window 522 (not shown) or of buttons provided on the surface of the casing of the PD 5 with the cursor 733 being displayed on the legend 737, the above function is set to redo the search for artists related to the artist of a content being played. Also, this search is made in a wider range than the previous search. As the result, information (names) of more artists less related to the artist whose content is being played is displayed in the related-artist view 701-3 after completion of the search.

On the other hand, in the lower left portion of the related-artist view 701-3, there are displayed a rightward-directed arrow icon 718 similar to that in FIG. 37 and legend "Song name 1" indicating that the name of a content being played is "Song name 1". In the lower right portion, there is displayed a battery icon 719 as in FIG. 37.

When artists related to the artist of the content being played are discovered while the related-artist view 701-3 configured as above is being displayed, the display screen 131 will display the new-discovery view 701-2 in FIG. 38. When a command for play of contents of the related artists is given, the display screen 131 will display the now-playing view 701-1 in FIG. 37 in which information on the content being played is indicated.

Namely, in the Jump view in FIGS. 37 to 39, display in the now-playing view 701-1, display in the new-discovery view 701-2 or display in the related-artist view 701-3 is repeated in response to a user's operation. Icons or legends of related artists may be displayed at a part of the circumference, not on the entire circumference, of an ellipse around the human-shaped icon 734 for the selected artist, which is one of the examples of display of the related items in the Jump view.

In the above case, the display area of the view can be used mode effectively in case the display area is not so wide or in case the artist of a content being played has not so many related artists.

As having been described above, there are provided the three types of content selection views including the Map view in which the user can intuitively select a play list including a desired content from meta data of the content, Jump view in which the user can select (search) contents related to a content, and the Play List view in which the user can select a content from a play list selected in the Map or Jump view.

Thus, the user can select and play a content suiting his taste and mood from among various contents unknown to him with the use of one of the content selection views.

Further, since these three types of content selection views have inherited selection information from each other, selective use of the content selection views permits the user to select a content suiting his taste with a large ease than in case the user selects a content using one of the content selection views.

Note that the three types of content selection views have been explained above, the present invention is not limited only to these content selection views but a content selection view having another configuration may be used in addition.

Figure 40:
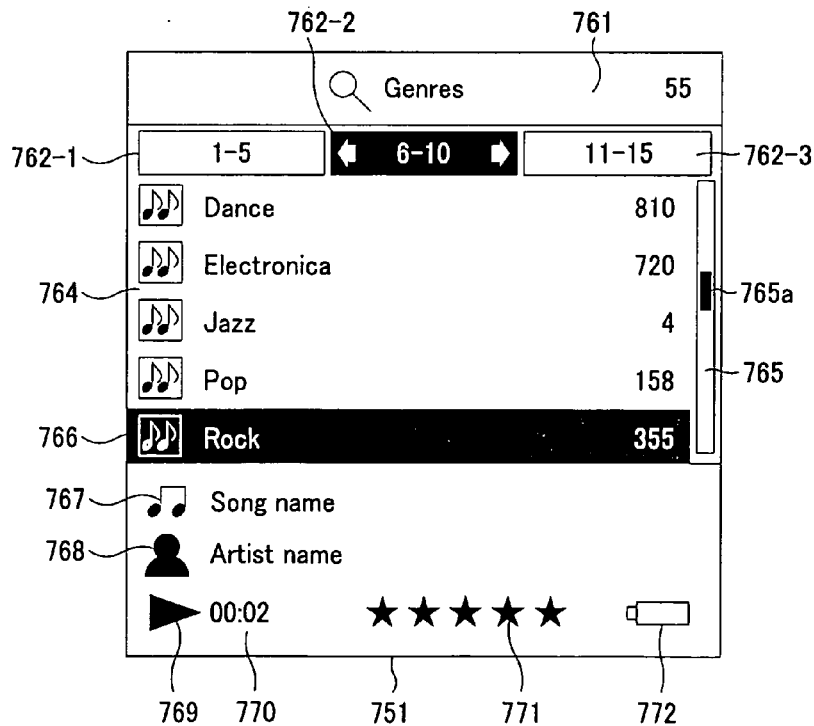
FIG. 40 illustrates an example configuration of a Filter view as a content selection view.

FIG. 40 shows an example configuration of a Filter view as a content selection view. A part of the Filter view corresponding to the map window 321 in FIG. 10, for example, is illustrated in FIG. 40. That is, the Filter view may also have provided therein the control/setting window 322 as in FIG. 10. However, the control/setting window 321 may not be provided so.

In FIG. 40, the Filter view is indicated with a reference numeral 751. In the Filter view 751, contents recorded in the PD 5 are filtered based on their predetermined meta data to narrow down them, the contents thus selected are displayed according to the meta data, and a content is selected with reference to the displayed meta data.

Note that in the aforementioned Map view 311 in FIG. 10, a play list of at least one content is assigned to each of the grids in the map having at least one axis along which predetermined content meta data is indicated. That is, the contents recorded in the PD 5 are filtered based on the predetermined content meta data to narrow down the contents, and the result of the narrowing is displayed in the form of a map. The Map view 311 displays the result of the narrowing in the Filter view 751 in the form of a map.

Also, the aforementioned Play List view 411 displays a list of contents, while the Filter view 751 displays a result of narrowing down, by filtering, all contents list displayed on the Play List view 411. That is to say, the Filter view 751 is a content selection view taking a position between the Play List view 411 and Map view 311. Therefore, when moving a display from the Play List view 411 to the Map view 311, the display can easily be displayed in the Filter 751 once. On the contrary, when moving a display from the Map view 311 to the Play List view 411, the display can easily be displayed in the Filter view 751 once.

Next, the Filter view 751 will be explained in detail.

In the example shown in FIG. 40, there is shown the Filter view 751 which is in the "Genre" display mode. That is, in the Filter view 751 in FIG. 40, contents recorded in the PD 5 are filtered based on their genres to narrow down them, the result of the narrowing is displayed according to each genre type, and a content to be played is selected by selecting one of the displayed genres. It should be noted that the Filter view 751 in FIG. 40 is generated with reference to genres of contents stored in the content meta data table 181 in FIG. 6.

In case a button (not shown) in the control/setting window 522 (in FIG. 21) or a button provided on the surface of the casing of the PD 5 is operated by the user to select, for example, a Genre-mode filtering function (list search function of a genre filter), the Filter view 751 in the Genre mode as in FIG. 40 is displayed. It should be noted that the Filter view 751 in the Genre mode is displayed in the Map view and a Map window 321 in the Genre mode as in FIG. 13 is displayed. Also in this case, the Jump view can be displayed as in jumping of the other content selection view.

In the uppermost portion of the Filter view 751 which is in the Genre mode, there is displayed a view title 761. The view title 761 includes a magnifying-glass icon indicating a filtering function, legend "Genres" indicating that the Filter view 751 is in the Genre mode and numerals "55" indicating the number of genres of the contents recorded in the PD 5.

Below the view title 761, there are indicated a left tag 762-1, central tag 762-2 and right tag 762-3, which are icons for use to quick switch pages each containing five items of information indicated in a filtering-result display area 764. It should be noted that these tags are generically called "tag 762" wherever appropriate.

In the central tag 762-2, there is indicated tag information intended for easily knowing information on each item in a page currently indicated in the filtering-result display area 764 (serial number, initial (alphabet), etc., for example). It should be noted that the central tag 762-2 is highlighted for emphasis.

In the left tag 762-1, there is indicated tag information indicative of an order earlier than that of the tag information in the central tag 762-2. The right tag 762-3 indicates tag information indicative of an order next to that of the tag information in the central tag 762-2.

When the left tag 762-1 is selected in response to a user's operation, information on an item corresponding to the tag information having been in the left tag 762-1 is indicated in the filtering-result display area 764, tag information having been in the left tag 762-1 is indicated in the central tag 762-2, tag information having been in the central tag 762-2 is indicated in the right tag 762-3, and tag information ordered before the tag information in the left tag 762-1 is indicated in the left tag 762-1.

Note that in case the tag information displayed in the left tag 762-1 has been the leading one of the tag information, the last tag information will be indicated in the left tag 762-1.

On the other hand, when the right tag 762-3 is selected in response to a user's operation, information on an item corresponding to the tag information having been in the right tag 762-3 is indicated in the filtering-result display area 764, tag information having been in the right tag 762-3 is indicated in the central tag 762-2, tag information having been in the central tag 762-2 is indicated in the left tag 762-1, and tag information ordered after the tag information in the right tag 762-3 is indicated in the right tag 762-3.

In the example in FIG. 40, the central tag 762-2 has indicated therein numerals "6-10", as tag information, indicating that the genres indicated in the filtering-result display area 764 are sixth to tenth ones of all the genres, a leftward-directed arrow indicating that the left tag 762-1 is located before the central tag 762-2 and rightward-directed arrow indicating that the right tag 762-3 is located after the central tag 762-2. Also, the central tag 762-2 is highlighted for emphasis.

The left tag 762-1 has indicated therein numerals "1-5", as tag information, indicating that the orders preceding that indicated in the central tag 762-2 are first to fifth ones. The right tag 762-3 has indicated therein numerals "11-15", as tag information, indicating that the orders following that indicated in the central tag 762-2 are eleventh to fifteenth ones.

When the left tag 762-1 is selected in response to a user's operation, the filtering-result display area 764 will have indicated therein information on items (genre name) corresponding to the first to fifth orders having been indicated in the left tag 762-1, the central tag 762-2 will have indicated therein the tag information "1-5" having been indicated in the left tag 762-1, the right tag 762-3 will have indicated therein the tag information "6-10" having been indicated in the central tag 762-2, and the left tag 762-1 will have indicated therein the tag information ordered before the tag information "1-5" having been indicated in the left tag 762-1 (that is, last information "50-55" since there is no order number before the "1-5").

On the other hand, when the right tag 762-3 is selected in response to a user's operation, the filtering-result display area 764 will have indicated therein information on items (genre name) corresponding to the eleventh to fifteenth orders having been indicated in the right tag 762-3, the central tag 762-2 will have indicated therein the tag information "11-15" having been indicated in the right tag 762-3, the left tag 762-1 will have indicated therein the tag information "6-10" having been indicated in the central tag 762-2, and the right tag 762-3 will have indicated therein the tag information ordered after the tag information "11-15" having been indicated in the right tag 762-3 (that is, last information "16-20").

In the example in FIG. 40, with the tag 762 being operated, information on items indicated in the filtering-result display area 764 is changed at every 5 items, that is, at every page.

In the filtering-result display area 764, there is indicated a page carrying information on five items. The page and information indicated in the filtering-result display area 764 are changed in response to a user's operation, that is, with selection of the tag 762 or scrolling of a scrolling cursor 765a in a scroll bar 765.

In the filtering-result display area 764 in FIG. 40, there are indicated, as first information, a music icon indicating a genre, legend "Dance" indicating that the genre name is "Dance" and numerals "810" indicating the number of contents of all contents stored in the PD 5, of which the genre is "Dance". The filtering-result display area 764 has indicated therein, as second information, a music icon indicating a genre, legend "Electronica" indicating that the genre name is "Electronica" and numerals "720" indicating the number of contents of all contents stored in the PD 5, of which the genre is "Electronica". Also, the filtering-result display area 764 has indicated therein, as third information, a music icon indicating a genre, legend "Jazz" indicating that the genre name is "Jazz" and numerals "4" indicating the number of contents of all contents stored in the PD 5, of which the genre is "Jazz".

Further, the filtering-result display area 764 has indicated therein, as fourth information, a music icon indicating a genre, legend "Pops" indicating that the genre name is "Pops" and numerals "158" indicating the number of contents of all contents stored in the PD 5, of which the genre is "Pops". Also, the filtering-result display area 764 has indicated therein, as fifth information, a music icon indicating a genre, legend "Rock" indicating that the genre name is "Rock" and numerals "355" indicating the number of contents of all contents stored in the PD 5, of which the genre is "Rock".

Also, in the example in FIG. 40, the fifth information is selected with the cursor 766 being moved thereto, and highlighted. That is, currently, a content of which the genre is "Rock" is being played in the PD 5. The user selects a desired genre by moving the displayed position of the cursor 766 to an item (genre) in the filtering-result display area 764. Thus, the genre selected with the cursor 766 being moved thereto is highlighted and the content of the highlighted genre is played.

Note that the order (priority) in which the contents of the selected genre are played is preset correspondingly to a parameter or the like of predetermined content meta data as in the Map view 311 having been explained above with reference to FIG. 10. This is also true for the Filter view 751 which in any other display mode which will be explained herebelow.

Also, the order of playing may be set for each display mode or the same order of playing may be set for all display modes.

To the right of the filtering-result display area 764, there is displayed the scroll bar 765. As the user moves the scroll cursor 765a moving vertically along the scroll bar 765, items indicated in the filtering-result display area 764 are vertically scrolled one by one. It should be noted that the position of the scroll cursor 765a in the scroll bar 765 is also changed in response to an operation of the tag 762 and the display of the tag 762 is also changed in response to a movement of the scroll cursor 765a.

Below the filtering-result display area 764, there are indicated a note icon 767 and legend "Song name 1" indicating that the name of a content being played is "Song name 1". Below the note icon 767, there are indicated a human-shaped icon 768 and legend "Artist name" indicating that the name of an artist of the content being played is "Artist name".

Also, in the lower left portion of the Filter view 751 in the example in FIG. 40, there are indicated a rightward-directed arrow icon 769 indicating that a content is being played, an elapsed time 770 from the start of playing and a rating 771 of the content being played. The elapsed time from the start of playing the content being played is "00:02" (2 seconds), and the rating of the content being played is "★★★★★" (five stars). In the lower right portion of the Filter view 751, there is indicated a battery icon 772 similar to the battery icon 719 in FIG. 37.

In the Filter view 751 in the example in FIG. 40, since all contents stored in the PD 5 are narrowed down at each genre, the user can select and play only contents of his favorite genre.

Figure 41:
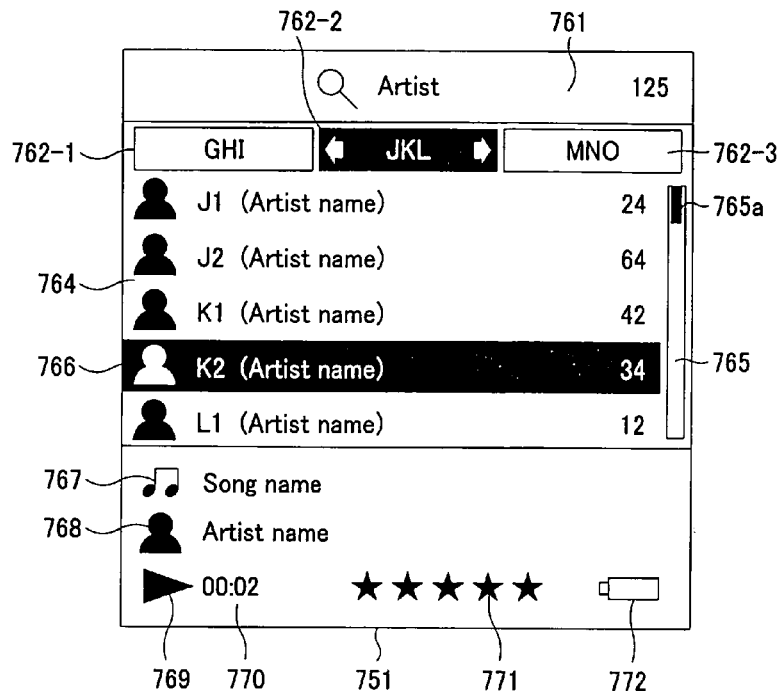
FIG. 41 illustrates another example configuration of the Filter view in FIG. 40.

FIG. 41 shows an example configuration of the Filter view which is in the "Artist" display mode. It should be noted that the example in FIG. 41 is basically similar in configuration to the Filter view in the Genre mode having been explained above with reference to FIG. 40 except for the display mode and so its explanation will be partially omitted wherever appropriate and only different parts will be described in detail.

More specifically, with the Filter view 751 in FIG. 41, contents recorded in the PD 5 are filtered based on their artist name to narrow down them, the result of the narrowing is displayed according to each artist name, and a content to be played is selected by selecting one of the displayed artist names. It should be noted that the Filter view 751 in FIG. 41 is generated with reference to identifiers of the artists of contents stored in the content meta data table 181 in FIG. 6, artist names in the artist table 182, etc.

In the uppermost portion of the Filter view 751 which is in the Artist mode, there is displayed a view title 761. The view title 761 includes a magnifying-glass icon indicating a filtering function, legend "Artist" indicating that the Filter view 751 is in the Artist mode and numerals "125" indicating the number of artists of the contents recorded in the PD 5.

In the example in FIG. 41, the left tag 762-1, central tag 762-2 and right tag 762-3, have indicated therein, as tag information, initials of items (artist name) displayed in the filtering-result display area 764. When the tag 762 is selected, an item displayed in the filtering-result display area 764 is quickly changed to an item having the tag information indicated in the tag 762.

The central tag 762-2 has indicated therein, as tag information, legend "JKL" indicating that the initials of the artist names indicated in the filtering-result display area 764 are "J", "K" or "L", for example. Also, there are indicated a leftward-directed arrow indicating that the left tag 762-1 is located before the central tag 762-2 and a rightward-directed arrow indicating that the right tag 762-3 is located after the central tag 762-2. Also, the central tag 762-2 is highlighted for emphasis.

The left tag 762-1 has indicated therein, as tag information, legend "GHI" indicating that the initials located before the initials in the central tag 762-2 in alphabetical order are "G", "H" or "I". The right tag 762-3 has indicated therein, as tag information, legend "MNO" indicating that the initials located before the initials in the central tag 762-2 in alphabetical order are "M", "N" or "O".

When the left tag 762-1 is selected in response to a user's operation, information on an item (artist name) corresponding to the tag information (G, H, I) having been in the left tag 762-1 is indicated in the filtering-result display area 764, tag information "GHI" having been in the left tag 762-1 is indicated in the central tag 762-2, tag information "JKL" having been in the central tag 762-2 is indicated in the right tag 762-3, and tag information on items in a page preceding a selected page is indicated in the left tag 762-1.

On the other hand, when the right tag 762-3 is selected in response to a user's operation, information on an item (artist name) corresponding to the tag information (M, N, O) having been in the right tag 762-3 is indicated in the filtering-result display area 764, tag information "MNO" having been in the right tag 762-3 is indicated in the central tag 762-2, tag information "JKL" having been in the central tag 762-2 is indicated in the left tag 762-1, and tag information on items in a page preceding a selected page is indicated in the right tag 762-3.

That is, in the example in FIG. 41, information on items indicated in the filtering-result display area 764 is changed at each alphabet in response to a user's operation of the tag 762.

In the filtering-result display area 764 in FIG. 41, there are indicated, as first information, a human-shaped icon indicating an artist, legend "J1" (artist name) whose initial is "J" and numerals "24" indicating the number of albums of the artist stored in the PD 5. The filtering-result display area 764 has indicated therein, as second information, a human-shaped icon indicating an artist, legend "J2" (artist name) whose initial is "J" and numerals "64" indicating the number of albums of the artist stored in the PD 5. Also, the filtering-result display area 764 has indicated therein, as third information, a human-shaped icon indicating an artist, legend "K1" (artist name) whose initial is "K" and numerals "42" indicating the number of albums of the artist stored in the PD 5.

Further, the filtering-result display area 764 has indicated therein, as fourth information, a human-shaped icon indicating an artist, legend "K2" (artist name) whose initial is "K" and numerals "34" indicating the number of albums of the artist stored in the PD 5. Also, the filtering-result display area 764 has indicated therein, as fifth information, a human-shaped icon indicating an artist, legend "L1" (artist name) whose initial is "L" and numerals "12" indicating the number of albums of the artist stored in the PD 5.

In the example in FIG. 41, the fourth information is selected with the cursor 766 being moved thereto, and highlighted. That is, a content of which the artist name is "K2" is being played in the PD 5. The user selects a desired artist name by moving the indicated position of the cursor 766 over an item (artist name) in the filtering-result display area 764. Thus, the artist name selected with the use of the cursor 766 is highlighted, and a content of an artist whose name is highlighted is played.

In the Filter view 751 in the example in FIG. 41, since all contents stored in the PD 5 are narrowed down at each artist, the user can select and play only contents of his favorite artist.

Figure 42:
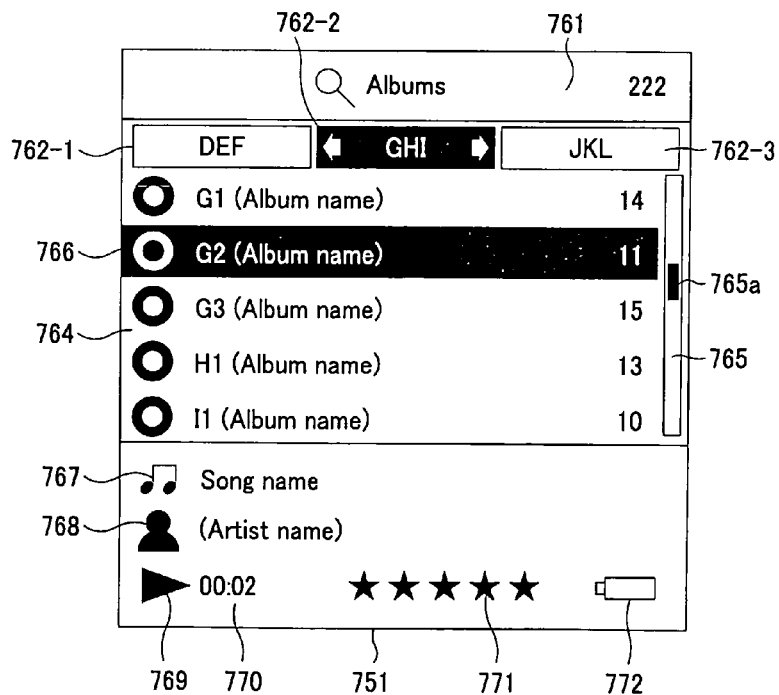
FIG. 42 illustrates another example configuration of the Filter view in FIG. 40.

FIG. 42 shows an example configuration of the Filter view which is in the "Albums" display mode. It should be noted that the example in FIG. 42 is basically similar in configuration to the Filter view in the Artist mode having been explained above with reference to FIG. 41 except for the display mode and so its explanation will be partially omitted wherever appropriate and only different parts will be described in detail.

Figure 43:
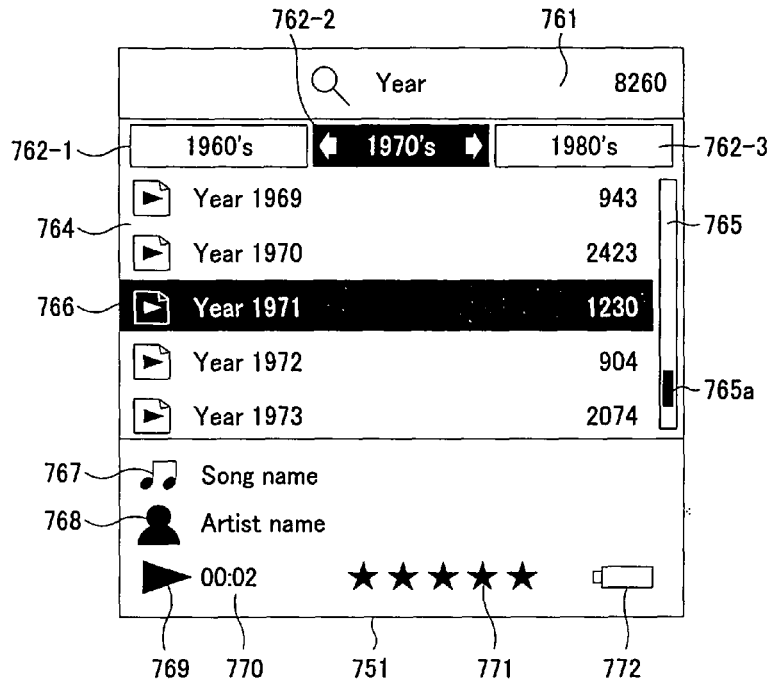
FIG. 43 illustrates another example configuration of the Filter view in FIG. 40.

More specifically, with the Filter view 751 in FIG. 42, contents recorded in the PD 5 are filtered based on an album name to narrow down them, the result of the narrowing is displayed according to each album name, and a content to be played is selected by selecting one of the displayed album names. It should be noted that the Filter view 751 in FIG. 43 is generated with reference to identifiers of the names of the albums of contents stored in the content meta data table 181 in FIG. 6.

In the uppermost portion of the Filter view 751 which is in the Albums mode, there is displayed a view title 761. The view title 761 includes a magnifying-glass icon indicating a filtering function, legend "Albums" indicating that the Filter view 751 is in the Albums mode and numerals "222" indicating the number of albums stored in the PD 5.

In the example in FIG. 42, the central tag 762-2 has indicated therein, as tag information, legend "GHI" indicating that the initials of the album names indicated in a page displayed in the filtering-result display area 764 are "G", "H" or "I". Also, there are indicated a leftward-directed arrow indicating that the left tag 762-1 is located before the central tag 762-2 and a rightward-directed arrow indicating that the right tag 762-3 is located after the central tag 762-2. Also, the central tag 762-2 is highlighted for emphasis.

The left tag 762-1 has indicated therein, as tag information, legend "DEF" indicating that the initials located before the initials in the central tag 762-2 in alphabetical order are "D", "E" or "F". The right tag 762-3 has indicated therein, as tag information, legend "JKL" indicating that the initials located before the initials in the central tag 762-2 in alphabetical order are "J", "K" or "L".

In the filtering-result display area 764 in FIG. 42, there are indicated, as first information, a disk icon indicating an album, legend "G1 (album name)" whose initial is "G" and numerals "14" indicating the number of contents included in the album. The filtering-result display area 764 has indicated therein, as second information, a disk icon indicating an album, legend "G2 (album name)" whose initial is "G" and numerals "11" indicating the number of contents included in the album. Also, the filtering-result display area 764 has indicated therein, as third information, a disk icon indicating an album, legend "G3 (album name)" whose initial is "G" and numerals "15" indicating the number of contents included in the album.

Further, the filtering-result display area 764 has indicated therein, as fourth information, a disk icon indicating an album, legend "H1 (album name)" whose initial is "H" and numerals "13" indicating the number of contents included in the album. Also, the filtering-result display area 764 has indicated therein, as fifth information, a disk icon indicating an album, legend "I1 (album name)" whose initial is "I" and numerals "14" indicating the number of contents included in the album.

In the example in FIG. 42, the fourth information is selected with the cursor 766 being moved thereto, and highlighted. That is, a content in an album whose name is "G2"

(album name) is being played in the PD 5. The user selects a desired album name by moving the indicated position of the cursor 766 over an item (album name) in the filtering-result display area 764. Thus, the album name selected with the use of the cursor 766 is highlighted, and a content in the album whose name is highlighted is played.

In the Filter view 751 in the example in FIG. 42, since all contents stored in the PD 5 are narrowed down at each album, the user can select and play only contents in his favorite album.

FIG. 43 shows an example configuration of the Filter view which is in the "Year" (release date) display mode. It should be noted that the example in FIG. 43 is basically similar in configuration to the Filter view in the Artist mode having been explained above with reference to FIG. 41 except for the display mode and so its explanation will be partially omitted wherever appropriate and only different parts will be described in detail.

More specifically, with the Filter view 751 in FIG. 43, contents recorded in the PD 5 are filtered based on a release date (year) to narrow down them, the result of the narrowing is displayed according to each release date, and a content to be played is selected by selecting one of the displayed release dates (year). It should be noted that the Filter view 751 in FIG. 43 is generated with reference to information on the year of release in the content meta data table 181 in FIG. 6.

In the uppermost portion of the Filter view 751 which is in the Year (release date) mode, there is displayed a view title 761. The view title 761 includes a magnifying-glass icon indicating a filtering function, legend "Year" indicating that the Filter view 751 is in the Year mode and numerals "8260" indicating the number of contents stored in the PD 5.

In the example in FIG. 43, the central tag 762-2 has indicated therein, as tag information, characters "1970's" indicating that the year of release in a page indicated in the filtering-result display area 764 is 1970's. Also, there are indicated a leftward-directed arrow indicating that the left tag 762-1 is located before the central tag 762-2 and a rightward-directed arrow indicating that the right tag 762-3 is located after the central tag 762-2. Also, the central tag 762-2 is highlighted for emphasis.

The left tag 762-1 has indicated therein, as tag information, characters "1960's" indicating that the era before the era indicated in the central tag 762-2 is 1960's. The right tag 762-3 has indicated therein, as tag information, characters "1980's" indicating that the era after the era indicated in the central tag 762-2 is 1980's.

That is, in the example in FIG. 43, information on items indicated in the filtering-result display area 764 is changed at each release date (year of release) with the use of the tag 762.

In the filtering-result display area 764 in FIG. 43, there are indicated, as first information, an icon indicating a release date, characters "Year 1969" indicating that the year of release is 1969, and numerals "943" indicating the number of contents stored in the PD 5 and released in 1969. Also, the filtering-result display area 764 has indicated therein, as second information, an icon indicating a release date, characters "Year 1970" indicating that the year of release is 1970, and numerals "2423" indicating the number of contents stored in the PD 5 and released in 1970. the filtering-result display area 764 has indicated therein, as third information, an icon indicating a release date, characters "Year 1971" indicating that the year of release is 1971, and numerals "1230" indicating the number of contents stored in the PD 5 and released in 1971.

Also, the filtering-result display area 764 has indicated therein, as fourth information, an icon indicating a release date, characters "Year 1972" indicating that the year of release is 1972, and numerals "904" indicating the number of contents stored in the PD 5 and released in 1972. Further, the filtering-result display area 764 has indicated therein, as fifth information, an icon indicating a release date, characters "Year 1973" indicating that the year of release is 1973, and numerals "2074" indicating the number of contents stored in the PD 5 and released in 1973.

Note that in the example in FIG. 43, "1960's" is selected by the user operating the tag 762, and then items are scrolled one step down by the user operating the scroll cursor 765*a* so that information on the number of contents released in 1969 will be indicated as the first information in the filtering-result display area 764.

Also in the example in FIG. 43, the third information is selected with the user of the cursor 766, and highlighted. That is, a content released in "1971" is being played in the PD 5. The user selects a desired release date by moving the displayed position of the cursor 766 over an item (release date) in the filtering-result display area 764. Thus, the release-date information selected with the use of the cursor 766 is highlighted, and a content released at the highlighted release date (year) is played.

With the Filter view 751 in the example in FIG. 43, since all contents stored in the PD 5 are narrowed down at each release data (year), the user can select and play only contents released in his favorite release of year.

Figure 44:
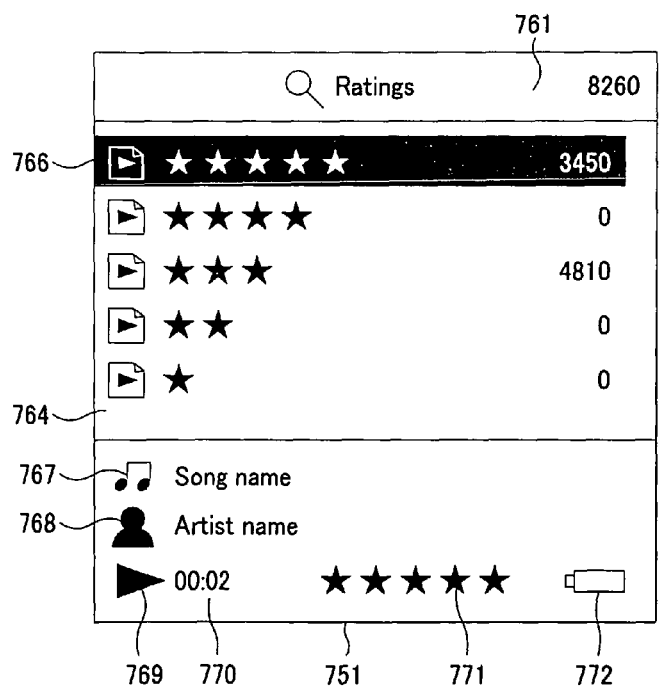
FIG. 44 illustrates another example configuration of the Filter view in FIG. 40.

FIG. 44 shows an example configuration of the Filter view which is in the "Rating" display mode. It should be noted that the example in FIG. 44 is basically similar in configuration to the Filter view in the Genre mode having been explained above with reference to FIG. 40 except for the display mode and so its explanation will be partially omitted wherever appropriate and only different parts will be described in detail.

That is, with the Filter view 751 in FIG. 44, contents recorded in the PD 5 are filtered based on a content rating determined by the user to narrow down them, the result of the narrowing is indicated according to each rating, and the indicated rating is selected to select a content to be played. It should be noted that the Filter view in FIG. 44 is generated with reference to ratings of contents pre-determined by the user and stored in the content meta table 181 in FIG. 6.

In the uppermost portion of the Filter view 751 which is in the Rating display mode, a view title 761 is indicated. The view title 761 includes a magnifying-glass icon indicating a filtering function, legend "Rating" indicating that the display mode is "Rating mode", and numerals "8260" indicating the number of contents stored in the PD 5.

Note that the Filter view 751 in the example in FIG. 44 has no tag 762 but a filtering-result display area 764 provided immediately below the view title 761.

In the filtering-result display area 764 in FIG. 44, there are indicated, as first information, a rating icon, "★★★★★" (five black stars) indicating that the rating is five stars (highest one of five ratings) and numerals "3450" indicating the number of contents stored in the PD 5 and whose rating is five stars. Also, there are indicated, as second information, a rating icon, "★★★★" (four black stars) indicating that the rating is four stars (second highest one of five ratings) and numerals "0" indicating the number of contents stored in the PD 5 and whose rating is four stars. There are indicated, as third information, a rating icon, "★★★" (three black stars) indicating that the rating is three stars (third highest one of five ratings) and numerals "4810" indicating the number of contents stored in the PD 5 and whose rating is three stars.

Also, there are indicated, as fourth information, a rating icon, "★★" (two black stars) indicating that the rating is two stars (second lowest one of five ratings) and numerals "0" indicating the number of contents stored in the PD 5 and whose rating is two stars. Further, there are indicated, as fifth information, a rating icon, "★" (one black star) indicating that the rating is one star (lowest one of five ratings) and numerals "0" indicating the number of contents stored in the PD 5 and whose rating is one star.

Also in the example in FIG. 44, the first information is selected with the use of the cursor 766, and highlighted. That is, a content whose rating is five stars is being played in the PD 5. The user selects a desired rating by moving the displayed position of the cursor 766 over an item (rating) in the filtering-result display area 764. Thus, the rating selected with the use of the cursor 766 is highlighted and a content having the highlighted rating is played.

With the Filter view 751 in the sample in FIG. 44, since all contents stored in the PD 5 are narrowed down based on their ratings as above, the user can narrow down the contents with a rating he has determined to favorite ones and play only the favorite contents. That is, the user can selected only contents rated according to his own rating.

Figure 45:
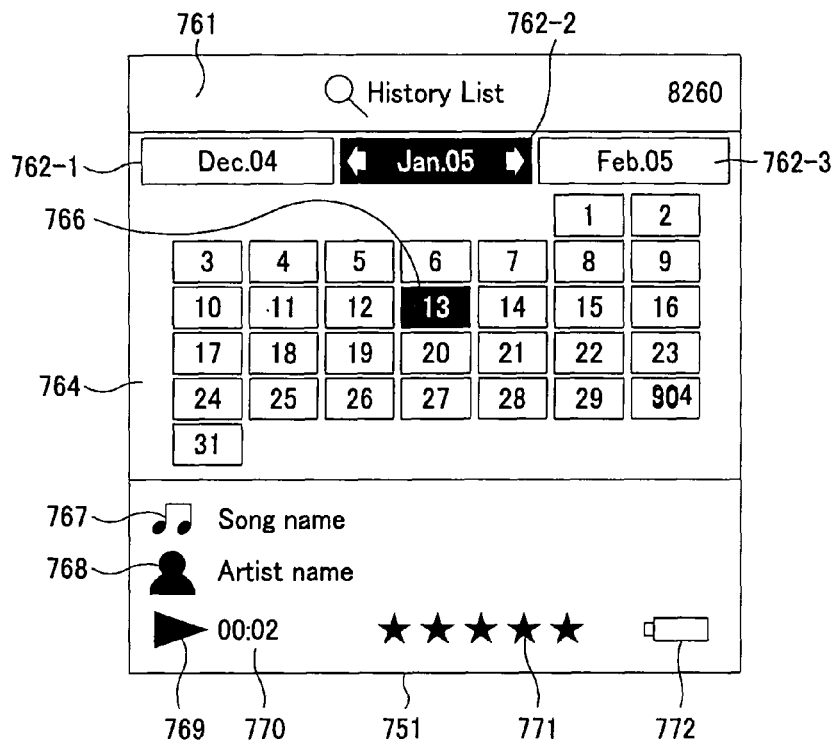
FIG. 45 illustrates another example configuration of the Filter view in FIG. 40.

FIG. 45 shows an example configuration of the Filter view which is in the "History" display mode. It should be noted that the example in FIG. 41 is basically similar in configuration to the Filter view in the Genre mode having been explained above with reference to FIG. 40 except for the display mode and so its explanation will be partially omitted wherever appropriate and only different parts will be described in detail.

More specifically, with the Filter view 751 in FIG. 45, contents recorded in the PD 5 are filtered based on a date in the playing history to narrow down them, the result of the narrowing is displayed according to each playing history, and a content to be played is selected by selecting one of the dates in the playing history. It should be noted that the Filter view 751 in FIG. 45 is generated with reference to the playing history of contents stored in the selected-order list management unit 213 in FIG. 9.

In the uppermost portion of the Filter view 751 which is in the History mode, there is displayed a view title 761. The view title 761 includes a magnifying-glass icon indicating a filtering function and legend "History" indicating that the Filter view 751 is in the History mode.

In the example in FIG. 45, each of the left tag 762-1, central tag 762-2 and right tag 762-3 has indicated therein, as tag information, a playing history (month and year) and the filtering-result display area 764 indicates numerals for a day including in the playing history. When the tag 762 is selected, an item (calendar) displayed in the filtering-result display area 764 is quickly changed to an item having the tag information indicated in the tag 762, namely, to a calendar (month and day) indicated in the tag 762.

The central tag 762-2 has indicated therein, as tag information, characters "Jan.05" indicating that the calendar as a playing history indicated in the filtering-result display area 764 is "January, 2005", for example. Also, there are indicated a leftward-directed arrow indicating that the left tag 762-1 is located before the central tag 762-2 and a rightward-directed arrow indicating that the right tag 762-3 is located after the central tag 762-2. Also, the central tag 762-2 is highlighted for emphasis.

The left tag 762-1 has indicated therein, as tag information, characters "Dec. 4" indicating that the month and year before those indicated in the central tag 762-2 is "December, 2004".

The right tag 762-3 has indicated therein, as tag information, characters "Feb.05" indicating that the month and year after those indicated in the central tag 762-2 is "February, 2005".

When the left tag 762-1 is selected by the user, a calendar of "December, 2004" as the tag information having been indicated in the left tag 762-1 is indicated in the filtering-result display area 764, tag information "Dec.04" having been indicated in the left tag 762-1 is indicated in the central tag 762-2, tag information "Jan.05" having been indicated in the central tag 762-2 is indicated in the right tag 762-3, and "Nov.04" (November, 2004) preceding the "Dec.04" is indicated as tag information in the left tag 762-1.

On the other hand, when the right tag 762-3 is selected in response to a user's operation, a calendar of "February, 2005" as the tag information having been indicated in the right tag 762-3 is indicated in the filtering-result display area 764, tag information "Feb.05" having been indicated in the right tag 762-3 is indicated in the central tag 762-2, tag information "Jan.05" having been indicated in the central tag 762-2 is indicated in the left tag 762-1, and "Mar.05" (March, 2005) following the "Feb.05" is indicated as tag information in the right tag 762-3.

That is, in the example in FIG. 45, information on an item indicated in the filtering-result display area 764 is changed at every month with the use of the tag 762.

In the filtering-result display area 764 in FIG. 45, there is indicated a calendar including days "1" to "31" for the tag information "Jan.05" indicated in the central tag 762-2.

Also in the example in FIG. 45, the thirteenth day "13" in the calendar is selected with the user of the cursor 766, and highlighted. That is, a content whose playing history is "Jan. 13, 2005" is being played in the PD 5. The user selects a desired day in the playing history by moving the displayed position of the cursor 766 over the calendar in the filtering-result display area 764. Thus, the day selected with the use of the cursor 766 is highlighted, and a content having previously been played on the highlighted day is played. It should be noted that the playing sequence of contents having previously been played on the selected day are set in advance.

With the Filter view 751 in the example in FIG. 45, since all contents stored in the PD 5 are narrowed down at each playing history, the user can select and play only a content having previously been played on a predetermined day.

Figure 46:
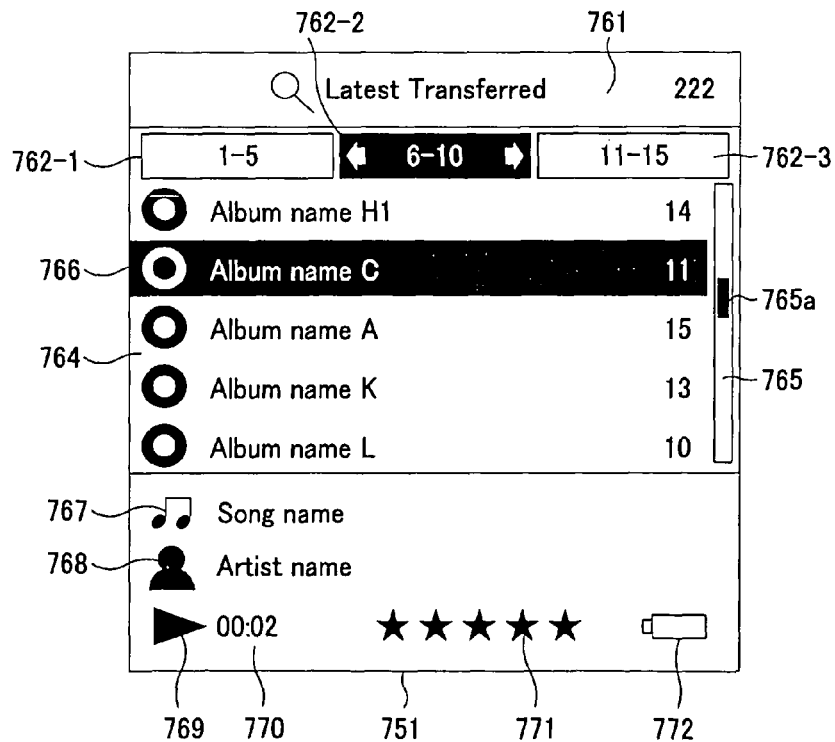
FIG. 46 illustrates another example configuration of the Filter view in FIG. 40.

FIG. 46 shows an example configuration of the Filter view which is in the "Latest Transferred" album display mode. It should be noted that the example in FIG. 46 is basically similar in configuration to the Filter view in the Genre mode having been explained above with reference to FIG. 40 except for the display mode and so its explanation will be partially omitted wherever appropriate and only different parts will be described in detail.

More specifically, with the Filter view 751 in FIG. 46, contents recorded in the PD 5 are filtered based on a latest transferred album to narrow down them, the result of the narrowing is displayed according to each album in the order of recently transferred albums, and a content to be played is selected by selecting one of the album names indicated in the order of recently transferred albums. It should be noted that the Filter view 751 in FIG. 46 is generated with reference to the playing history recorded into the content meta data table 181 in FIG. 6 each time a content is transferred to the PD 5.

In the uppermost portion of the Filter view 751 which is in the Latest Transferred album display mode, there is indicated a view title 761. The view title 761 includes a magnifying-glass icon indicating a filtering function, legend "Latest Transferred" indicating that the display mode is "Latest Transferred" album display mode and numerals "222" indicating the number of albums stored in the PD 5.

In the example in FIG. 46, each of the left tag 762-1, central tag 762-2 and right tag 762-3 has indicated therein, as tag information, five numbers appended in the latest transferred order to items (latest transferred albums) indicated in the filtering-result display area 764. When the tag 762 is selected, a page carrying the five items indicated in the filtering-result display area 764 is quickly changed to five items (page carrying the five items) having the tag information indicated in the tag 762.

In the example in FIG. 46, the central tag 762-2 has indicated therein, as tag information, numerals "6-10" indicating that the albums indicated in the filtering-result display area 764 are the sixth to tenth latest transferred ones of the latest transferred albums. Also, there are indicated a leftward-directed arrow indicating that the left tag 762-1 is located before the central tag 762-2 and a rightward-directed arrow indicating that the right tag 762-3 is located after the central tag 762-2. Also, the central tag 762-2 is highlighted for emphasis.

The left tag 762-1 has indicated therein, as tag information, numerals "1-5" indicating that the orders indicated before those indicated in the central tag 762-2 are first to fifth. The right tag 762-3 has indicated therein, as tag information, numerals "11-15" indicating that the orders indicated before those indicated in the central tag 762-2 are eleventh to fifteenth.

In case the left tag 762-1 is selected in response to a user's operation, five pieces of information (one page) on items (album name) corresponding to the first to fifth items having been indicated in the left tag 762-1 (namely, first to fifth latest transferred items) are indicated in the filtering-result display area 764, tag information "1-5" having been indicated in the left tag 762-1 are indicated in the central tag 762-2, tag information "6-10" having been indicated in the central tag 762-2 are indicated in the right tag 762-3, and tag information ordered before the tag information "1-5" having been indicated in the left tag 762-1, that is, tag information "50-55" are indicated in the left tag 762-1.

On the other hand, in case the right tag 762-3 is selected in response to a user's operation, five pieces of information (one page) on items (album name) corresponding to the eleventh to fifteenth latest transferred items having been indicated in the right tag 762-3 are indicated in the filtering-result display area 764, tag information "11-15" having been indicated in the right tag 762-3 are indicated in the central tag 762-2, tag information "6-10" having been indicated in the central tag 762-2 are indicated in the left tag 762-1, and tag information ordered after the tag information "11-15" having been indicated in the right tag 762-3, that is, tag information "16-20" are indicated in the tight tag 762-3.

That is, in the example in FIG. 46, information on an item indicated in the filtering-result display area 764 is changed at every five items, namely, at each page, as in the example in FIG. 40 with the use of the tag 762.

In the filtering-result display area 764 in FIG. 46, there are indicated, as first information, a disk icon indicating an album, characters "Album name H1" indicating a sixth latest transferred album and numerals "14" indicating the number of contents included in the album. Also, there are indicated, as second information, a disk icon indicating an album, characters "Album name C" indicating a seventh latest transferred album and numerals "11" indicating the number of contents included in the album. There are indicated, as third information, a disk icon indicating an album, legend "Album name A" indicating an eighth latest transferred album and numerals "15" indicating the number of contents included in the album.

Also, there are indicated, as fourth information, a disk icon indicating an album, legend "Album name K" indicating a ninth latest transferred album and numerals "13" indicating the number of contents included in the album. There are indicated, as fifth information, a disk icon indicating an album, legend "Album name L" indicating a tenth latest transferred album and numerals "10" indicating the number of contents included in the album.

Also in the example in FIG. 46, the second information is selected with the user of the cursor 766, and highlighted. That is, a content included in a seventh latest transferred album whose name is "Album name C" is being played in the PD 5. The user selects a desired album name by moving the displayed position of the cursor 766 over an item (album name) in the filtering-result display area 764. Thus, the information on the album name selected with the use of the cursor 766 is highlighted, and a content in the album whose name is highlighted is played.

With the Filter view 751 in the example in FIG. 46, since all contents stored in the PD 5 are narrowed down at each of the albums indicated in the latest transferred order, the user can select and play only contents in an album having been transferred at a time near the present time.

Figure 47:
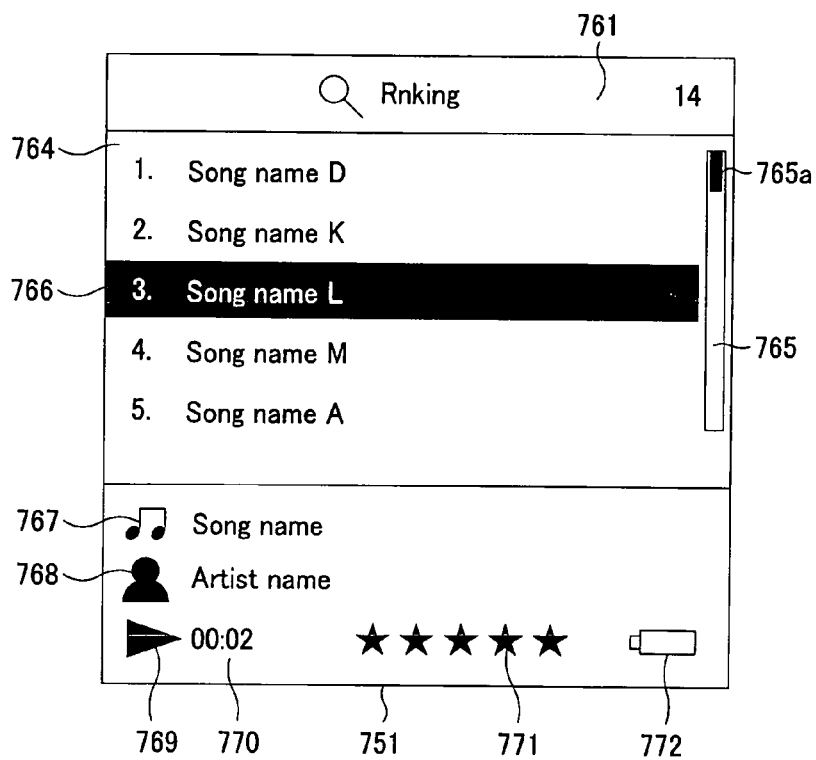
FIG. 47 illustrates another example configuration of the Filter view in FIG. 40.

FIG. 47 shows an example configuration of the Filter view which is in the "User ranking" display mode. It should be noted that the example in FIG. 47 is basically similar in configuration to the Filter view in the Genre mode having been explained above with reference to FIG. 40 except for the display mode and so its explanation will be partially omitted wherever appropriate and only different parts will be described in detail.

More specifically, with the Filter view 751 in FIG. 47, contents recorded in the PD 5 are filtered based on a highest ranking at which the user has listened for a predetermined past period (ranking of number of times of user's listening) to narrow down them, the result of the narrowing is indicated in the ranking order, and a content to be played is selected by selecting one of the content names indicated in the ranking order. It should be noted that the Filter view 751 in FIG. 47 is generated with reference to the user ranking information determined based on the played order list stored in the selected-order list management unit 213 in FIG. 9 and the like.

Therefore, the user ranking mode in FIG. 47 is different from the ranking mode having been described above with reference to FIGS. 16 and 17. More specifically, different from the ranking of content sales in the market and ranking of user's listening using the content server 3, recorded in the content meta data table 181, the user ranking is calculated based on the user's played order list having been explained above with reference to FIG. 20, for example. A content the user has listened to most frequently is ranked highest. In the example in FIG. 16, the user ranking is used for comparison in taste between a user and other user. However, the user ranking is used independently in the example in FIG. 47.

Note that the "past" referred to herein may be either a predetermined period in a nearest past or a time as a reference for determining a predetermined period may be selected.

In the uppermost portion of the Filter view 751 in the User ranking mode, there is indicated a view title 761. The view title 761 includes a magnifying-glass icon indicating a filtering function, legend "Ranking" indicating that the display mode is User ranking mode and numerals "14" indicating the number of content ranks. It should be noted that in the user ranking mode, the number of contents to be narrowed down can be pre-set. That is, in the example in FIG. 47, up to 14 contents are displayed.

Note that the Filter view 751 in the example in FIG. 47 has no tag 762 but a filtering-result display area 764 provided immediately below the view title 761.

In the filtering-result display area 764 in FIG. 47, there are indicated, as first information, a number "1." indicating that a content is at the first rank and legend "Song name D" indicating the name of the content at the first rank (the user has listened to the content with a highest frequency). There are indicated, as second information, a number "2." indicating that a content is at the second rank and legend "Song name K" indicating the name of the content at the second rank (the user has listened to the content with a second highest frequency). There are indicated, as third information, a number "3." indicating that a content is at the third rank and legend "Song name L" indicating the name of the content at the third rank (the user has listened to the content with a third highest frequency).

Also, there are indicated, as fourth information, a number "4." indicating that a content is at the fourth rank and legend "Song name M" indicating the name of the content at the fourth rank (the user has listened to the content with a fourth highest frequency). There are indicated, as fifth information, a number "5." indicating that a content is at the fifth rank and legend "Song name A" indicating the name of the content at the fifth rank (the user has listened to the content with a fifth highest frequency).

In the example in FIG. 47, the fourth information is selected with the use of the cursor 766, and highlighted. That is, a content having the name "Song name L" at the third rank is being played in the PD 5. The user selects a desired content name by moving the displayed position of the cursor 766 over an item (content name) in the filtering-result display area 764. Thus, the information on the content name selected with the use of the cursor 766 is highlighted and a content having the highlighted content name is played.

With the Filter view 751 in the example in FIG. 47, since all contents stored in the PD 5 are narrowed down in the order of frequencies with which the user has listened in the pas (for a predetermined period), the user can select and play only a predetermined number of contents he has listened most frequently in the past (for the predetermined period).

Note that although examples of the Filter view have been explained as a content selection view above, the content selection views are not limited to the aforementioned four examples but a content selection view having another configuration may be used.

The user can use the Map view in which the user can intuitively select a desired play list of contents on the basis of the meta data of the contents, Jump view in which the user can select (search) contents related to a content and the Play List view in which the user can select a content from a play list selected in the Map or Jump view as well as the other content selection view such as the Filter view.

Note that the Filter views may be adapted to inherit selection information from each other like the aforementioned Map, Jump and Play List views. Therefore, selectively using this content selection view suiting a purpose, the user can easily select a content suiting his taste.

Thus, with one of the content selection views, the user can intuitively select a content suiting his taste or mood from various contents unknown to him and play it.

Note that although the present invention has been explained using moving pictures and music contents in the foregoing, it is not limited to the moving picture and music contents but is applicable to contents such as applications.

Also, in the foregoing, the present invention has been illustrated and explained concerning the PD 5 being a portable recorder/player as the information processing apparatus. However, the information processing apparatus is not limited to the PD 5 but may be a personal computer such as PC 1 in FIG. 2 and may also be a mobile phone, PDA (personal digital assistant), player and recorder/player such as AV (audio visual) device, CE (consumer electronics) or the like.

The aforementioned series of operations can also be executed by hardware but may be executed by software.

In case the series of operations is executed by software, a program forming the software is installed in a computer incorporated in a dedicated hardware or installed from a network or recording medium into a general-purpose personal computer or the like capable of executing a variety of functions.

As shown in FIG. 2 or 4, the recording medium is a package medium like the removable medium 21 or 122 such as a magnetic disk (including flexible disk), optical disk (including CD-ROM (=compact disk-read-only memory) and DVD (digital versatile disk)) or semiconductor memory, separate from the information processing apparatus, having the program recorded therein and which is to be distributed for supplying the users with the program. Also, it is a hard disk incorporated in the ROM 12 or 112 or storage unit 18 or 119 having the program recorded therein and which is to be distributed being pre-installed in the information processing unit.

Note that the steps shown in the flow diagrams having been described herein of course include the operations to be effected time-serially in the described sequence and also those which are to be effected in parallel or individually without being effected time-serially.

Note that the system referred to herein means an assembly of a plurality of unit devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a display-form managing means for:
        receiving, from a user, information associated with at least one of a plurality of content selection views, the content selection views being associated with corresponding arrangements of graphical representations of a set of content elements on a display screen; and
        establishing a display mode for a subset of the content elements based on the received information, metadata associated with the subset of the content elements, and a prior arrangement of the graphical representations of the subset of the content elements on the display screen;
    a display control means for generating at least one signal to display, on the display screen:
        a transition between a prior content selection view and the content selection view corresponding to the received information; and
        the graphical representations of the subset of the content elements in accordance with the established display mode;
    a detection means for detecting a contact between a human appendage and a surface of a touch screen, the contact being associated with a corresponding contact position on the touch screen surface;
    a judging means for determining whether the contact between the human appendage and the touch screen surface is released;

a selecting means for selecting at least a first one of the content elements when the contact is released, the graphical representation of the first content element being associated with a display position corresponding to the contact position, the selecting means being further configured to store information associated with the selected item; and a playing means for generating a signal to play the first content element, the playing means being further configured to play a second one of the content elements when the contact is not released.

2. The information processing apparatus of claim 1, wherein the second content element comprises at least a portion of the first content element.

3. The information processing apparatus of claim 1, wherein the first content element comprises a sound.

4. The information processing apparatus of claim 1, wherein the human appendage comprises a human finger.

5. The apparatus of claim 1, further comprising a storage unit configured to store the metadata, wherein the display-form managing means is further configured to obtain the metadata from the storage unit upon receipt of the information from the user.

6. The apparatus of claim 1, wherein
the prior content selection view is different from the content selection view corresponding to the received information.

7. The apparatus of claim 1, wherein the display control means is further configured to display, on the display screen, an animation of the transition between the prior arrangement of the graphical representations of the subset of the content elements and an arrangement of the graphical representations corresponding to the established display mode.

8. The apparatus of claim 7, wherein:
the arrangement of the graphical representations corresponding to the established display mode comprises a grid; and
the display control means is further configured to:
assign the graphical representations to corresponding positions within the grid based on metadata associated with the subset of the content elements; and
display the graphical representations on the display screen at the assigned positions within the grid.

9. A computer-implemented method for processing information, comprising:
receiving, from a user, information associated with at least one of a plurality of content selection views, the content selection views being associated with corresponding arrangements of graphical representations of a set of content elements on a display screen; and
establishing a display mode for a subset of the content elements based on the received information, metadata associated with the subset of the content elements, and a prior arrangement of the graphical representations of the subset of the content elements on the display screen;
generating at least one signal to display, on the display screen:
a transition between a prior content selection view and the content selection view corresponding to the received information; and
the graphical representations of the subset of the content elements in accordance with the established display mode;
detecting a contact between a human appendage and a surface of a touch screen, the contact being associated with a corresponding contact position on the touch screen surface;
determining whether the contact between the human appendage and the touch screen surface is released;
selecting at least a first one of the content elements when the contact is released, the graphical representation of the first content element being associated with a display position corresponding to the contact position, the selecting means being further configured to store information associated with the selected item; and
generating a signal to play the first content element, the playing means being further configured to play a second one of the content elements when the contact is not released.

10. The method of claim 9, wherein the second content element comprises at least a portion of the first content element.

11. The method of claim 9, wherein the first content element comprises a sound.

12. The method of claim 9, wherein the human appendage comprises a human finger.

13. A tangible, non-transitory computer-readable medium storing instructions that, when executed by at least one processor, cause the at least one processor to perform a method for processing information, comprising:
receiving, from a user, information associated with at least one of a plurality of content selection views, the content selection views being associated with corresponding arrangements of graphical representations of a set of content elements on a display screen; and
establishing a display mode for a subset of the content elements based on the received information, metadata associated with the subset of the content elements, and a prior arrangement of the graphical representations of the subset of the content elements on the display screen;
generating at least one signal to display, on the display screen:
a transition between a prior content selection view and the content selection view corresponding to the received information; and
the graphical representations of the subset of the content elements in accordance with the established display mode;
detecting a contact between a human appendage and a surface of a touch screen, the contact being associated with a corresponding contact position on the touch screen surface;
determining whether the contact between the human appendage and the touch screen surface is released;
selecting at least a first one of the content elements when the contact is released, the graphical representation of the first content element being associated with a display position corresponding to the contact position, the selecting means being further configured to store information associated with the selected item; and
generating a signal to play the first content element, the playing means being further configured to play a second one of the content elements when the contact is not released.

14. The computer-readable medium of claim 13, wherein the second content element comprises at least a portion of the first content element.

15. The computer-readable medium of claim 13, wherein the first content element comprises a sound.

16. The computer-readable medium of claim 13, wherein the human appendage comprises a human finger.

17. An information processing apparatus, comprising:
a display-form management unit configured to:

receive, from a user, information associated with at least one of a plurality of content selection views, the content selection views being associated with corresponding arrangements of graphical representations of a set of content elements on a display screen; and establish a display mode for a subset of the content elements based on the received information, metadata associated with the subset of the content elements, and a prior arrangement of the graphical representations of the subset of the content elements on the display screen;

a display controller configured to generate at least one signal to display, on the display screen:
- a transition between a prior content selection view and the content selection view corresponding to the received information; and
- the graphical representations of the subset of the content elements in accordance with the established display mode;

a detector configured to detect a contact between a human appendage and a surface of a touch screen, the contact being associated with a corresponding contact position on the touch screen surface;

a judging unit to determine whether the contact between the human appendage and the touch screen surface is released;

a selector configured to select at least a first one of the content elements when the contact is released, the graphical representation of the first content element being associated with a display position corresponding to the contact position, the selector being further configured to store information associated with the selected item; and a player configured to play the first content element, the player being further configured to play a second one of the content elements when the contact is not released.

18. The apparatus of claim 17, wherein the second content element comprises at least a portion of the first content element.

19. The apparatus of claim 17, wherein the first content element comprises a sound.

20. The apparatus of claim 17, wherein the human appendage comprises a human finger.

* * * * *